(12) United States Patent
LeTourneau

(10) Patent No.: US 11,663,238 B2
(45) Date of Patent: *May 30, 2023

(54) METHOD AND/OR SYSTEM FOR TREE TRANSFORMATION

(71) Applicant: Lower48 IP LLC, Dallas, TX (US)

(72) Inventor: Jack J. LeTourneau, Ventura, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/396,488

(22) Filed: Aug. 6, 2021

(65) Prior Publication Data

US 2022/0043832 A1   Feb. 10, 2022

Related U.S. Application Data

(63) Continuation of application No. 16/048,113, filed on Jul. 27, 2018, now Pat. No. 11,100,137, which is a continuation of application No. 14/596,154, filed on Jan. 13, 2015, now Pat. No. 10,068,003, which is a continuation of application No. 14/086,741, filed on Nov. 21, 2013, now Pat. No. 9,015,202, which is a continuation of application No. 11/320,538, filed on Dec. 27, 2005, now Pat. No. 8,615,530.

(60) Provisional application No. 60/648,950, filed on Jan. 31, 2005.

(51) Int. Cl.
| G06F 16/00 | (2019.01) |
| G06F 16/28 | (2019.01) |
| G06F 16/22 | (2019.01) |
| G06F 16/901 | (2019.01) |
| G06F 17/10 | (2006.01) |

(52) U.S. Cl.
CPC ........ *G06F 16/282* (2019.01); *G06F 16/2246* (2019.01); *G06F 16/9027* (2019.01); *G06F 17/10* (2013.01)

(58) Field of Classification Search
CPC ............... G06F 16/2246; G06F 16/282; G06F 16/9027; G06F 17/10
See application file for complete search history.

(56) References Cited

U.S. PATENT DOCUMENTS

| 3,201,701 A | 8/1965 | Maitra |
| 3,704,345 A | 11/1972 | Coker |
| 4,001,951 A | 1/1977 | Fasse |
| 4,134,218 A | 1/1979 | Adams |
| 4,156,910 A | 5/1979 | Barton |
| 4,286,330 A | 8/1981 | Isaacson |
| 4,439,162 A | 3/1984 | Blaine |
| 4,677,550 A | 6/1987 | Ferguson |
| 4,737,109 A | 4/1988 | Abramson |
| 4,745,561 A | 5/1988 | Hirosawa |
| 4,751,684 A | 6/1988 | Holt |
| 4,831,525 A | 5/1989 | Saito |
| 4,867,686 A | 9/1989 | Goldstein |
| 4,905,138 A | 1/1990 | Bourne |
| 4,916,655 A | 4/1990 | Ohsone |

(Continued)

OTHER PUBLICATIONS

U.S. Appl. No. 16/209,872 / Issue Fee Payment and 312 Response filed Oct. 11, 2021, 14 pages, Doc 2357.

(Continued)

*Primary Examiner* — Dinku W Gebresenbetz

(57) ABSTRACT

Embodiments of methods, apparatuses, devices and/or systems for manipulating hierarchical sets of data are disclosed.

15 Claims, 24 Drawing Sheets

(56) References Cited

U.S. PATENT DOCUMENTS

| | | | |
|---|---|---|---|
| 4,931,928 A | 6/1990 | Greenfeld |
| 4,949,388 A | 8/1990 | Bhaskaran |
| 4,989,132 A | 1/1991 | Mellender |
| 4,991,087 A | 2/1991 | Burkowski |
| 5,010,478 A | 4/1991 | Deran |
| 5,021,943 A | 6/1991 | Grimes |
| 5,021,992 A | 6/1991 | Kondo |
| 5,050,071 A | 9/1991 | Harris |
| 5,136,593 A | 8/1992 | Moon |
| 5,191,522 A | 3/1993 | Bosco |
| 5,235,701 A | 8/1993 | Ohler |
| 5,265,245 A | 11/1993 | Nordstrom |
| 5,295,261 A | 3/1994 | Simonetti |
| 5,325,531 A | 6/1994 | McKeeman |
| 5,335,320 A | 8/1994 | Iwata |
| 5,335,345 A | 8/1994 | Frieder |
| 5,355,496 A | 10/1994 | Fant |
| 5,450,581 A | 9/1995 | Bergen |
| 5,463,777 A | 10/1995 | Bialkowski |
| 5,493,504 A | 2/1996 | Minato |
| 5,493,678 A | 2/1996 | Arcuri |
| 5,497,500 A | 3/1996 | Rogers |
| 5,509,088 A | 4/1996 | Robson |
| 5,511,159 A | 4/1996 | Baker |
| 5,519,627 A | 5/1996 | Mahmood |
| 5,522,068 A | 5/1996 | Berkowitz |
| 5,544,301 A | 8/1996 | Orton |
| 5,548,755 A | 8/1996 | Leung |
| 5,577,253 A | 11/1996 | Blickstein |
| 5,598,350 A | 1/1997 | Kawanishi |
| 5,606,669 A | 2/1997 | Bertin |
| 5,636,155 A | 6/1997 | Kabuo |
| 5,687,362 A | 11/1997 | Bhargava |
| 5,706,406 A | 1/1998 | Pollock |
| 5,724,512 A | 3/1998 | Winterbottom |
| 5,724,576 A | 3/1998 | Letourneau |
| 5,742,806 A | 4/1998 | Reiner |
| 5,745,892 A | 4/1998 | Miyata |
| 5,748,975 A | 5/1998 | Van De Vanter |
| 5,758,152 A | 5/1998 | Letourneau |
| 5,778,354 A | 7/1998 | Leslie |
| 5,778,371 A | 7/1998 | Fujihara |
| 5,781,906 A | 7/1998 | Aggarwal |
| 5,784,557 A | 7/1998 | Oprescu |
| 5,787,415 A | 7/1998 | Jacobson |
| 5,787,432 A | 7/1998 | Letourneau |
| 5,796,356 A | 8/1998 | Okada |
| 5,802,370 A | 9/1998 | Sitbon |
| 5,822,593 A | 10/1998 | Lamping |
| 5,826,262 A | 10/1998 | Bui |
| 5,838,319 A | 11/1998 | Guzak |
| 5,848,159 A | 12/1998 | Collins |
| 5,930,805 A | 7/1999 | Marquis |
| 5,937,181 A | 8/1999 | Godefroid |
| 5,940,619 A | 8/1999 | Abadi |
| 5,960,425 A | 8/1999 | Buneman |
| 5,970,490 A | 10/1999 | Morgenstern |
| 5,978,790 A | 11/1999 | Buneman |
| 5,987,449 A | 11/1999 | Suciu |
| 5,999,926 A | 12/1999 | Suciu |
| 6,002,879 A | 12/1999 | Radigan |
| 6,003,033 A | 12/1999 | Amano |
| 6,022,879 A | 2/2000 | Crow |
| 6,028,987 A | 2/2000 | Hirairi |
| 6,055,537 A * | 4/2000 | LeTourneau ............ G06F 9/44 |
| | | 707/999.102 |
| 6,076,087 A | 6/2000 | Suciu |
| 6,088,691 A | 7/2000 | Bhargava |
| 6,141,655 A | 10/2000 | Johnson |
| 6,199,059 B1 | 3/2001 | Dahan |
| 6,199,103 B1 | 3/2001 | Sakuguchi |
| 6,236,410 B1 | 5/2001 | Politis |
| 6,240,418 B1 | 5/2001 | Shadmon |
| 6,243,859 B1 | 6/2001 | Chen-Kuang |
| 6,272,495 B1 | 8/2001 | Hetherington |
| 6,279,007 B1 | 8/2001 | Uppala |
| 6,289,354 B1 | 9/2001 | Aggarwal |
| 6,292,938 B1 | 9/2001 | Sarkar |
| 6,314,559 B1 | 11/2001 | Sollich |
| 6,336,812 B1 | 1/2002 | Cooper |
| 6,341,372 B1 | 1/2002 | Datig |
| 6,377,953 B1 | 4/2002 | Gawlick |
| 6,411,957 B1 | 6/2002 | Dijkstra |
| 6,442,584 B1 | 8/2002 | Kolli |
| 6,446,256 B1 | 9/2002 | Hymen |
| 6,466,240 B1 | 10/2002 | Maslov |
| 6,480,857 B1 | 11/2002 | Chandler |
| 6,499,036 B1 | 12/2002 | Gurevich |
| 6,505,205 B1 | 1/2003 | Kothuri |
| 6,542,899 B1 | 4/2003 | Saulpaugh |
| 6,550,024 B1 | 4/2003 | Pagurek |
| 6,556,983 B1 | 4/2003 | Altschuler |
| 6,598,052 B1 | 7/2003 | Saulpaugh |
| 6,598,502 B1 | 7/2003 | Rosa |
| 6,606,632 B1 | 8/2003 | Saulpaugh |
| 6,606,741 B2 | 8/2003 | Kojima |
| 6,609,130 B1 | 8/2003 | Saulpaugh |
| 6,610,106 B1 | 8/2003 | Jenks |
| 6,611,844 B1 | 8/2003 | Saulpaugh |
| 6,640,218 B1 | 10/2003 | Golding |
| 6,658,649 B1 | 12/2003 | Bates |
| 6,665,664 B2 | 12/2003 | Paulley |
| 6,687,734 B1 | 2/2004 | Sellink |
| 6,691,301 B2 | 2/2004 | Bowen |
| 6,714,939 B2 | 3/2004 | Saldanha |
| 6,728,953 B1 | 4/2004 | Walster |
| 6,742,054 B1 | 5/2004 | Upton |
| 6,745,384 B1 | 6/2004 | Biggerstaff |
| 6,748,378 B1 | 6/2004 | Lavender |
| 6,763,515 B1 | 7/2004 | Vazquez |
| 6,785,673 B1 | 8/2004 | Fernandez |
| 6,795,868 B1 | 9/2004 | Dingman |
| 6,804,677 B2 | 10/2004 | Shadmon |
| 6,817,865 B2 | 11/2004 | Charbonneau |
| 6,829,695 B1 | 12/2004 | Ross |
| 6,847,979 B2 | 1/2005 | Allemang |
| 6,854,976 B1 | 2/2005 | Suhr |
| 6,874,005 B2 | 3/2005 | Fortenberry |
| 6,880,148 B1 | 4/2005 | Raph |
| 6,941,511 B1 | 9/2005 | Hind |
| 6,965,990 B2 | 11/2005 | Barsness |
| 6,968,330 B2 | 11/2005 | Edwards |
| 6,978,271 B1 | 12/2005 | Hoffman |
| 7,043,555 B1 | 5/2006 | McClain |
| 7,051,033 B2 | 5/2006 | Agarwal |
| 7,072,904 B2 | 7/2006 | Najork |
| 7,103,838 B1 | 9/2006 | Krishnamurthy |
| 7,107,265 B1 | 9/2006 | Calvignac |
| 7,111,016 B2 | 9/2006 | Gurevich |
| 7,117,196 B2 | 10/2006 | Gaur |
| 7,117,479 B2 | 10/2006 | Van De Vanter |
| 7,127,704 B2 | 10/2006 | Van De Vanter |
| 7,134,075 B2 | 11/2006 | Hind |
| 7,139,765 B1 | 11/2006 | Balkany |
| 7,140,006 B2 | 11/2006 | Harrison |
| 7,162,485 B2 | 1/2007 | Gottlob |
| 7,167,856 B2 | 1/2007 | Lawder |
| 7,190,376 B1 | 3/2007 | Tonisson |
| 7,191,182 B2 | 3/2007 | Anonsen |
| 7,203,680 B2 | 4/2007 | Parida |
| 7,203,774 B1 | 4/2007 | Zhou |
| 7,225,183 B2 | 5/2007 | Gardner |
| 7,225,199 B1 | 5/2007 | Green |
| 7,287,026 B2 | 10/2007 | Oommen |
| 7,313,563 B2 | 12/2007 | Bordawekar |
| 7,318,066 B2 | 1/2008 | Kaufman |
| 7,318,215 B1 | 1/2008 | Krishnan |
| 7,337,163 B1 | 2/2008 | Srinivasan |
| 7,356,802 B2 | 4/2008 | De Sutter |
| 7,360,202 B1 | 4/2008 | Seshadri |
| 7,392,239 B2 | 6/2008 | Fontoura |
| 7,409,673 B2 | 8/2008 | Kuo |
| 7,419,376 B2 | 9/2008 | Sarvazyan |
| 7,421,648 B1 | 9/2008 | Davis |

(56) References Cited

U.S. PATENT DOCUMENTS

| | | |
|---|---|---|
| 7,437,666 B2 | 10/2008 | Ramarao |
| 7,475,070 B2 | 1/2009 | Fan |
| 7,496,892 B2 | 2/2009 | Nuss |
| 7,512,932 B2 | 3/2009 | Davidov |
| 7,536,675 B2 | 5/2009 | Gallagher |
| 7,536,676 B2 | 5/2009 | Baker |
| 7,544,062 B1 | 6/2009 | Hauschild |
| 7,561,927 B2 | 7/2009 | Oyama |
| 7,571,156 B1 | 8/2009 | Gupta |
| 7,571,169 B2 | 8/2009 | Jones |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | Letourneau |
| 7,630,995 B2 | 12/2009 | Letourneau |
| 7,636,727 B2 | 12/2009 | Schiffmann |
| 7,650,592 B2 | 1/2010 | Eckels |
| 7,669,183 B2 | 2/2010 | Bowman |
| 7,681,177 B2 | 3/2010 | Letourneau |
| 7,720,830 B2 | 5/2010 | Wen |
| 7,761,847 B2 | 7/2010 | Kornerup |
| 7,761,858 B2 | 7/2010 | Chang |
| 7,765,183 B2 | 7/2010 | Williams, Jr. |
| 7,779,396 B2 | 8/2010 | Meijer |
| 7,801,923 B2 | 9/2010 | Letourneau |
| 7,827,523 B2 | 11/2010 | Ahmed |
| 7,861,304 B1 | 12/2010 | Nachenberg |
| 7,882,147 B2 | 2/2011 | Letourneau |
| 7,890,471 B2 | 2/2011 | Fan |
| 7,890,927 B2 | 2/2011 | Eldridge |
| 7,890,928 B2 | 2/2011 | Patrudu |
| 7,899,821 B1 | 3/2011 | Schiffmann |
| 7,962,494 B2 | 6/2011 | Furusho |
| 8,005,869 B2 | 8/2011 | Corl |
| 8,020,145 B2 | 9/2011 | Fant |
| 8,032,860 B2 | 10/2011 | Piehler |
| 8,037,102 B2 | 10/2011 | Letourneau |
| 8,060,868 B2 | 11/2011 | Meijer |
| 8,086,998 B2 | 12/2011 | Bansal |
| 8,112,740 B2 | 2/2012 | Meijer |
| 8,151,276 B2 | 4/2012 | Grechanik |
| 8,181,155 B2 | 5/2012 | Pinto |
| 8,203,972 B2 | 6/2012 | Sauermann |
| 8,230,526 B2 | 7/2012 | Holland |
| 8,250,526 B2 | 8/2012 | Anderson |
| 8,307,102 B2 | 11/2012 | Skog |
| 8,316,059 B1 | 11/2012 | Schiffmann |
| 8,332,428 B2 | 12/2012 | Bonneau |
| 8,356,040 B2 | 1/2013 | Letourneau |
| 8,365,137 B2 | 1/2013 | Fant |
| 8,438,534 B2 | 5/2013 | Thomson |
| 8,443,339 B2 | 5/2013 | Letourneau |
| 8,458,191 B2 | 6/2013 | Bhattacharjee |
| 8,484,236 B1 | 7/2013 | Andrews |
| 8,606,794 B2 | 12/2013 | Amer-Yahia |
| 8,612,461 B2 | 12/2013 | Schiffmann |
| 8,615,530 B1 | 12/2013 | Letourneau |
| 8,626,777 B2 | 1/2014 | Letourneau |
| 8,645,346 B2 | 2/2014 | Dumitru |
| 8,650,201 B2 | 2/2014 | Letourneau |
| 8,683,431 B2 | 3/2014 | Thomson |
| 8,745,070 B2 | 6/2014 | Krishnamurthy |
| 8,762,942 B2 | 6/2014 | Langworthy |
| 8,868,621 B2 | 10/2014 | D'Onofrio, II |
| 8,869,106 B2 | 10/2014 | Jazdzewski |
| 8,930,896 B1 | 1/2015 | Wiggins |
| 8,935,232 B2 | 1/2015 | Abadi |
| 8,990,769 B2 | 3/2015 | Letourneau |
| 9,002,862 B2 | 4/2015 | Schiffmann |
| 9,015,202 B2 | 4/2015 | Letourneau |
| 9,020,961 B2 | 4/2015 | Letourneau |
| 9,043,347 B2 | 5/2015 | Letourneau |
| 9,077,515 B2 | 7/2015 | Letourneau |
| 9,167,579 B2 | 10/2015 | Fettweis |
| 9,177,003 B2 | 11/2015 | Letourneau |
| 9,245,050 B2 | 1/2016 | Schiffmann |
| 9,330,128 B2 | 5/2016 | Schiffmann |
| 9,411,841 B2 | 8/2016 | Schiffmann |
| 9,425,951 B2 | 8/2016 | Letourneau |
| 9,430,512 B2 | 8/2016 | Letourneau |
| 9,563,653 B2 | 2/2017 | Letourneau |
| 9,563,663 B2 | 2/2017 | Shukla |
| 9,646,034 B2 | 5/2017 | Schiffmann |
| 9,646,107 B2 | 5/2017 | Letourneau |
| 9,842,130 B2 | 12/2017 | Schiffmann |
| 10,055,438 B2 | 8/2018 | Schiffmann |
| 10,068,003 B2 | 9/2018 | Letourneau |
| 10,140,349 B2 | 11/2018 | Letourneau |
| 10,255,311 B2 | 4/2019 | Letourneau |
| 10,275,489 B1 | 4/2019 | Muniswamy Reddy |
| 10,325,031 B2 | 6/2019 | Letourneau |
| 10,380,039 B2 | 8/2019 | Cooray |
| 10,380,089 B2 | 8/2019 | Letourneau |
| 10,394,785 B2 | 8/2019 | Letourneau |
| 10,411,878 B2 | 9/2019 | Letourneau |
| 10,437,886 B2 | 10/2019 | Andrews |
| 10,713,274 B2 | 7/2020 | Letourneau |
| 10,725,989 B2 | 7/2020 | Schiffmann |
| 10,733,234 B2 | 8/2020 | Letourneau |
| 11,100,070 B2 | 8/2021 | Schiffmann |
| 11,100,137 B2 | 8/2021 | Letourneau |
| 11,194,777 B2 | 12/2021 | Letourneau |
| 11,204,906 B2 | 12/2021 | Letourneau |
| 11,243,975 B2 | 2/2022 | Letourneau |
| 2001/0003211 A1 | 6/2001 | Bera |
| 2001/0037496 A1 | 11/2001 | Simonyi |
| 2002/0023166 A1 | 2/2002 | Bar-Noy |
| 2002/0040292 A1 | 4/2002 | Marcu |
| 2002/0059281 A1 | 5/2002 | Watanabe |
| 2002/0062259 A1 | 5/2002 | Katz |
| 2002/0091676 A1 | 7/2002 | Agrawal |
| 2002/0107860 A1 | 8/2002 | Gobeille |
| 2002/0129129 A1 | 9/2002 | Bloch |
| 2002/0130796 A1 | 9/2002 | Tsuchido |
| 2002/0130907 A1 | 9/2002 | Chi |
| 2002/0133347 A1 | 9/2002 | Schoneburg |
| 2002/0133497 A1 | 9/2002 | Draper |
| 2002/0149604 A1 | 10/2002 | Wilkinson |
| 2002/0169563 A1 | 11/2002 | De Carvalho |
| 2002/0194163 A1 | 12/2002 | Hopeman |
| 2003/0041088 A1 | 2/2003 | Wilson |
| 2003/0065659 A1 | 4/2003 | Agarwal |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su |
| 2003/0195885 A1 | 10/2003 | Emmick |
| 2003/0195890 A1 | 10/2003 | Oommen |
| 2003/0236787 A1 | 12/2003 | Burges |
| 2003/0236794 A1 | 12/2003 | Hostetter |
| 2004/0003028 A1 | 1/2004 | Emmett |
| 2004/0010752 A1 | 1/2004 | Chan |
| 2004/0019599 A1 | 1/2004 | Trappen |
| 2004/0024724 A1 | 2/2004 | Rubin |
| 2004/0024790 A1 | 2/2004 | Everett |
| 2004/0044659 A1 | 3/2004 | Judd |
| 2004/0054692 A1 | 3/2004 | Seyrat |
| 2004/0060006 A1 | 3/2004 | Lindblad |
| 2004/0060007 A1 | 3/2004 | Gottlob |
| 2004/0068498 A1 | 4/2004 | Patchet |
| 2004/0075677 A1 | 4/2004 | Loyall |
| 2004/0103105 A1 | 5/2004 | Lindblad |
| 2004/0122844 A1 | 6/2004 | Malloy |
| 2004/0125124 A1 | 7/2004 | Kim |
| 2004/0160464 A1 | 8/2004 | Reyna |
| 2004/0205047 A1 | 10/2004 | Carpenter |
| 2004/0215642 A1 | 10/2004 | Cameron |
| 2004/0239674 A1 | 12/2004 | Ewald |
| 2004/0254909 A1 | 12/2004 | Testa |
| 2004/0260683 A1 | 12/2004 | Chan |
| 2004/0260684 A1 | 12/2004 | Agarwal |
| 2004/0267958 A1 | 12/2004 | Reed |
| 2004/0268236 A1 | 12/2004 | Chidlovskii |
| 2005/0021548 A1 | 1/2005 | Bohannon |

(56) References Cited

U.S. PATENT DOCUMENTS

| | | |
|---|---|---|
| 2005/0021683 A1 | 1/2005 | Newton |
| 2005/0023524 A1 | 2/2005 | Beatty |
| 2005/0027495 A1 | 2/2005 | Matichuk |
| 2005/0027743 A1 | 2/2005 | O'Neil |
| 2005/0028091 A1 | 2/2005 | Bordawekar |
| 2005/0050016 A1 | 3/2005 | Stanoi |
| 2005/0050066 A1 | 3/2005 | Hughes |
| 2005/0055369 A1 | 3/2005 | Gorelik |
| 2005/0058976 A1 | 3/2005 | Vernon |
| 2005/0060320 A1 | 3/2005 | Bostrom |
| 2005/0060332 A1 | 3/2005 | Bernstein |
| 2005/0065964 A1 | 3/2005 | Ziemann |
| 2005/0065965 A1 | 3/2005 | Ziemann |
| 2005/0097084 A1 | 5/2005 | Balmin |
| 2005/0102636 A1 | 5/2005 | McKeon |
| 2005/0125432 A1 | 6/2005 | Lin |
| 2005/0138073 A1 | 6/2005 | Zhou |
| 2005/0149471 A1 | 7/2005 | Lassalle |
| 2005/0154979 A1 | 7/2005 | Chidlovskii |
| 2005/0156761 A1 | 7/2005 | Oh |
| 2005/0165732 A1 | 7/2005 | Burges |
| 2005/0171962 A1 | 8/2005 | Martin |
| 2005/0187900 A1 | 8/2005 | Letourneau |
| 2005/0195741 A1 | 9/2005 | Doshi |
| 2005/0210014 A1 | 9/2005 | Asano |
| 2005/0214727 A1 | 9/2005 | Stoianovici |
| 2005/0216445 A1 | 9/2005 | Rao |
| 2005/0267908 A1 | 12/2005 | Letourneau |
| 2005/0286788 A1 | 12/2005 | Orr |
| 2006/0004817 A1 | 1/2006 | Andrews |
| 2006/0005122 A1 | 1/2006 | Lemoine |
| 2006/0015538 A1 | 1/2006 | Letourneau |
| 2006/0053122 A1 | 3/2006 | Korn |
| 2006/0074838 A1 | 4/2006 | Srivastava |
| 2006/0095442 A1 | 5/2006 | Letourneau |
| 2006/0095455 A1 | 5/2006 | Letourneau |
| 2006/0123029 A1 | 6/2006 | Letourneau |
| 2006/0129582 A1 | 6/2006 | Schiffmann |
| 2006/0209351 A1 | 9/2006 | Saito |
| 2006/0259533 A1 | 11/2006 | Letourneau |
| 2006/0271573 A1 | 11/2006 | Letourneau |
| 2007/0003917 A1 | 1/2007 | Kitching |
| 2007/0198538 A1 | 8/2007 | Palacios |
| 2008/0270435 A1 | 10/2008 | Furusho |
| 2008/0313196 A1 | 12/2008 | Furusho |
| 2010/0094885 A1 | 4/2010 | Andrews |
| 2010/0094908 A1 | 4/2010 | Letourneau |
| 2010/0114969 A1 | 4/2010 | Letourneau |
| 2010/0191775 A1 | 7/2010 | Schiffmann |
| 2010/0205581 A1 | 8/2010 | Letourneau |
| 2010/0318521 A1 | 12/2010 | Letourneau |
| 2011/0131259 A1 | 6/2011 | Letourneau |
| 2011/0282898 A1 | 11/2011 | Schiffmann |
| 2011/0320499 A1 | 12/2011 | Letourneau |
| 2012/0144388 A1 | 6/2012 | Schiffmann |
| 2013/0151566 A1 | 6/2013 | Letourneau |
| 2013/0198239 A1 | 8/2013 | Letourneau |
| 2014/0040293 A1 | 2/2014 | Letourneau |
| 2014/0184430 A1 | 7/2014 | Jiang |
| 2014/0289266 A1 | 9/2014 | Letourneau |
| 2014/0289278 A1 | 9/2014 | Schiffmann |
| 2014/0289279 A1 | 9/2014 | Letourneau |
| 2014/0362961 A1 | 12/2014 | Letourneau |
| 2015/0193517 A1 | 7/2015 | Letourneau |
| 2015/0220582 A1 | 8/2015 | Letourneau |
| 2015/0242449 A1 | 8/2015 | Schiffmann |
| 2015/0242450 A1 | 8/2015 | Letourneau |
| 2015/0310048 A1 | 10/2015 | Letourneau |
| 2015/0341165 A1 | 11/2015 | Letourneau |
| 2016/0117353 A1 | 4/2016 | Schiffmann |
| 2016/0162528 A1 | 6/2016 | Letourneau |
| 2016/0283611 A1 | 9/2016 | Letourneau |
| 2016/0328431 A1 | 11/2016 | Schiffmann |
| 2016/0359616 A1 | 12/2016 | Letourneau |
| 2017/0032053 A1 | 2/2017 | Letourneau |
| 2017/0053006 A1 | 2/2017 | Letourneau |
| 2017/0132301 A1 | 5/2017 | Letourneau |
| 2017/0255660 A1 | 9/2017 | Letourneau |
| 2018/0107698 A1 | 4/2018 | Schiffmann |
| 2019/0026326 A1 | 1/2019 | Schiffmann |
| 2019/0034510 A1 | 1/2019 | Letourneau |
| 2019/0121795 A1 | 4/2019 | Schiffmann |
| 2019/0129899 A1 | 5/2019 | Letourneau |
| 2019/0171628 A1 | 6/2019 | Letourneau |
| 2019/0236078 A1 | 8/2019 | Letourneau |
| 2019/0356465 A1 | 11/2019 | Letourneau |
| 2019/0377718 A1 | 12/2019 | Letourneau |
| 2019/0384753 A1 | 12/2019 | Letourneau |
| 2019/0384792 A1 | 12/2019 | Andrews |
| 2020/0218707 A1 | 7/2020 | Letourneau |
| 2020/0372041 A1 | 11/2020 | Letourneau |
| 2020/0394168 A1 | 12/2020 | Schiffmann |
| 2020/0394224 A1 | 12/2020 | Letourneau |
| 2021/0149860 A1 | 5/2021 | Letourneau |
| 2021/0349871 A1 | 11/2021 | Letourneau |
| 2022/0043793 A1 | 2/2022 | Letourneau |
| 2022/0043832 A1 | 2/2022 | Letourneau |

OTHER PUBLICATIONS

U.S. Appl. No. 16/209,872 / Issue Notification dated Dec. 1, 2021, 1 page, Doc 2369.

U.S. Appl. No. 17/381,142 / Notice of Publication dated Nov. 11, 2021, 1 page, Doc 2370.

U.S. Appl. No. 16/379,674 / Notice of Allowance/Allowability dated Dec. 8, 2021, 28 pages, Doc 2367.

U.S. Appl. No. 16/909,899 / Response to Non-final Office Action filed Nov. 11, 2021, 27 pages, Doc 2366.

U.S. Appl. No. 16/909,899 / Non-final Office Action dated Jan. 27, 2022, 27 pages, Doc 2371.

U.S. Appl. No. 16/459,930 / Response to Non-final Office Action filed Oct. 12, 2021, 18 pages, Doc 2358.

U.S. Appl. No. 16/459,930 / Notice of Allowance/Allowability dated Dec. 29, 2021, 8 pages, Doc 2372.

U.S. Appl. No. 16/513,021 / Final Office Action dated Nov. 2, 2021, 37 pages, Doc 2359.

U.S. Appl. No. 16/513,021 / Response to Final Office Action filed Feb. 2, 2022, 31 pages, Doc 2374.

U.S. Appl. No. 16/513,021 / Advisory Action dated Feb. 22, 2022, pages, Doc 2375.

U.S. Appl. No. 15/464,205 / Notice of Allowance/Allowability dated Oct. 29, 2021, 105 pages, Doc 2360.

U.S. Appl. No. 16/710,731 / Final Office Action dated Nov. 2, 2021, 39 pages, Doc 2361.

U.S. Appl. No. 16/898,134 / Supplemental Notice of Allowability dated Oct. 14, 2021, 23 pages, Doc 2362.

U.S. Appl. No. 16/898,134 / Supplemental Notice of Allowability dated Oct. 20, 2021, 23 pages, Doc 2363.

U.S. Appl. No. 16/898,134 / Issue Fee and 312 Response filed Dec. 22, 2021, 7 pages, Doc 2376.

U.S. Appl. No. 16/898,134 / Issue Fee Notification dated Jan. 19, 2022, 1 page, Doc 2377.

U.S. Appl. No. 17/565,326 / US Patent Application filed Dec. 29, 2021, 84 pages, Doc 2373.

U.S. Appl. No. 17/565,326/ Filing Receipt date Jan. 13, 2022, 4 pages, Doc 2378.

U.S. Appl. No. 17/565,326 / Notice to File Missing Parts dated Jan. 13, 2022, 2 pages, Doc 2379.

U.S. Appl. No. 16/164,535/ Issue Notification dated Nov. 17, 2021, 1 page, Doc 2368.

U.S. Appl. No. 17/378,119 / Response to Notice to File Corrected Application Papers dated Nov. 3, 2021, 27 pages, Doc 2364.

U.S. Appl. No. 17/378,119 / Notice of Publication dated Feb. 10, 2022, 1 page, Doc 2380.

"Core Technology Benchmarks A White Paper" (Jul. 2002), downloaded from the internet Mar. 2, 2004, 11 pages, Doc 2178.

"Origin Data, Inc. White Paper" (1999) pp. 1-13, 14 pages, Doc 2179.

(56) References Cited

OTHER PUBLICATIONS

ACM Portal Search—"The Art of Computer Programming", Fundamental Algorithms, 1 (1973), ACM Portal Search Results conducted by Examiner on Jul. 18, 2009, 6 pages, Doc 2180.
ACM Portal Search—"The Associative Model of Data White Paper", Lazy Software (2000), ACM Portal Search Results conducted by Examiner on Jul. 18, 2009, 1 page, Doc 2181.
Alderson, "Toward An Optimization Driven Framework for Designing and Generating Realistic Internet Topologies", Journal of the Association for Computing Machinery SIGCOMM Computer Communications Review 41, 33(1) (2003) pp. 41-46, 6 pages, Doc 2182.
Apostol, "A Centennial History of the Prime Number Theorem", Engineering and Science, 4, (1996), 10 pages, Doc 2183.
Benedikt, "Definable Relations and First-Order Query Languages over Strings", Journal of the Journal of the Association for Computing Machinery, 50 (2003) pp. 694-751, 58 pages, Doc 2186.
Boppana, "Full Fault Dictionary Storage Based on Labeled Tree Encoding", 14th VLSI Test Symposium (1996) pp. 174-179, 6 pages, Doc 2185.
Borodin, "A Tradeoff Between Search and Update Time for the Implicit Dictionary Problem", Theoretical Computer Science, 1(4) (1990), pp. 425-447, 12 pages, Doc 2184.
Cano, "Lazy Evaluation in Penniless Propagation Over Join Trees", Networks, 39(4) (2002), pp. 175-185, 11 pages, Doc 2187.
Caviness, "Simplification of Radical Expressions", Journal of the Association for Computing Machinery (1976), pp. 329-338, 10 pages, Doc 2188.
Coenen, "T-Trees, Vertical Partitioning and Distributed Association Rule Mining", IEEE (2003), 4 pages, Doc 2191.
COLE—"Tree Pattern Matching and Subset Matching in Deterministic O(n log 3 n)-time", Proceedings of the Tenth Annual Association for Computing Machinery-SIAM Symposium on Discrete Algorithms, (1999) pp. 1-10, 10 pages, Doc 2189.
Cooper, "Oh! Pascal!", Arrays for Random Access (1982) pp. 295-327, 18 pages, Doc 2190.
Dubiner—"Faster Tree Pattern Matching", Journal of the Association for Computing Machinery, 41(2) (1994) pp. 205-213, 9 pages, Doc 2192.
Durango Bill's—"Enumeration of Trees", http://web.archive.org/web/20021028184112/http://www.durangobill.com/Trees.html (1998), 3 pages, Doc 2193.
Er, "Enumerating Ordered Trees Lexicographically", Computation Journal, 28 (1985) pp. 538-542, 5 pages, Doc 2194.
Ferragina, "The String B-Tree: A New Data Structure for String Search in External Memory and Its Applications", Journal of the Association for Computing Machinery, 46(2) (1999) pp. 236-280, 45 pages, Doc 2196.
Fluri, "Change Distilling: Tree Differencing for Fine-Grained Source Code Change Extraction", IEEE pp. 725-743 (2007), Doc 2354.
Google search (Kleene prime number enumeration operation natural numerals sequences "Kleene prime") conducted by Examiner on Jul. 18, 2009, 2 pages, Doc 2195.
Google search (Kleene prime number enumeration operation natural numerals sequences "enumeration operation") conducted by Examiner on Jul. 18, 2009, 2 pages, Doc 2197.
Google search (Kleene prime enumeration operation) conducted by Examiner on Jul. 18, 2009, 2 pages, Doc 2198.
Hirschberg, "Algorithm for Computing Maximal Common Subsequences", Journal of the Association for Computing Machinery, 18(6) (1975) pp. 341-343, 3 pages, Doc 2199.
Hoffmann, "Pattern Matching in Trees" 29(1) (1982) pp. 68-95 28 pages, Doc 2200.
Iacob, "Xpath Extension for Querying Concurrent XML Markup," Technical Report #TR-394-04, Department of Computer Science, University of Kentucky (2004), 15 pages, Doc 2201.
IEEE Explore Digital Library Search Result Conducted by Examiner on Jul. 18, 2009, 1 page, Doc 2202.

Jaiswal, "Local Pattern Transformation Based Feature Extraction Techniques for Classification of Epileptic EEG Signals", Biomedical Signal Processing and Control (2017) pp. 81-92, 12 pages, Doc 2205.
Johnston, "Advances in Dataflow Programming Languages", Journal of the Association for Computing Machinery Computing Surveys, 36 (2004) pp. 1-34, 34 pages, Doc 2203.
Katajainen, "Tree Compression and Optimization with Applications", International Journal of Foundations of Computer Science, 1(4) 1990, pp. 425-447, 24 pages, Doc 2204.
Kharbutli, "Using Prime Numbers for Cache Indexing to Eliminate Conflict Misses" North Carolina State University Dept. of Electronical and Computer Engineering (2004) 24 pages, Doc 2206.
Kilpelainen, "Tree Matching Problems with Applications to Structured Text Databases," University of Helsinki Ph. D. Dissertation, Report A-1992-6 (1992) pp. 1-109, 113 pages, Doc 2207.
Knott—"A Balanced Tree Storage and Retrieval Algorithm" ACM pp. 175-196, 1971, Doc 2296.
Knuth—"The Art of Computer Programming", Fundamental Algorithms, 1 (1973), pp. 162-163, 3 pages, Doc 2208.
Krishna, "A VLSI Architecture for Object Recognition Using Tree Matching", IEEE International Conference on Application-Specific Systems, Architecture and Processors (2000), 78 pages, Doc 2226.
Leinonen, "Automation of Document Structure Transformations", University of Kuopio (2004) 68 pages, Doc 2209.
Lerman, "Learning the Common Structure of Data," American Association for Artificial Intelligence, AAAI-00 Proceedings (2000) 6 pages, Doc 2210.
Letourneau, "The Elementary Theory of Object Oriented Arithmetic" (1990) pp. 1-9, 9 pages, Doc 2211.
Li—"An Immediate Approach to Balancing Nodes in Binary Search Trees" ACM, pp. 238-245, 2006, Doc 2242.
Malhotra "A Methodology for Formal Expression of Hierarchy in Model Solution", IEEE (1983) pp. 258-267, 10 pages, Doc 2244.
Minn, "Linear Transformation of Multi-Level Signal Set in Multi-Code CDMA", IEEE (2001) pp. 1239-1243, 5 pages, Doc 2214.
Murray, "Code Transformation and Instruction Set Extension", Journal of the Association for Computing Machinery (2009) pp. 1-31, 32 pages, Doc 2215.
Navarro, "A Guided Tour to Approximate String Matching", Journal of the Association for Computing Machinery Computing Surveys, 33 (2001) pp. 31-88, 58 pages, Doc 2213.
Neven, "Expressive and Efficient Pattern Languages for Tree-Structured Data," Proceedings of the 19th Association for Computing Machinery SIGACT-SIGMOD-SIGART Symposium on Principles of Database Systems (2000), 12 pages, Doc 2216.
Paik, "Mining Association Rules in Tree Structured XML Data" ACM, pp. 807-811, 2009, 5 pages, Doc 2243.
Prasad, "Efficient Bit-Parallel Multi-Patterns String Matching Algorithms for Limited Expression", Journal of the Association for Computing Machinery (2010) pp. 1-6, 6 pages, Doc 2217.
Ramesh—"Nonlinear Pattern Matching in Trees", Journal of the Association for Computer Machinery, 39 (1992) pp. 295-316, 22 pages, Doc 2218.
Reiss, "Semantics-Based Code Search", IEEE ICSE (2009) pp. 243-253, 11 pages, Doc 2219.
Rizum, "Code Transformation by Direct Transformation of ASTs", Journal of the Association for Computing Machinery (2015) pp. 1-7, 7 pages, Doc 2220.
Sahinalp, "Distance Based Indexing for String Proximity Search", IEEE, pp. 125-136 (2003), Doc 2355.
Schmidt, "Comparison of Tree and Graph Encodings as Function of Problem Complexity", Journal of the Association for Computing Machinery (2007) pp. 1674-1679, 6 pages, Doc 2221.
Sechrest, "Blending Hierarchical and Attribute-Based File Naming", Distributed Computing System of the 12th International Conference (1992), pp. 572-580, 9 pages, Doc 2222.
Shanmugasundaram, "Querying SML Views of Relational Data" 27th VLDB Conference (2001), 9 pages, Doc 2223.
Siegel, "All Searches Are Divided into Three Parts String Searches Using Ternary Trees", Journal of the Association for Computing Machinery (1988) pp. 57-68, 12 pages, Doc 2224.

(56) References Cited

OTHER PUBLICATIONS

Sinha, "Efficient Trie Based Sorting of Large Sets of Strings", Journal of the Association for Computing Machinery (2003) pp. 1-8, 8 pages, Doc 2225.
Smorynski, "Logical Number Theory 1: An Introduction", Springer-Verlag (1991) pp. 14-23, 305, 16 pages, Doc 2227.
Somani, "Phased-Mission System Analysis Using Boolean Algebraic Methods" 22(1) (1994), 10 pages, Doc 2228.
Spinellis, "Declarative Peephole Optimization Using String Pattern Matching", Journal of the Association for Computing Machinery (1999) pp. 47-51, 5 pages, Doc 2229.
Sproat, "Compilation of Weighted Finite-State Transducers from Decision Trees", Journal of the Association for Computing Machinery (1996) pp. 215-222, 8 pages, Doc 2230.
Stanat, "Discrete Mathematics in Computer Science," (1977) pp. 131-145, 16 pages, Doc 2231.
Stefanov "Algorithmic Transformation Techniques for Efficient Exploration of Alternative Application Instances" Journal for the Association for Computing Machinery (ACM) (2002) pp. 7-12, 6 pages, Doc 2234.
Talukdar, "Learning to Create Data-Integrating Queries", Journal of the Association for Computing Machinery PVLDB (2008) pp. 785-796, 12 pages, Doc 2232.
Thiemann, "Grammar Based Analysis of String Expressions", Journal of the Association for Computing Machinery (2005) pp. 59-70, 12 pages, Doc 2233.
Valiente, "Algorithms on Trees and Graphs", Tree Isomorphism (2002) pp. 151-251, 100 pages, Doc 2235.
Valiente, "Tree Isomorphism", Algorithms on Trees and Graphs (2002), 51 pages, Doc 2236.
Vion-Dury, "Experimenting with the Circus Language for XML Modeling and Transformation", ACM pp. 82-87 (2002), Doc 2352.
Wagner, "The String-to-String Correction Problem", Journal of the Association for Computing Machinery, 21(1) (1974) pp. 168-173, 9 pages, Doc 2237.
Wu, "A Prime Number Labeling Scheme for Dynamic Ordered XML Trees", IEEE (2004) 13 pages, Doc 2238.
Xie, "S-Looper: Automatic Summarization for Multipath String Loops", Journal of the Association for Computing Machinery, (2015) pp. 188-198, 11 pages, Doc 2239.
Yang, "Interactive Hierarchical Dimension Ordering, Spacing and Filtering for Exploration of High Dimensional Datasets", IEEE, pp. 1-8 (Year: 2013), 8 pages, Doc 2324.
Yates, "A New Approach to Text Searching", Communication of the Journal of the Association for Computing Machinery, 35(1) (1992) pp. 74-82, 9 pages, Doc 2240.
Zaks, "Lexicographic Generation of Ordered Trees," The Journal of Theoretical Computer Science, 10(1) (1980) pp. 63-82, 11 pages, Doc 2241.
Zanibbi, "Recognizing Mathematical Expressions Using Tree Transformation," IEEE, pp. 1455-1467 (2002), Doc 2353.
Zhang, "B ed-Tree: An All-Purpose Index Structure for String Similarity Search Based on Edit Distance", ACM, pp. 915-926 (2010), Doc 2351.
U.S. Appl. No. 11/005,859/ Patent Application filed Dec. 6, 2004, 124 pages, Doc 1070.
U.S. Appl. No. 11/005,859 / Notice to File Missing Parts, Jan. 10, 2002, 2 pages, Doc 1071.
U.S. Appl. No. 11/005,859 / Response to Notice to File Missing Parts, Mar. 29, 2005, 9 pages, Doc 1072.
U.S. Appl. No. 11/005,859/ Preliminary Amendment, Apr. 28, 2005, 193 pages, Doc 1073.
U.S. Appl. No. 11/005,859/ Restriction Requirement, 12/12/007, 7 pages, Doc 1074.
U.S. Appl. No. 11/005,859 / Response to Restriction Requirement, dated Jan. 14, 2008, 82 pages, Doc 1075.
U.S. Appl. No. 11/005,859/ Office Action, dated Mar. 21, 2008, 21 pages, Doc 1076.
U.S. Appl. No. 11/005,859 / Response to Office Action, dated Jul. 21, 2008, 89 pages, Doc 1077.
U.S. Appl. No. 11/005,859/ Final Office Action, dated Oct. 30, 2008, 14 pages, Doc 1078.
U.S. Appl. No. 11/005,859/ Response to Final Office Action, dated Dec. 30, 2008, 84 pages, Doc 1079.
U.S. Appl. No. 11/005,859/ Advisory Action, dated Jan. 13, 2009, 3 pages, Doc 1080.
U.S. Appl. No. 11/005,859/ RCE Amendment, Apr. 30, 2009, 88 pages, Doc 1081.
U.S. Appl. No. 11/005,859 / Final Office Action, dated Jul. 8, 2009, 8 pages, Doc 1082.
U.S. Appl. No. 11/005,859/ Interview Summary, dated Oct. 27, 2009, 3 pages, Doc 1083.
U.S. Appl. No. 11/005,859/ Response to Final Office Action, dated Dec. 8, 2009, 85 pages, Doc 1084.
U.S. Appl. No. 11/005,859/ Advisory Action, dated Dec. 22, 2009, 2 pages, Doc 1085.
U.S. Appl. No. 11/005,859/ RCE Amendment, Jan. 7, 2010, 87 pages, Doc 1086.
U.S. Appl. No. 11/005,859/ Office Action, dated Jan. 21, 2010, 17 pages, Doc 1087.
U.S. Appl. No. 11/005,859 / Response to Office Action, dated Feb. 25, 2020, 85 pages, Doc 1088.
U.S. Appl. No. 11/005,859 / Final Office Action, dated Jun. 8, 2010, 9 pages, Doc 1089.
U.S. Appl. No. 11/005,859/ Response to Final Office Action, dated Sep. 1, 2010, 91 pages, Doc 1090.
U.S. Appl. No. 11/005,859/ Advisory Action, dated Sep. 14, 2010, 7 pages, Doc 1091.
U.S. Appl. No. 11/005,859/ Notice of Appeal, Sep. 29, 2010, 3 pages, Doc 1092.
U.S. Appl. No. 11/005,859/ Office Action, dated Oct. 15, 2010, 5 pages, Doc 1093.
U.S. Appl. No. 11/005,859/ Response to Office Action, dated Jan. 18, 2011, 97 pages, Doc 1094.
U.S. Appl. No. 11/005,859 / Final Office Action, dated Mar. 30, 2011, 8 pages, Doc 1095.
U.S. Appl. No. 11/005,859/ Proposed Examiner's Amendment, dated May 4, 2011, 4 pages, Doc 1096.
U.S. Appl. No. 11/005,859/ Clarification of Examiner's Amendment, dated May 11, 2011, 4 pages, Doc 1097.
U.S. Appl. No. 11/005,859/ Notice of Allowance, dated Jun. 9, 2011, 19 pages, Doc 1098.
U.S. Appl. No. 11/005,859/ Issue Fee, Sep. 9, 2011, 6 pages, Doc 1099.
U.S. Appl. No. 11/005,859/ Issue Notification, dated Sep. 21, 2011, 1 page, Doc 1100.
U.S. Appl. No. 13/229,624/ Application, Sep. 9, 2011, 137 pages, Doc 1101.
U.S. Appl. No. 13/229,624/ Filing Receipt, Sep. 21, 2011, 3 pages, Doc 1102.
U.S. Appl. No. 13/229,624/ Office Action, dated Nov. 23, 2011, 8 pages, Doc 1104.
U.S. Appl. No. 13/229,624/ Notice of Publication, Dec. 29, 2011, 1 page, Doc 1103.
U.S. Appl. No. 13/229,624 / Response to Office Action, dated Feb. 23, 2012, 24 pages, Doc 1105.
U.S. Appl. No. 13/229,624 / Final Office Action, dated Mar. 20, 2012, 10 pages, Doc 1106.
U.S. Appl. No. 13/229,624 / Response to Final Office Action, dated Jun. 13, 2012, 25 pages, Doc 1107.
U.S. Appl. No. 13/229,624 / Advisory Action, dated Jun. 20, 2012, 3 pages, Doc 1108.
U.S. Appl. No. 13/229,624/ RCE Amendment, Jul. 20, 2012, 28 pages, Doc 1109.
U.S. Appl. No. 13/229,624/ Office Action, dated Oct. 2, 2013, 38 pages, Doc 1110.
U.S. Appl. No. 13/229,624 / Response to Office Action, dated Dec. 27, 2013, 13 pages, Doc 1111.
U.S. Appl. No. 13/229,624/ Office Action, dated Apr. 4, 2014, 9 pages, Doc 1112.
U.S. Appl. No. 13/229,624 / Response to Office Action, dated Aug. 1, 2014, 11 pages, Doc 1113.

(56) References Cited

OTHER PUBLICATIONS

U.S. Appl. No. 13/229,624/ Final Office Action, dated Oct. 30, 2014, 9 pages, Doc 1114.
U.S. Appl. No. 13/229,624 / Response to Final Office Action, dated Jan. 30, 2015, 13 pages, Doc 1115.
U.S. Appl. No. 13/229,624/ Advisory Action, dated Mar. 11, 2015, 3 pages, Doc 1116.
U.S. Appl. No. 13/229,624/ Interview Summary, dated Mar. 19, 2015, 3 pages, Doc 1117.
U.S. Appl. No. 13/229,624/ Interview Summary, dated Mar. 27, 2015, 4 pages, Doc 1118.
U.S. Appl. No. 13/229,624 / Response to Advisory Action & Final Office Action, dated Mar. 27, 2015, 18 pages, Doc 1119.
U.S. Appl. No. 13/229,624/ Advisory Action, dated Apr. 15, 2015, 6 pages, Doc 1120.
U.S. Appl. No. 13/229,624/ RCE Amendment, Apr. 27, 2015, 19 pages, Doc 1121.
U.S. Appl. No. 13/229,624 / Notice of Allowance, dated Jul. 6, 2015, 10 pages, Doc 1122.
U.S. Appl. No. 13/229,624 / Issue Fee, Sep. 28, 2015, 6 pages, Doc 1123.
U.S. Appl. No. 13/229,624/ Issue Notification, dated Oct. 14, 2015, 1 page, Doc 1124.
U.S. Appl. No. 14/870,744/ Application, Sep. 30, 2015, 131 pages, Doc 1125.
U.S. Appl. No. 14/870,744/ Preliminary Amendment, dated Oct. 6, 2015, 12 pages, Doc 1128.
U.S. Appl. No. 14/870,744/ Filing Receipts Notice to File Missing Parts, Oct. 16, 2015, 5 pages, Doc 1126.
U.S. Appl. No. 14/870,744 / Response to Notice to File Missing Parts, Feb. 19, 2016, 6 pages, Doc 1129.
U.S. Appl. No. 14/870,744/ Updated Filing Receipts Informational Notice, Mar. 2, 2016, 4 pages, Doc 1130.
U.S. Appl. No. 14/870,744 / Notice of Publication, Jun. 9, 2016, 1 page, Doc 1127.
U.S. Appl. No. 14/870,744/ Response to Informational Notice, Jun. 22, 2016, 5 pages, Doc 1131.
U.S. Appl. No. 14/870,744 / Office Action, dated Aug. 24, 2017, 58 pages, Doc 1132.
U.S. Appl. No. 14/870,744/ Response to Office Action, dated Nov. 24, 2017, 32 pages, Doc 1133.
U.S. Appl. No. 14/870,744 / Final Office Action, dated Mar. 30, 2018, 30 pages, Doc 1134.
U.S. Appl. No. 14/870,744 / Response to Final Office Action, dated May 30, 2018, 35 pages, Doc 1135.
U.S. Appl. No. 14/870,744/ Advisory Action, dated Jul. 3, 2018, 7 pages, Doc 1136.
U.S. Appl. No. 14/870,744/ RCE Amendment, Jul. 27, 2018, 35 pages, Doc 1137.
U.S. Appl. No. 14/870,744/ Notice of Allowance, dated Sep. 6, 2018, 11 pages, Doc 1138.
U.S. Appl. No. 14/870,744/ Issue Fee, Dec. 4, 2018, 21 pages, Doc 1139.
U.S. Appl. No. 14/870,744/ Interview Summary, dated Mar. 8, 2019, 2 pages, Doc 1140.
U.S. Appl. No. 14/870,744/ Issue Notification, dated Mar. 20, 2019, 1 page, Doc 1141.
U.S. Appl. No. 16/209,872 / Application, Dec. 4, 2018, 134 pages, Doc 1142.
U.S. Appl. No. 16/209,872/ Filing Receipt & Notice to File Missing Parts, Dec. 28, 2018, 5 pages, Doc 1143.
U.S. Appl. No. 16/209,872/ Preliminary Amendment and Response to Notice to File Missing Parts, Feb. 21, 2019, 20 pages, Doc 1145.
U.S. Appl. No. 16/209,872 / Update Filing Receipt, Feb. 26, 2019, 3 pages, Doc 1146.
U.S. Appl. No. 16/209,872 / Notice of Publication, Jun. 6, 2019, 1 page, Doc 1144.
U.S. Appl. No. 16/209,872 / Office Action, dated Sep. 17, 2020, 63 pages, Doc 2155.
U.S. Appl. No. 16/209,872 / Response to Office Action, dated Sep. 17, 2020, 63 pages, Doc 2156.
U.S. Appl. No. 16/209,872 / Terminal Disclaimer, Sep. 17, 2020, 6 pages, Doc 2157.
U.S. Appl. No. 16/209,872 / Notice of Allowance and Allowability dated Mar. 26, 2021, 17 pages, Doc 2171.
U.S. Appl. No. 16/209,872 / 312 Amendment After filed Apr. 30, 2021, 11 pages, Doc 2245.
U.S. Appl. No. 16/209,872/ Response to 312 Amendment dated Jun. 10, 2021, 4 pages, Doc 2297.
U.S. Appl. No. 16/209,872 / Request for Continued Examination and Amendment filed Jun. 25, 2021, 17 pages, Doc 2299.
U.S. Appl. No. 16/209,872 / Notice of Allowance/Allowability dated Jul. 13, 2021, 12 pages, Doc 2314.
U.S. Appl. No. 16/820,457 /Attorney Ref. No. 151.P001DC3, Application and Preliminary Amendment filed Mar. 16, 2020, 148 pages, Doc 1147.
U.S. Appl. No. 16/820,457 / Filing Receipt, Mar. 31, 2020, 3 pages, Doc 1148.
U.S. Appl. No. 16/820,457/ Notice of Publication, Jul. 9, 2020, 1 page, Doc 1149.
U.S. Appl. No. 16/820,457 / Supplemental Preliminary Amendment filed Jul. 30, 2021, 17 pages, Doc 2315.
U.S. Appl. No. 17/158,804/ Patent Application filed Jan. 26, 2021, 146 pages, Doc 2158.
U.S. Appl. No. 17/158,804/ Filing Receipt dated Feb. 9, 2021, 5 pages, Doc 2172.
U.S. Appl. No. 17/158,804 / Notice of Publication dated Feb. 9, 2021, 1 page, Doc 2246.
U.S. Appl. No. 17/158,804/ Supplemental Preliminary Amendment filed Jul. 30, 2021, 14 pages, Doc 2316.
U.S. Appl. No. 17/381,142 / Patent Application and Preliminary Amendment filed Jul. 20, 2021, 146 pages, Doc 2317.
U.S. Appl. No. 17/381,142 / Filing Receipt dated Aug. 3, 2021, 4 pages, Doc 2318.
U.S. Appl. No. 11/007,139 / Application filed Dec. 7, 2004, 90 pages, Doc 1152.
U.S. Appl. No. 11/007,139 / Notice to File Missing Parts dated Jan. 19, 2005, 2 pages, Doc 1153.
U.S. Appl. No. 11/007,139 / Response to Notice to File Missing Parts dated Mar. 29, 2005, 9 pages, Doc 1154.
U.S. Appl. No. 11/007,139/ Preliminary Amendment dated Apr. 28, 2005, 146 pages, Doc 1155.
U.S. Appl. No. 11/007,139/ Office Action, dated May 14, 2007, 2 pages, Doc 1156.
U.S. Appl. No. 11/007,139/ Response to Office Action dated Oct. 15, 2007, 29 pages, Doc 1157.
U.S. Appl. No. 11/007,139 / Supplemental Amendment dated Oct. 17, 2007, 6 pages, Doc 1158.
U.S. Appl. No. 11/007,139/ Office Action dated Jan. 2, 2008, 15 pages, Doc 1159.
U.S. Appl. No. 11/007,139 / Response to Office Action dated Apr. 2, 2008, 29 pages, Doc 1160.
U.S. Appl. No. 11/007,139 / Final Office Action dated Aug. 15, 2008, 22 pages, Doc 1161.
U.S. Appl. No. 11/007,139/ Response to Final Office Action dated Oct. 15, 2008, 25 pages, Doc 1162.
U.S. Appl. No. 11/007,139/ Advisory Action dated Oct. 22, 2008, 3 pages, Doc 1163.
U.S. Appl. No. 11/007,139/ RCE Amendment dated Nov. 14, 2008, 29 pages, Doc 1164.
U.S. Appl. No. 11/007,139/ Office Action, dated Dec. 8, 2008, 17 pages, Doc 1165.
U.S. Appl. No. 11/007,139 / Response to Office Action dated May 8, 2009, 28 pages, Doc 1166.
U.S. Appl. No. 11/007,139 / Final Office Action dated Aug. 4, 2009, 18 pages, Doc 1167.
U.S. Appl. No. 11/007,139/ Response to Final Office Action dated Dec. 4, 2009, 25 pages, Doc 1168.
U.S. Appl. No. 11/007,139/ Advisory Action dated Dec. 14, 2009, 3 pages, Doc 1169.
U.S. Appl. No. 11/007,139/ RCE Amendment dated Jan. 4, 2010, 3 pages, Doc 1170.

(56) References Cited

OTHER PUBLICATIONS

U.S. Appl. No. 11/007,139/ Office Action dated Jan. 27, 2010, 31 pages, Doc 1171.
U.S. Appl. No. 11/007,139 / Response to Office Action dated Apr. 27, 2010, 30 pages, Doc 1172.
U.S. Appl. No. 11/007,139 / Final Office Action dated Jul. 20, 2010, 22 pages, Doc 1173.
U.S. Appl. No. 11/007,139/ Response to Final Office Action dated Oct. 20, 2010, 35 pages, Doc 1174.
U.S. Appl. No. 11/007,139/ Advisory Action dated Oct. 25, 2010, 2 pages, Doc 1175.
U.S. Appl. No. 11/007,139/ Response to Final Office Action and Advisory Action dated Nov. 18, 2010, 26 pages, Doc 1176.
U.S. Appl. No. 11/007,139/ Advisory Action dated Dec. 1, 2010, 4 pages, Doc 1177.
U.S. Appl. No. 11/007,139 / Notice of Appeal dated Dec. 20, 2010, 3 pages, Doc 1178.
U.S. Appl. No. 11/007,139/ Response to Final Office Action and Advisory Action, dated Dec. 20, 2010, 30 pages, Doc 1179.
U.S. Appl. No. 11/007,139/ Office Action dated Jan. 3, 2011, 24 pages, Doc 1180.
U.S. Appl. No. 11/007,1391 / Response to Office Action dated May 3, 2011, 29 pages, Doc 1181.
U.S. Appl. No. 11/007,139 / Final Office Action dated Jul. 18, 2011, 23 pages, Doc 1182.
U.S. Appl. No. 11/007,139/ Response to Final Office Action dated Oct. 18, 2011, 32 pages, Doc 1183.
U.S. Appl. No. 11/007,139 / Advisory Office Action dated Nov. 4, 2011, 12 pages, Doc 1184.
U.S. Appl. No. 11/007,139/ Notice of Appeal dated Nov. 16, 2011, 4 pages, Doc 1185.
U.S. Appl. No. 11/007,139/ Appeal Brief dated May 1, 2012, 91 pages, Doc 1186.
U.S. Appl. No. 11/007,139/Attorney Ref. No. 151.P002, Notice of Non-Compliant Appeal Brief dated May 7, 2012, 3 pages, Doc 1187.
U.S. Appl. No. 11/007,139 / Response to Notice of Non-Compliant Appeal Brief dated May 15, 2012, 9 pages, Doc 1188.
U.S. Appl. No. 11/007,139/ Examiner's Answer dated Aug. 20, 2012, 35 pages, Doc 1189.
U.S. Appl. No. 11/007,139/ Reply Brief dated Oct. 22, 2012, 29 pages, Doc 1190.
U.S. Appl. No. 11/007,139 / Patent Trial and Appeal Board Docketing Notice dated Nov. 6, 2012, 2 pages, Doc 1191.
U.S. Appl. No. 11/007,139 / Decision on Appeal dated Jul. 24, 2015, 8 pages, Doc 1192.
U.S. Appl. No. 11/007,139 / RCE and Amendment dated Aug. 19, 2015, 21 pages, Doc 1193.
U.S. Appl. No. 11/007,139/ Office Action dated Dec. 31, 2015, 24 pages, Doc 1194.
U.S. Appl. No. 11/007,139 / Response to Office Action dated Mar. 28, 2016, 21 pages, Doc 1195.
U.S. Appl. No. 11/007,139 / Final Office Action dated Jun. 20, 2016, 13 pages, Doc 1196.
U.S. Appl. No. 11/007,139/ Response to Final Office Action dated Jul. 29, 2016, 19 pages, Doc 1197.
U.S. Appl. No. 11/007,139 / Notice of Allowance dated Aug. 23, 2016, 12 pages, Doc 1198.
U.S. Appl. No. 11/007,139/ Corrected Filing Receipt, Sep. 2, 2016, 3 pages, Doc 1199.
U.S. Appl. No. 11/007,139/ Application Data Sheet dated Oct. 24, 2016, 10 pages, Doc 1200.
U.S. Appl. No. 11/007,139/ Notice of Allowance dated Dec. 29, 2016, 14 pages, Doc 1201.
U.S. Appl. No. 11/007,139 / Issue Fee dated Mar. 23, 2017, 6 pages, Doc 1202.
U.S. Appl. No. 11/007,139 / Issue Notification dated Apr. 19, 2017, 1 page, Doc 1203.
U.S. Appl. No. 15/043,267 / Application dated Feb. 12, 2016, 104 pages, Doc 1204.
U.S. Appl. No. 15/043,267 / Filing Receipt dated Mar. 7, 2016, 3 pages, Doc 1205.
U.S. Appl. No. 15/043,267 / Informational Notice dated Mar. 7, 2016, 1 page, Doc 1206.
U.S. Appl. No. 15/043,267 / Request to Submit Priority Claim and Preliminary Amendment dated Jun. 10, 2016, 11 pages, Doc 1208.
U.S. Appl. No. 15/043,267 / Response to Informational Notice dated Oct. 14, 2016, 5 pages, Doc 1209.
U.S. Appl. No. 15/043,267 / Corrected Filing Receipt dated Oct. 25, 2016, 3 pages, Doc 1211.
U.S. Appl. No. 15/043,267 / Notice of Publication dated Feb. 2, 2017, 1 page, Doc 1207.
U.S. Appl. No. 15/043,267 / Office Action dated Apr. 2, 2019, 80 pages, Doc 1210.
U.S. Appl. No. 15/043,267 / Response to Office Action dated Jul. 2, 2019, 24 pages, Doc 1212.
U.S. Appl. No. 15/043,267/ Final Office Action dated Oct. 18, 2019, 14 pages, Doc 1213.
U.S. Appl. No. 15/043,267 / Response to Final Office Action dated Jan. 21, 2020, 20 pages, Doc 1214.
U.S. Appl. No. 15/043,267/ Advisory Action dated Jan. 29, 2020, 12 pages, Doc 1215.
U.S. Appl. No. 15/043,267/ RCE Amendment dated Mar. 3, 2020, 21 pages, Doc 1216.
U.S. Appl. No. 15/043,267 / Notice of Allowance dated Mar. 23, 2020, 9 pages, Doc 1217.
U.S. Appl. No. 15/043,267 / Issue Fee Payment, dated Jun. 23, 2020, 18 pages, Doc 1218.
U.S. Appl. No. 15/043,267 / Issue Notification dated Jul. 15, 2020, 1 page, Doc 1219.
U.S. Appl. No. 16/911,282 / Application filed Jun. 24, 2020, 98 pages, Doc 1220.
U.S. Appl. No. 16/911,282/ Filing Receipt and Notice to File Missing Parts dated Jul. 7, 2020, 7 pages, Doc 1221.
U.S. Appl. No. 16/911,282/ Preliminary Amendment and Response to Notice to File Missing Parts filed Sep. 8, 2020, 18 pages, Doc 2145.
U.S. Appl. No. 16/911,282 / Updated Filing Receipt dated Sep. 10, 2020, 5 pages, Doc 2146.
U.S. Appl. No. 16/911,282 / Notice of Publication dated Dec. 17, 2020, 1 page, Doc 2159.
U.S. Appl. No. 11/006,320 / Application filed Dec. 6, 2004, 75 pages, Doc 1223.
U.S. Appl. No. 11/006,320 / Notice to File Missing Parts dated Feb. 7, 2005, 2 pages, Doc 1224.
U.S. Appl. No. 11/006,320 / Response to Notice to File Missing Parts dated May 6, 2005, 140 pages, Doc 1225.
U.S. Appl. No. 11/006,320 / Notice of Publication dated Jan. 19, 2006, 1 page, Doc 1226.
U.S. Appl. No. 11/006,320/ Restriction Requirement dated Mar. 26, 2007, 6 pages, Doc 1227.
U.S. Appl. No. 11/006,320/ Response to Restriction Requirement dated Apr. 27, 2007, 32 pages, Doc 1228.
U.S. Appl. No. 11/006,320/ Notice of Non-Compliant Amendment dated Jul. 6, 2007, 3 pages, Doc 1229.
U.S. Appl. No. 11/006,320 / Attorney Ref. No. 151.P003, Response to Notice of Non-Compliant Amendment dated Jul. 25, 2007, 32 pages, Doc 1230.
U.S. Appl. No. 11/006,320 / Office Action dated Oct. 1, 2007, 19 pages, Doc 1231.
U.S. Appl. No. 11/006,320 / Response to Office Action dated Jan. 29, 2008, 42 pages, Doc 1232.
U.S. Appl. No. 11/006,320/ Notice of Non-Compliant Amendment dated Apr. 8, 2008, 4 pages, Doc 1233.
U.S. Appl. No. 11/006,320 / Response to Notice of Non-Compliant Amendment dated May 5, 2008, 43 pages, Doc 1234.
U.S. Appl. No. 11/006,320 / Office Action dated Aug. 15, 2008, 28 pages, Doc 1235.
U.S. Appl. No. 11/006,320 / Response to Office Action dated Nov. 14, 2008, 39 pages, Doc 1236.
U.S. Appl. No. 11/006,320 / Office Communication dated Jan. 27, 2009, 2 pages, Doc 1237.

(56) References Cited

OTHER PUBLICATIONS

U.S. Appl. No. 11/006,320 / Response to Office Communication dated Apr. 27, 2009, 43 pages, Doc 1238.
U.S. Appl. No. 11/006,320 / Final Office Action dated Jul. 29, 2009, 7 pages, Doc 1239.
U.S. Appl. No. 11/006,3201 / Response to Final Office Action dated Nov. 30, 2009, 8 pages, Doc 1240.
U.S. Appl. No. 11/006,320 / Office Action, dated Dec. 4, 2009, 12 pages, Doc 1241.
U.S. Appl. No. 11/006,320 / Response to Office Action filed Feb. 23, 2010, 11 pages, Doc 1242.
U.S. Appl. No. 11/006,320 / Response to Final Office Action dated May 24, 2010, 11 pages, Doc 1243.
U.S. Appl. No. 11/006,320 / Response to Final Office Action filed Aug. 24, 2010, 17 pages, Doc 1244.
U.S. Appl. No. 11/006,320 / Notice of Allowance dated Sep. 17, 2010, 18 pages, Doc 1245.
U.S. Appl. No. 11/006,320 / Issue Fee dated Dec. 17, 2010, 12 pages, Doc 1246.
U.S. Appl. No. 11/006,320 / Issue Notification dated Jan. 12, 2011, 1 page, Doc 1247.
U.S. Appl. No. 12/972,326 / Application filed Dec. 17, 2010, 76 pages, Doc 2247.
U.S. Appl. No. 12/972,326 / Filing Receipt and Notice to File Missing Parts dated Jan. 6, 2011, 5 pages, Doc 2248.
U.S. Appl. No. 12/972,326 / Preliminary Amendment and Response to Notice to File Missing Parts dated Jan. 26, 2011, 16 pages, Doc 2249.
U.S. Appl. No. 12/972,326 / Preliminary Amendment filed May 20, 2011, 17 pages, Doc 2250.
U.S. Appl. No. 12/972,326 / Notice of Non-compliant Amendment dated Jun. 2, 2011, 2 pages, Doc 2251.
U.S. Appl. No. 12/972,326 / Notice of Publication dated Jun. 2, 2011, 1 page, Doc 2252.
U.S. Appl. No. 12/972,326 / Substitute Preliminary Amendment filed Jul. 5, 2011, 23 pages, Doc 2253.
U.S. Appl. No. 12/972,326 / Preliminary Amendment filed Aug. 10, 2011, 9 pages, Doc 2254.
U.S. Appl. No. 12/972,326 / Non-final Office Action dated Feb. 23, 2011, 9 pages, Doc 2255.
U.S. Appl. No. 12/972,326 / Advisory Action dated Jun. 26, 2012, 3 pages, Doc 2256.
U.S. Appl. No. 12/972,326 / Notice of Abandonment dated Sep. 18, 2012, 2 pages, Doc 2257.
U.S. Appl. No. 11/006,848 / Application filed Dec. 7, 2004, 61 pages, Doc 1249.
U.S. Appl. No. 11/006,848 / Notice to File Missing Parts dated Mar. 18, 2005, 2 pages, Doc 1250.
U.S. Appl. No. 11/006,848 / Response to Notice to File Missing Parts dated Apr. 28, 2005, 101 pages, Doc 1251.
U.S. Appl. No. 11/006,848 / Office Action dated Apr. 4, 2007, 38 pages, Doc 1252.
U.S. Appl. No. 11/006,848 / Response to Office Action filed Oct. 3, 2007, 22 pages, Doc 1253.
U.S. Appl. No. 11/006,848 / Supplemental Amendment filed Nov. 13, 2007, 6 pages, Doc 1254.
U.S. Appl. No. 11/006,848 / Office Action dated Feb. 5, 2008, 47 pages, Doc 1255.
U.S. Appl. No. 11/006,848 / Response to Office Action dated Aug. 4, 2008, 30 pages, Doc 1256.
U.S. Appl. No. 11/006,848 / Final Office Action dated Dec. 2, 2008, 30 pages, Doc 1257.
U.S. Appl. No. 11/006,848 / RCE and Amendment filed May 4, 2009, 26 pages, Doc 1258.
U.S. Appl. No. 11/006,848 / Notice of Allowance dated Jun. 11, 2009, 8 pages, Doc 1259.
U.S. Appl. No. 11/006,848 / Issue Fee Payment filed Sep. 11, 2009, 16 pages, Doc 1260.
U.S. Appl. No. 11/006,848 / Issue Notification dated 10/28/009, 1 page, Doc 1261.
U.S. Appl. No. 11/006,8481 / Request to Correct Inventorship and for a Certificate of Correction filed Sep. 12, 2016, 14 pages, Doc 1262.
U.S. Appl. No. 11/006,848 / Certificate of Correction dated Aug. 8, 2017, 1 page, Doc 1263.
U.S. Appl. No. 12/573,829 / Patent Application filed Oct. 5, 2009, 67 pages, Doc 1264.
U.S. Appl. No. 12/573,829 / Notice to File Missing Parts Oct. 20, 2009, 2 pages, Doc 1265.
U.S. Appl. No. 12/573,829 / Filing Receipt Oct. 20, 2009, 3 pages, Doc 1266.
U.S. Appl. No. 12/573,829 / Preliminary Amendment filed Dec. 21, 2009, 17 pages, Doc 1267.
U.S. Appl. No. 12/573,829 / Filing Receipt Jan. 4, 2010, 3 pages, Doc 1268.
U.S. Appl. No. 12/573,829 / Notice of Publication Apr. 15, 2020, 1 page, Doc 1269.
U.S. Appl. No. 12/573,829 / Non-Final Rejection dated Jun. 28, 2010, 49 pages, Doc 1271.
U.S. Appl. No. 12/573,829 / Amendment/Request for Reconsideration After Non-Final Rejection filed Sep. 28, 2010, 25 pages, Doc 1273.
U.S. Appl. No. 12/573,829 / Final Office Action dated Nov. 1, 2010, 53 pages, Doc 1274.
U.S. Appl. No. 12/573,829 / Response After Final Action filed Jan. 3, 2011, 32 pages, Doc 1275.
U.S. Appl. No. 12/573,829 / Advisory Action dated Jan. 7, 2011, 3 pages, Doc 1276.
U.S. Appl. No. 12/573,829 / Notice of Appeal filed Jan. 11, 2011, 5 pages, Doc 1277.
U.S. Appl. No. 12/573,829 / Appeal Brief filed May 4, 2011, 72 pages, Doc 1278.
U.S. Appl. No. 12/573,829 / Examiner's Answer to Appeal Brief, 31 pages, Doc 1279.
U.S. Appl. No. 12/573,829 / Reply Brief filed Sep. 21, 2011, 19 pages, Doc 1280.
U.S. Appl. No. 12/573,829 / Reply Brief Noted—Patent Board Oct. 5, 2011, 2 pages, Doc 1281.
U.S. Appl. No. 12/573,829 / Appeal Docketing Notice Oct. 11, 2011, 2 pages, Doc 1282.
U.S. Appl. No. 12/573,829 / Patent Board Decision—Examiner Affirmed May 9, 2014, 10 pages, Doc 1284.
U.S. Appl. No. 12/573,829 / Request for Continued Examination filed Jul. 9, 2014, 25 pages, Doc 1285.
U.S. Appl. No. 12/573,829 / Non-Final Office Action dated Apr. 28, 2015, 52 pages, Doc 1288.
U.S. Appl. No. 12/573,829 / Request for Consideration after Non-Final Rejection filed Jul. 27, 2015, 24 pages, Doc 1289.
U.S. Appl. No. 12/573,829 / Final Rejection dated Sep. 15, 2015, 24 pages, Doc 1291.
U.S. Appl. No. 12/573,829 / Response After Final Action filed Nov. 16, 2015, 21 pages, Doc 1293.
U.S. Appl. No. 12/573,829 / Advisory Action dated Dec. 2, 2015, 4 pages, Doc 1294.
U.S. Appl. No. 12/573,829 / Request for Continued Examination filed Dec. 14, 2015, 24 pages, Doc 1295.
U.S. Appl. No. 12/573,829 / Non-Final Rejection dated Jun. 13, 2016, 25 pages, Doc 1297.
U.S. Appl. No. 12/573,829 / Request for Corrected Filing Receipt to Correct Inventorship filed Sep. 13, 2016, 30 pages, Doc 1298.
U.S. Appl. No. 12/573,829 / Updated Filing Receipt and Notice of Acceptance of Request to Correct Inventorship dated Sep. 15, 2016, 5 pages, Doc 1299.
U.S. Appl. No. 12/573,829 / Non-Final Rejection dated Dec. 16, 2016, 21 pages, Doc 1300.
U.S. Appl. No. 12/573,829 / Request for Reconsideration After Non-Final Request filed Mar. 16, 2017, 21 pages, Doc 1301.
U.S. Appl. No. 12/573,829 / Final Rejection dated May 2, 2017, 24 pages, Doc 1303.
U.S. Appl. No. 12/573,829 / Response After Final Action filed Jul. 5, 2017, 23 pages, Doc 1304.

(56) References Cited

OTHER PUBLICATIONS

U.S. Appl. No. 12/573,829 / Advisory Action, Applicant Initiated Review Summary, Amendment After Final Action, After Final Consideration Program Decision dated Aug. 29, 2017, 8 pages, Doc 1305.
U.S. Appl. No. 12/573,829 / Request for Continued Examination filed Sep. 5, 2017, 29 pages, Doc 1306.
U.S. Appl. No. 12/573,829 / Non-Final Rejection dated Dec. 27, 2017, 24 pages, Doc 1308.
U.S. Appl. No. 12/573,829 / Request for Reconsideration After Non-Final Rejection filed Mar. 27, 2018, 25 pages, Doc 1309.
U.S. Appl. No. 12/573,829 / Final Rejection dated Jul. 11, 2018, 26 pages, Doc 1311.
U.S. Appl. No. 12/573,829 / Request for Consideration After Final Consideration filed Sep. 7, 2018, 25 pages, Doc 1312.
U.S. Appl. No. 12/573,829 / Advisory Action dated Sep. 24, 2018, 6 pages, Doc 1314.
U.S. Appl. No. 12/573,829 / Request for Continued Examination filed Oct. 9, 2018, 25 pages, Doc 1315.
U.S. Appl. No. 12/573,829 / Notice of Allowance dated May 21, 2019, 32 pages, Doc 1318.
U.S. Appl. No. 12/573,829 / Issue Fee & Terminal Disclaimer filed Aug. 21, 2019, 12 pages 1320.
U.S. Appl. No. 12/573,829 / Issue Notification Sep. 18, 2019, 1 page, Doc 1322.
U.S. Appl. No. 16/549,185 / Application filed Sep. 23, 2019, 73 pages, Doc 1323.
U.S. Appl. No. 16/549,185 / Filing Receipt and Notice to File Missing Parts Sep. 4, 2019, 6 pages, Doc 1324.
U.S. Appl. No. 16/549,185 / Response to Notice to File Missing Parts and Preliminary Amendment filed Sep. 5, 2019, 18 pages, Doc 2147.
U.S. Appl. No. 16/549,185 / Updated Filing Receipt Sep. 6, 2019, 4 pages, Doc 1326.
U.S. Appl. No. 16/549,185 / Notice of Publication Dec. 19, 2019, 1 page, Doc 1325.
U.S. Appl. No. 11/006,841 / Application filed Dec. 7, 2004, 67 pages, Doc 1329.
U.S. Appl. No. 11/006,841 / Pre-Exam Formalities Notice Jan. 10, 2005, 2 pages, Doc 1330.
U.S. Appl. No. 11/006,841 / Applicant Response to Pre-Exam Formalities Notice filed Apr. 14, 2005, 105 pages, Doc 1331.
U.S. Appl. No. 11/006,841 / Examiner's Search Strategies and Results Mar. 30, 2007, 14 pages, Doc 1332.
U.S. Appl. No. 11/006,841 / Non-Final Rejection dated Apr. 6, 2007, 18 pages, Doc 1333.
U.S. Appl. No. 11/006,841 / Response to Non-Final Rejection filed Sep. 6, 2007, 67 pages, Doc 1334.
U.S. Appl. No. 11/006,841 / Requirement for Restriction/Election dated Nov. 27, 2007, 5 pages, Doc 1335.
U.S. Appl. No. 11/006,841 / Request for Reconsideration after Non-Final Rejection filed Dec. 27, 2007, 41 pages, Doc 1336.
U.S. Appl. No. 11/006,841 / Requirement for Restriction/Election dated Mar. 17, 2008, 9 pages, Doc 1337.
U.S. Appl. No. 11/006,841 / Response to Election/Restriction filed Jul. 17, 2008, 38 pages, Doc 1339.
U.S. Appl. No. 11/006,841 / Final Office Action dated Oct. 29, 2008, 79 pages, Doc 1340.
U.S. Appl. No. 11/006,841 / RCE and Amendment filed Dec. 29, 2008, 48 pages, Doc 1341.
U.S. Appl. No. 11/006,841 / Advisory Action dated Jan. 6, 2009, 3 pages, Doc 1342.
U.S. Appl. No. 11/006,841 / Request for Continued Examination filed Apr. 23, 2009, 54 pages, Doc 1343.
U.S. Appl. No. 11/006,841 / Information Disclosure Statement and Remarks in an Amendment filed Jun. 26, 2009, 43 pages, Doc 1345.
U.S. Appl. No. 11/006,841 / Notice of Allowance and Fees Due Jun. 29, 2009, 69 pages, Doc 1346.
U.S. Appl. No. 11/006,841 / Issue Fee Payment; Information Disclosure Statement; Amendment After Notice of Allowance filed Sep. 29, 2009, 17 pages, Doc 1350.
U.S. Appl. No. 11/006,841 / Miscellaneous Communication to Applicant Oct. 21, 2009, 5 pages, Doc 1351.
U.S. Appl. No. 11/006,841 / Issue Notification dated Nov. 11, 2009, 1 page, Doc 1352.
U.S. Appl. No. 12/578,411 / Application filed Oct. 13, 2009, 75 pages, Doc 1354.
U.S. Appl. No. 12/578,411 / Notice to File Missing Parts Oct. 28, 2009, 6 pages, Doc 1355.
U.S. Appl. No. 12/578,411 / Applicant Response to Pre-Exam Formalities Notice filed Dec. 28, 2009, 27 pages, Doc 1356.
U.S. Appl. No. 12/578,411 / Filing Receipt Jan. 7, 2010, 3 pages, Doc 1357.
U.S. Appl. No. 12/578,411 / Requirement for Restriction/Election dated Jun. 8, 2011, 6 pages, Doc 1358.
U.S. Appl. No. 12/578,411 / Response to Election/Restriction filed Jul. 6, 2011, 20 pages, Doc 1359.
U.S. Appl. No. 12/578,411 / Non-Final Rejection dated Aug. 23, 2011, 25 pages, Doc 1360.
U.S. Appl. No. 12/578,411 / Amendment After Non-Final Rejection filed Dec. 22, 2011, 42 pages, Doc 1361.
U.S. Appl. No. 12/578,411 / Search Results by Examiner Jan. 20, 2012, 57 pages, Doc 1363.
U.S. Appl. No. 12/578,411 / Applicant Amendment submitted/ Entered with Filing of CPA/RCE filed May 21, 2012, 28 pages, Doc 1364.
U.S. Appl. No. 12/578,411 / Refund Request filed May 24, 2012, 4 pages, Doc 1365.
U.S. Appl. No. 12/578,411 / Advisory Action dated May 31, 2012, 4 pages, Doc 1366.
U.S. Appl. No. 12/578,411 / Request for Continued Examination filed Jun. 12, 2012, 38 pages, Doc 1367.
U.S. Appl. No. 12/578,411 / Notice of Allowance and Fees Due, dated Aug. 19, 2012, 35 pages, Doc 1369.
U.S. Appl. No. 12/578,411 / Amendment After Notice of Allowance dated Nov. 14, 2013, 16 pages, Doc 1371.
U.S. Appl. No. 12/578,411 / Amendment After Final and Response to Amendment Nov. 19, 2013, 2 pages, Doc 1372.
U.S. Appl. No. 12/578,411 / Response to Amendment dated Dec. 3, 2013, 8 pages, Doc 1373.
U.S. Appl. No. 12/578,411 / Issue Notification dated Dec. 18, 2013, 1 page, Doc 1375.
U.S. Appl. No. 12/578,411 / Terminal Disclaimer Nov. 8, 2017, 7 pages, Doc 1376.
U.S. Appl. No. 14/086,837 / Application filed Nov. 21, 2013, 70 pages, Doc 2258.
U.S. Appl. No. 14/086,837 / Filing Receipt dated Dec. 12, 2013, 3 pages, Doc 2259.
U.S. Appl. No. 14/086,837 / Notice to File Missing Parts dated Dec. 12, 2013, 2 pages, Doc 2261.
U.S. Appl. No. 14/086,837 / Preliminary Amendment and Response to Notice to File Missing Parts filed Jun. 11, 2013, 28 pages, Doc 2262.
U.S. Appl. No. 14/086,837 / Notice of Publication dated Sep. 25, 2014, 1 page, Doc 2260.
U.S. Appl. No. 14/086,837 / Two Terminal Disclaimers filed Nov. 14, 2014, 4 pages, Doc 2263.
U.S. Appl. No. 14/086,837 / Notice of Allowance/Allowability dated Dec. 2, 2014, 19 pages, Doc 2264.
U.S. Appl. No. 14/086,837 / Issue Fee and 312 Amendment filed Feb. 27, 2015, 12 pages, Doc 2265.
U.S. Appl. No. 14/086,837 / Issue Notification dated May 6, 2015, 1 page, Doc 2266.
U.S. Appl. No. 14/635,836 / Application filed Mar. 2, 2015, 75 pages, Doc 2267.
U.S. Appl. No. 14/635,836 / Filing Receipt dated Mar. 12, 2015, 3 pages, Doc 2268.
U.S. Appl. No. 14/635,836 / Notice to File Missing Parts dated Mar. 12, 2015, 2 pages, Doc 2270.

(56) References Cited

OTHER PUBLICATIONS

U.S. Appl. No. 14/635,836 / Preliminary Amendment and Response to Notice to File Missing Parts filed May 12, 2015, 42 pages, Doc 2271.
U.S. Appl. No. 14/635,836 / Notice of Publication dated Aug. 27, 2015, 1 page, Doc 2269.
U.S. Appl. No. 14/635,836 / Terminal Disclaimer filed Nov. 13, 2015, 5 pages, Doc 2272.
U.S. Appl. No. 14/635,836 / Notice of Allowance/Allowability dated Apr. 18, 2016, 65 pages, Doc 2273.
U.S. Appl. No. 14/635,836 / Issue Fee and 312 Amendment filed Jul. 15, 2016, 17 pages, Doc 2274.
U.S. Appl. No. 14/635,836 / Issue Notification dated Aug. 16, 2016, 1 page, Doc 2275.
U.S. Appl. No. 15/250,118 / Application filed Aug. 29, 2016, 96 pages, Doc 2276.
U.S. Appl. No. 15/250,118 / Notice to File Corrected Application Papers dated Sep. 9, 2016, 2 pages, Doc 2277.
U.S. Appl. No. 15/250,118 / Filing Receipt dated Sep. 9, 2016, 3 pages, Doc 2278.
U.S. Appl. No. 15/250,1181 / Response to Notice to File Corrected Application Papers and Revised Figures filed Nov. 8, 2016, 23 pages, Doc 2280.
U.S. Appl. No. 15/250,118 / Notice of Publication dated Feb. 23, 2017, 1 page, Doc 2279.
U.S. Appl. No. 15/250,118 / Non-final Office Action dated Jun. 15, 2017, 30 pages, Doc 2281.
U.S. Appl. No. 15/250,118 / Response to Non-final Office Action filed Sep. 14, 2017, 46 pages, Doc 2282.
U.S. Appl. No. 15/250,118 / Final Office Action dated Dec. 15, 2017, 69 pages, Doc 2283.
U.S. Appl. No. 15/250,118 / RCE and Amendment filed Dec. 15, 2017, 48 pages, Doc 2284.
U.S. Appl. No. 15/250,118 / Terminal Disclaimer filed Dec. 11, 2017, 6 pages, Doc 2285.
U.S. Appl. No. 15/250,118 / Notice of Allowance/Allowability filed Jan. 8, 2019, 41 pages, Doc 2286.
U.S. Appl. No. 15/250,118 / 312 Amendment filed Jan. 23, 2019, 20 pages, Doc 2287.
U.S. Appl. No. 15/250,118 / Issue Fee and 312 Amendment filed Apr. 5, 2019, 22 pages, Doc 2288.
U.S. Appl. No. 15/250,118 / Issue Notification dated Apr. 5, 2019, 1 page, Doc 2298.
U.S. Appl. No. 16/379,674 / Application Filed Apr. 9, 2019, 88 pages, Doc 2148.
U.S. Appl. No. 16/379,674 / Filing Receipt Apr. 24, 2019, 4 pages, Doc 2149.
U.S. Appl. No. 16/379,674 / Notice of Publication dated Aug. 1, 2019, 1 page, Doc 1016.
U.S. Appl. No. 16/379,674 / Office Action, dated Oct. 19, 2020, 69 pages, Doc 2151.
U.S. Appl. No. 16/379,674 / Response to Office Action filed Feb. 19, 2021, 21 pages, Doc 2173.
U.S. Appl. No. 16/379,674 / Final Office Action dated Apr. 5, 2021, 21 pages, Doc 2289.
U.S. Appl. No. 16/379,674 / Final Office Action dated Apr. 9, 2021, 21 pages, Doc 2301.
U.S. Appl. No. 16/379,674 / Request for Continued Examination, Amendment and Terminal Disclaimer filed Jul. 1, 2021, 25 pages, Doc 2302.
U.S. Appl. No. 11/006,440 / Application filed Dec. 6, 2004, 87 pages, Doc 1377.
U.S. Appl. No. 11/006,440 / Pre-Exam Formalities Notice Jan. 11, 2005, 2 pages, Doc 1378.
U.S. Appl. No. 11/006,440 / Preliminary Amendment filed May 2, 2005, 140 pages, Doc 1379.
U.S. Appl. No. 11/006,440 / Preliminary Amendment filed Oct. 10, 2006, 139 pages, Doc 1380.
U.S. Appl. No. 11/006,440 / Requirement for Restriction/Election dated Mar. 29, 2007, 5 pages, Doc 1381.
U.S. Appl. No. 11/006,4401 / Response to Election/Restriction filed Apr. 30, 2007, 43 pages, Doc 1382.
U.S. Appl. No. 11/006,440 / Examiner's Search Strategies and Results Jun. 19, 2007, 5 pages, Doc 1383.
U.S. Appl. No. 11/006,440 / Non-Final Rejection dated Jun. 21, 2007, 21 pages, Doc 1384.
U.S. Appl. No. 11/006,4401 / Request for Reconsideration After Non-Final Rejection filed Nov. 20, 2007, 47 pages, 1385.
U.S. Appl. No. 11/006,440 / Examiner's Search Strategies and Results, Feb. 1, 2008, 11 pages, Doc 1386.
U.S. Appl. No. 11/006,440 / Final Rejection dated Feb. 6, 2008, 18 pages, Doc 1387.
U.S. Appl. No. 11/006,440 / Response After Final Action dated Apr. 7, 2008, 37 pages, Doc 1388.
U.S. Appl. No. 11/006,440 / Notice of Appeal filed Aug. 4, 2008, 6 pages, Doc 1390.
U.S. Appl. No. 11/006,440 / Request for Continued Examination filed Nov. 4, 2008, 43 pages, Doc 1391.
U.S. Appl. No. 11/006,440 / Non-Final Rejection dated Jan. 23, 2009, 69 pages, Doc 1392.
U.S. Appl. No. 11/006,440 / Request for Reconsideration After Non-Final Rejection filed Apr. 23, 2009, 36 pages, Doc 1393.
U.S. Appl. No. 11/006,440 / Supplemental Response or Supplemental Amendment filed Jul. 17, 2009, 31 pages, Doc 1394.
U.S. Appl. No. 11/006,440 / Notice of Allowance and Fees Due dated Jul. 31, 2009, 58 pages, Doc 1395.
U.S. Appl. No. 11/006,440 / Amendment After Notice of Allowance and Issue Fee Payment filed Nov. 2, 2009, 14 pages, Doc 1402.
U.S. Appl. No. 11/006,440 / Issue Notification dated Dec. 2, 2009, 1 page, Doc 1405.
U.S. Appl. No. 12/627,816 / Claims Worksheet filed Nov. 24, 2009, 1 page, Doc 1406.
U.S. Appl. No. 12/627,816 / Preliminary Amendment, Application and Declaration filed Nov. 30, 2009, 94 pages, Doc 1407.
U.S. Appl. No. 12/627,816 / Notice to File Missing Parts, Dec. 15, 2009, 5 pages, Doc 1408.
U.S. Appl. No. 12/627,816 / Applicant Response to Pre-Exam Formalities Notice filed Apr. 12, 2010, 25 pages, Doc 1409.
U.S. Appl. No. 12/627,816 / Filing Receipt Apr. 20, 2010, 3 pages, Doc 1410.
U.S. Appl. No. 12/627,816 / Notice of Publication Jul. 29, 2010, 1 page, Doc 1411.
U.S. Appl. No. 12/627,816 / Non-Final Rejection dated May 5, 2011, 94 pages, Doc 1412.
U.S. Appl. No. 12/627,816 / Response to Final Office Action filed Nov. 7, 2011, 17 pages, Doc 1413.
U.S. Appl. No. 12/627,816 / Final Rejection dated Nov. 17, 2011, 21 pages, Doc 1414.
U.S. Appl. No. 12/627,816 / Terminal Disclaimer Review Decision Feb. 7, 2012, 1 page, Doc 1416.
U.S. Appl. No. 12/627,816 / Request for Continued Examination filed Feb. 17, 2012, 21 pages, Doc 1415.
U.S. Appl. No. 12/627,816 / Notice of Allowance and Fees Due dated Aug. 1, 2013, 51 pages, Doc 1417.
U.S. Appl. No. 12/627,816 / Issue Fee Payment and Amendment After Notice of Allowance dated Nov. 1, 2013, 16 pages, Doc 1420.
U.S. Appl. No. 12/627,816 / Miscellaneous Communication to Applicant Nov. 5, 2013, 4 pages, Doc 1421.
U.S. Appl. No. 12/627,816 / Amendment After Final Initialed by Examiner Nov. 9, 2013, 2 pages, Doc 1422.
U.S. Appl. No. 12/627,816 / Response to Amendment Under Rule 312 Nov. 12, 2013, 3 pages, Doc 1423.
U.S. Appl. No. 12/627,816 / Issue Notification dated Nov. 26, 2013, 1 page, Doc 1425.
U.S. Appl. No. 14/086,808 / Application filed Nov. 21, 2013, 89 pages, Doc 1428.
U.S. Appl. No. 14/086,808 / Notice to File Missing Parts Dec. 11, 2013, 6 pages, Doc 1429.
U.S. Appl. No. 14/086,808 / Applicant Response to Pre-Exam Formalities Notice and Declaration and Preliminary Amendment filed Jun. 11, 2014, 71 pages, Doc 1430.
U.S. Appl. No. 14/086,808 / Filing Receipt Jun. 17, 2014, 4 pages, Doc 1431.

(56) References Cited

OTHER PUBLICATIONS

U.S. Appl. No. 14/086,808 / Notice of Publication Sep. 25, 2014, 1 page, Doc 1432.
U.S. Appl. No. 14/086,808 / Terminal Disclaimer filed Oct. 24, 2014, 6 page, Doc 1433.
U.S. Appl. No. 14/086,808 / Terminal Disclaimer Review Decision Oct. 29, 2014, 1 page, Doc 1434.
U.S. Appl. No. 14/086,808 / Terminal Disclaimer and Power of Attorney filed Nov. 4, 2014, 6 pages, Doc 1435.
U.S. Appl. No. 14/086,808 / Terminal Disclaimer Review Decision Nov. 13, 2014, 1 page, Doc 1437.
U.S. Appl. No. 14/086,808 / Notice of Allowance and Fees Due dated Nov. 17, 2014, 68 pages, Doc 1438.
U.S. Appl. No. 14/086,808 / Amendment After Notice of Allowance and Issue Fee Payment dated Feb. 17, 2015, 25 pages, Doc 1439.
U.S. Appl. No. 14/086,808 / Response to Amendment under Rule 312 and Miscellaneous Communication to Applicant Feb. 20, 2015, 2 pages, Doc 1440.
U.S. Appl. No. 14/086,808 / Amendment After Final, Initialed by Examiner and Response to Amendment Under Rule 312 Feb. 25, 2015, 10 pages, Doc 1441.
U.S. Appl. No. 14/086,808 / Issue Notification dated Mar. 18, 2015, 1 page, Doc 1443.
U.S. Appl. No. 14/625,473 / Application, Declaration and Power of Attorney filed Feb. 18, 2015, 97 pages, Doc 1444.
U.S. Appl. No. 14/625,473 / Notice to File Missing Parts Mar. 18, 2015, 6 pages, Doc 1445.
U.S. Appl. No. 14/625,473 / Applicant Response to Pre-Exam Formalities Notice and Applicant Arguments/ Remarks Made in an Amendment filed May 18, 2015, 33 pages, Doc 1446.
U.S. Appl. No. 14/625,473 / Filing Receipt May 20, 2015, 4 pages, Doc 1447.
U.S. Appl. No. 14/625,473 / Notice of Publication Aug. 27, 2015, 1 page, Doc 1448.
U.S. Appl. No. 14/625,473 / Terminal Disclaimer filed Nov. 13, 2015, 7 pages, Doc 1449.
U.S. Appl. No. 14/625,473 / Notice of Allowance and Fees Due and List of References and Considered By Examiner dated Mar. 28, 2016, 91 pages, Doc 1450.
U.S. Appl. No. 14/625,473 / Amendment After Notice of Allowance and Issue Fee Paid filed Jun. 28, 2016, 28 pages, Doc 1453.
U.S. Appl. No. 14/625,473 / Response to Amendment Under Rule 312 Jun. 30, 2016, 1 page, Doc 1454.
U.S. Appl. No. 14/625,473 / Response to Amendment Under Rule 312 Jul. 6, 2016, 3 pages, Doc 1455.
U.S. Appl. No. 14/625,473 / Issue Notification dated Jul. 20, 2016, 1 page, Doc 1457.
U.S. Appl. No. 15/214,168 / Application, Declaration and Preliminary Amendment filed Jul. 19, 2016, 124 pages, Doc 1458.
U.S. Appl. No. 15/214,168 / Filing Receipt and Response Re: Informal Power of Attorney Aug. 3, 2016, 6 pages, Doc 1459.
U.S. Appl. No. 15/214,168 / Request for Corrected Filing Receipt and Power of Attorney filed Oct. 7, 2016, 14 pages, Doc 1462.
U.S. Appl. No. 15/214,168 / Filing Receipt Oct. 12, 2016, 5 pages, Doc 1463.
U.S. Appl. No. 15/214,168 / Notice of Publication Nov. 10, 2016, 1 page, Doc 1464.
U.S. Appl. No. 15/214,168 / Non-Final Rejection dated Mar. 2, 2017, 38 pages, Doc 1465.
U.S. Appl. No. 15/214,168 / Amendment / Request for Reconsideration After Non-Final Rejection filed Jun. 2, 2017, 42 pages, Doc 1466.
U.S. Appl. No. 15/214,168 / Terminal Disclaimer filed Jul. 17, 2017, 8 pages, Doc 1467.
U.S. Appl. No. 15/214,168 / Notice of Allowance and Fees Due dated Aug. 1, 2017, 124 pages, Doc 1468.
U.S. Appl. No. 15/214,168 / Amendment After Notice of Allowance and Issue Fee Payment filed Nov. 1, 2017, 27 pages, Doc 1469.
U.S. Appl. No. 15/214,168 / Miscellaneous Communication to Applicant and Amendment After Final or Under 37CFR 1.312, Initialed by Examiner Nov. 6, 2017, 5 pages, Doc 1470.
U.S. Appl. No. 15/214,168 / Issue Notification dated Nov. 21, 2017, 1 page, Doc 1472.
U.S. Appl. No. 16/710,577 / US Reissue Patent Application and Preliminary Amendment filed Dec. 11, 2019, 88 pages, Doc 1017.
U.S. Appl. No. 16/710,577 / Filing Receipt dated Jan. 10, 2020, 4 pages, Doc 1018.
U.S. Appl. No. 16/710,577 / Non-final Office Action dated Mar. 19, 2021, 11 pages, Doc 2174.
U.S. Appl. No. 15/802,348 / Application, Preliminary Amendment and Declaration filed Nov. 2, 2017, 134 pages, Doc 1475.
U.S. Appl. No. 15/802,348 / Notice to File Corrected Application Papers Nov. 30, 2017, 7 pages, Doc 1476.
U.S. Appl. No. 15/802,348 / Applicant Response to Pre-Exam Formalities Notice filed Jan. 9, 2018, 19 pages, Doc 1477.
U.S. Appl. No. 15/802,348 / Filing Receipt Jan. 11, 2018, 5 pages, Doc 1478.
U.S. Appl. No. 15/802,348 / Notice of Publication Apr. 19, 2018, 1 page, Doc 1479.
U.S. Appl. No. 15/802,348 / Preliminary Amendment filed Oct. 26, 2018, 27 pages, Doc 1480.
U.S. Appl. No. 15/802,348 / Non-Final Rejection dated Feb. 11, 2019, 174 pages, Doc 1481.
U.S. Appl. No. 15/802,348 / Amendment / Request for Reconsideration After Non-Final Rejection filed May 13, 2019, 25 pages, Doc 1482.
U.S. Appl. No. 15/802,348 / Final Office Action dated Jul. 9, 2019, 24 pages, Doc 1019.
U.S. Appl. No. 15/802,348 / Response to Final Office Action filed Aug. 20, 2019, 29 pages, Doc 1020.
U.S. Appl. No. 15/802,348 / Advisory Action dated Sep. 4, 2019, 3 pages, Doc 1021.
U.S. Appl. No. 15/802,348 / RCE and Amendment filed Sep. 16, 2019, 30 pages, Doc 1022.
U.S. Appl. No. 15/802,348 / Terminal Disclaimer filed Mar. 18, 2020, 9 pages, Doc 1488.
U.S. Appl. No. 15/802,348 / Notice of Allowance and Fees Due dated Mar. 27, 2020, 178 pages, Doc 1489.
U.S. Appl. No. 15/802,348 / Issue Fee Payment filed Jun. 19, 2020, 9 pages, Doc 1491.
U.S. Appl. No. 15/802,348 / Issue Notification dated Jul. 8, 2020, 1 page, Doc 1494.
U.S. Appl. No. 16/909,899 / Application filed Jun. 23, 2020, 98 pages, Doc 2140.
U.S. Appl. No. 16/909,899 / Filing Receipt and Notice to File Missing Parts Jul. 6, 2020, 8 pages, Doc 2141.
U.S. Appl. No. 16/909,899 / Preliminary Amendment and Response to Missing Parts filed Sep. 8, 2020, 31 pages, Doc 2142.
U.S. Appl. No. 16/909,899 / Updated Filing Receipt Sep. 10, 2020, 6 pages, Doc 2143.
U.S. Appl. No. 16/909,899 / Notice of Publication Dec. 17, 2020, 6 pages, Doc 2161.
U.S. Appl. No. 16/909,899 / Non-final Office Action dated Aug. 11, 2021, pages, Doc 2336.
U.S. Appl. No. 11/006,446 / New Application filed Dec. 6, 2004, 91 pages, Doc 1495.
U.S. Appl. No. 11/006,446 / Pre-Exam Formalities Notice Jan. 24, 2005, 3 pages, Doc 1496.
U.S. Appl. No. 11/006,446 / Preliminary Amendment filed May 2, 2005, 118 pages, Doc 1497.
U.S. Appl. No. 11/006,446 / Requirement for Restriction / Election dated Apr. 4, 2007, 5 pages, Doc 1498.
U.S. Appl. No. 11/006,446 / Response to Election / Restriction filed May 3, 2007, 6 pages, Doc 1499.
U.S. Appl. No. 11/006,446 / Non-Final Rejection dated Jul. 26, 2007, 34 pages, Doc 1502.
U.S. Appl. No. 11/006,446 / Amendment, Request for Reconsideration After Non-Final Rejection filed Nov. 26, 2007, 37 pages, Doc 1503.
U.S. Appl. No. 11/006,446 / Examiner's Search Strategies and Results Feb. 7, 2008, 1 page, Doc 1504.

(56) References Cited

OTHER PUBLICATIONS

U.S. Appl. No. 11/006,446 / Non-Final Rejection dated Feb. 20, 2008, 58 pages, Doc 1506.
U.S. Appl. No. 11/006,446 / Amendment / Request for Reconsideration After Non-Final Rejection dated Jul. 21, 2008, 33 pages, Doc 1507.
U.S. Appl. No. 11/006,446 / Final Rejection dated Oct. 28, 2008, 49 pages, Doc 1508.
U.S. Appl. No. 11/006,446 / Amendment Submitted / Entered with Filing of CPA/RCE filed Dec. 29, 2008, 33 pages, Doc 1509.
U.S. Appl. No. 11/006,446 / Advisory Action dated Jan. 7, 2009, 4 pages, Doc 1510.
U.S. Appl. No. 11/006,446 / Request for Continued Examination Apr. 28, 2009, 38 pages, Doc 1511.
U.S. Appl. No. 11/006,446 / Non-Final Rejection dated Jul. 7, 2009, 41 pages, Doc 1512.
U.S. Appl. No. 11/006,446 / Examiner Interview Summary Record and Examiner's Search Strategy and Results Oct. 26, 2009, 6 pages, Doc 1513.
U.S. Appl. No. 11/006,446 / Amendment / Request for Reconsideration After Non-Final Rejection dated Dec. 7, 2009, 33 pages, Doc 1514.
U.S. Appl. No. 11/006,446 / Notice of Allowance and Fees Due dated Mar. 19, 2010, 135 pages, Doc 1515.
U.S. Appl. No. 11/006,446 / Amendment After Notice of Allowance and Issue Fee Payment filed Jun. 21, 2010, 25 pages, Doc 1518.
U.S. Appl. No. 11/006,446 / Response to Amendment After Rule 312 dated Aug. 19, 2010, 3 pages, Doc 1520.
U.S. Appl. No. 11/006,446 / Drawings filed Aug. 25, 2010, 31 pages, Doc 1521.
U.S. Appl. No. 11/006,446 / Issue Notification dated Sep. 1, 2010, 1 page, Doc 1522.
U.S. Appl. No. 12/830,236 / Application, Declaration and Preliminary Amendment filed Jul. 2, 2010, 106 pages, Doc 1524.
U.S. Appl. No. 12/830,236 / Fee Worksheet filed Jul. 15, 2010, 1 page, Doc 1525.
U.S. Appl. No. 12/830,236 / Notice to File Corrected Application Papers Jul. 16, 2010, 5 pages, Doc 1526.
U.S. Appl. No. 12/830,236 / Applicant Response to Pre-Exam Formalities Notice filed Aug. 25, 2010, 34 pages, Doc 1527.
U.S. Appl. No. 12/830,236 / Filing Receipt Sep. 3, 2010, 3 pages, Doc 1528.
U.S. Appl. No. 12/830,236 / Notice of Publication Dec. 16, 2010, 1 page, Doc 1529.
U.S. Appl. No. 12/830,236 / Requirement for Restriction / Election dated Mar. 18, 2011, 6 pages, Doc 1530.
U.S. Appl. No. 12/830,236 / Response to Election / Restriction filed Apr. 18, 2011, 8 pages, Doc 1531.
U.S. Appl. No. 12/830,236 / Non-Final Rejection dated May 11, 2011, 29 pages, Doc 1532.
U.S. Appl. No. 12/830,2361 / Amendment / Request for Reconsideration After Non-Final Rejection filed Jul. 6, 2011, 20 pages, Doc 1533.
U.S. Appl. No. 12/830,236 / Final Rejection dated Oct. 14, 2011, 54 pages, Doc 1534.
U.S. Appl. No. 12/830,236 / Response After Final Action filed Jan. 17, 2012, 26 pages, Doc 1535.
U.S. Appl. No. 12/830,236 / Advisory Action dated Feb. 8, 2012, 6 pages, Doc 1536.
U.S. Appl. No. 12/830,236 / Notice of Appeal filed Mar. 8, 2012, 6 pages, Doc 1537.
U.S. Appl. No. 12/830,236 / Request for Continued Examination filed Jun. 5, 2012, 24 pages, Doc 1538.
U.S. Appl. No. 12/830,236 / Non-Final Rejection dated Jul. 31, 2012, 28 pages, Doc 1540.
U.S. Appl. No. 12/830,2361 / Amendment / Request for Reconsideration After Non-Final Rejection filed Nov. 1, 2012, 28 pages, Doc 1541.
U.S. Appl. No. 12/830,236 / Final Rejection dated Feb. 27, 2013, 42 pages, Doc 1542.
U.S. Appl. No. 12/830,236 / Response After Final Action dated Jun. 27, 2013, 42 pages, Doc 1543.
U.S. Appl. No. 12/830,236 / Advisory Action and Amendment After Final dated Jul. 12, 2013, 4 pages, Doc 1544.
U.S. Appl. No. 12/830,236 / Notice of Appeal Filed Jul. 19, 2013, 6 pages, Doc 1545.
U.S. Appl. No. 12/830,236 / Appeal Brief filed Sep. 18, 2013, 44 pages, Doc 1546.
U.S. Appl. No. 12/830,236 / Examiner's Answer to Appeal Brief Dec. 18, 2013, 35 pages, Doc 1547.
U.S. Appl. No. 12/830,236 / Reply Brief filed Feb. 18, 2014, 18 pages, Doc 1548.
U.S. Appl. No. 12/830,236 / Appeal Docketing Notice filed Mar. 21, 2014, 2 pages, Doc 1550.
U.S. Appl. No. 12/830,236 / Patent Board Decision—Examiner Affirmed Mar. 9, 2016, 6 pages, Doc 1551.
U.S. Appl. No. 12/830,236 / Request for Continued Examination filed Apr. 27, 2016, 20 pages, Doc 1552.
U.S. Appl. No. 12/830,236 / Non-Final Rejection dated Jun. 29, 2016, 113 pages, Doc 1553.
U.S. Appl. No. 12/830,236 / Applicant Initiated Review Summary dated Aug. 30, 2016, 6 pages, Doc 1555.
U.S. Appl. No. 12/830,236 / Amendment / Request for Reconsideration After Non-Final Rejection filed Sep. 6, 2016, 15 pages, Doc 1556.
U.S. Appl. No. 12/830,236 / Applicant Initiated Interview Summary dated Sep. 9, 2016, 5 pages, Doc 1557.
U.S. Appl. No. 12/830,236 / Final Rejection dated Dec. 14, 2016, 98 pages, Doc 1558.
U.S. Appl. No. 12/830,236 / Response After Final Action filed Feb. 13, 2017, 17 pages, Doc 1559.
U.S. Appl. No. 12/830,236 / Amendment After Final Action or under 37CFR 1.312 dated Mar. 3, 2017, 3 pages, Doc 1560.
U.S. Appl. No. 12/830,236 / Request for Continued Examination filed Apr. 4, 2017, 23 pages, Doc 1561.
U.S. Appl. No. 12/830,236 / Non-Final Rejection dated Jun. 21, 2017, 90 pages, Doc 1562.
U.S. Appl. No. 12/830,236 / Applicant Initiated Review Summary dated Oct. 5, 2017, 9 pages, Doc 1563.
U.S. Appl. No. 12/830,2361 / Amendment / Request for Reconsideration After Non-Final Rejection filed Oct. 23, 2017, 23 pages, Doc 1564.
U.S. Appl. No. 12/830,236 / Non-Final Rejection dated Feb. 6, 2018, 91 pages, Doc 1565.
U.S. Appl. No. 12/830,2361 / Amendment / Request for Reconsideration After Non-Final Rejection filed May 4, 2018, 29 pages, Doc 1566.
U.S. Appl. No. 12/830,236 / Final Rejection dated Sep. 5, 2018, 65 pages, Doc 1567.
U.S. Appl. No. 12/830,236 / After Final Consideration Program Request filed Nov. 5, 2018, 27 pages, Doc 1568.
U.S. Appl. No. 12/830,236 / Advisory Action dated Nov. 19, 2018, 7 pages, Doc 1569.
U.S. Appl. No. 12/830,236 / Request for Continued Examination filed Dec. 31, 2018, 30 pages, Doc 1570.
U.S. Appl. No. 12/830,236 / Notice of Allowance and Fees Due dated Apr. 2, 2019, 53 pages, Doc 1571.
U.S. Appl. No. 12/830,236 / Supplemental Notice of Allowability dated May 21, 2019, 24 pages, Doc 1023.
U.S. Appl. No. 12/830,236 / Issue Fee Payment dated Jul. 1, 2019, 3 pages, Doc 1024.
U.S. Appl. No. 12/830,236 / Supplemental Allowability dated Jul. 9, 2019, 8 pages, Doc 1573.
U.S. Appl. No. 12/830,236 / Issue Notification dated Jul. 24, 2019, 1 page, Doc 1025.
U.S. Appl. No. 16/459,930 / U.S. Appl. No. 16/459,930, filed Jul. 2, 2019, 99 pages, Doc 1026.
U.S. Appl. No. 16/459,930 / Filing Receipt and Notice to File Missing Parts and Filing Receipt Jul. 18, 2019, 7 pages, Doc 1577.
U.S. Appl. No. 16/459,930 / Response to Notice to File Missing Parts and Preliminary Amendment dated Sep. 4, 2019, 19 pages, Doc 1029.

(56) References Cited

OTHER PUBLICATIONS

U.S. Appl. No. 16/459,930 / Updated Filing Receipt dated Sep. 6, 2019, 4 pages, Doc 1030.
U.S. Appl. No. 16/459,930 / Notice of Publication dated Dec. 12, 2019, 1 page, Doc 1031.
U.S. Appl. No. 16/459,930 / Non-Final Rejection dated Oct. 6, 2020, 43 pages, Doc 1581.
U.S. Appl. No. 16/459,930 / Response to Non-Final Rejection filed Mar. 8, 2021, 19 pages, Doc 2175.
U.S. Appl. No. 16/459,930 / Non-final Office Action dated Jun. 9, 2021, 17 pages, Doc 2304.
U.S. Appl. No. 11/385,257 / New Application Filed Mar. 20, 2006, 118 pages, Doc 1582.
U.S. Appl. No. 11/385,257 / Pre-Exam Formalities Notice May 3, 2006, 2 pages, Doc 1583.
U.S. Appl. No. 11/385,257 / Applicant Response to Pre-Exam Formalities Notice filed Aug. 3, 2006, 46 pages, Doc 1584.
U.S. Appl. No. 11/385,257 / Notice of Publication Nov. 30, 2006, 1 page, Doc 1585.
U.S. Appl. No. 11/385,257 / Non-Final Rejection dated Apr. 29, 2008, 44 pages, Doc 1586.
U.S. Appl. No. 11/385,257 / Transmittal Letter May 23, 2008, 2 pages, Doc 1587.
U.S. Appl. No. 11/385,257 / Amendment / Request for Reconsideration After Non-Final Rejection filed Jul. 29, 2008, 29 pages, Doc 1588.
U.S. Appl. No. 11/385,257 / Final Rejection dated Dec. 9, 2008, 47 pages, Doc 1589.
U.S. Appl. No. 11/385,257 / Request for Continued Examination filed May 11, 2009, 36 pages, Doc 1590.
U.S. Appl. No. 11/385,257 / Supplemental Response or Supplemental Amendment filed May 26, 2009, 3 pages, Doc 1591.
U.S. Appl. No. 11/385,257 / Notice to the Applicant Regarding a Non-Compliant or Non-Responsive Amendment Jun. 1, 2009, 3 pages, Doc 1592.
U.S. Appl. No. 11/385,257 / Amendment / Request for Reconsideration After Non-Final Rejection filed Jun. 30, 2009, 34 pages, Doc 1593.
U.S. Appl. No. 11/385,257 / Non-Final Rejection dated Sep. 14, 2009, 47 pgs, Doc 1594.
U.S. Appl. No. 11/385,257 / Amendment / Request After Non-Final Rejection filed Jan. 13, 2010, 37 pages, Doc 1595.
U.S. Appl. No. 11/385,257 / Final Rejection dated Apr. 12, 2010, 55 pages, Doc 1596.
U.S. Appl. No. 11/385,257 / Request for Continued Examination filed Aug. 12, 2010, 40 pages, Doc 1597.
U.S. Appl. No. 11/385,257 / Non-Final Rejection dated Sep. 30, 2010, 56 pages, Doc 1598.
U.S. Appl. No. 11/385,257 / Amendment / Request for Reconsideration After Non-Final Rejection filed Mar. 29, 2011, 36 pages, Doc 1599.
U.S. Appl. No. 11/385,257 / Final Rejection dated Jun. 1, 2011, 47 pages, Doc 1600.
U.S. Appl. No. 11/385,257 / Request for Continued Examination dated Nov. 1, 2011, 37 pages, Doc 1601.
U.S. Appl. No. 11/385,257 / Non-Final Rejection dated Jan. 9, 2012, 53 pages, Doc 1602.
U.S. Appl. No. 11/385,257 / Amendment / Request for Reconsideration After Non-Final Rejection filed Apr. 6, 2012, 30 pages, Doc 1603.
U.S. Appl. No. 11/385,257 / Notice of Allowance and Fees Due dated Jun. 22, 2012, 45 pages, Doc 1604.
U.S. Appl. No. 11/385,257 / Notice of Allowance and Fees Due dated Oct. 4, 2012, 4 pages, Doc 1606.
U.S. Appl. No. 11/385,257 / Amendment After Notice of Allowance filed Dec. 12, 2012, 8 pages, Doc 1608.
U.S. Appl. No. 11/385,257 / Issue Notification dated Dec. 22, 2012, 1 page, Doc 1610.
U.S. Appl. No. 13/625,812 / Application filed Sep. 24, 2012, 123 pages, Doc 1612.
U.S. Appl. No. 13/625,812 / Notice to File Missing Parts and Filing Receipt Oct. 15, 2012, 6 pages, Doc 1613.
U.S. Appl. No. 13/625,812 / Preliminary Amendment dated Mar. 8, 2013, 50 pages, Doc 1614.
U.S. Appl. No. 13/625,812 / Notice of Incomplete Reply Mar. 15, 2013, 3 pages, Doc 1615.
U.S. Appl. No. 13/625,812 / Applicant Response to Pre-Exam Formalities Notice filed Apr. 2, 2013, 5 pages, Doc 1616.
U.S. Appl. No. 13/625,812 / Notice of Incomplete Reply Apr. 10, 2013, 3 pages, Doc 1617.
U.S. Appl. No. 13/625,812 / Filing Receipt and Miscellaneous Communication to Applicant Apr. 22, 2013, 5 pages, Doc 1619.
U.S. Appl. No. 13/625,812 / General Transmittal of Replacement Application Data Sheet filed May 10, 2013, 8 pages, Doc 1620.
U.S. Appl. No. 13/625,812 / Non-Final Rejection dated Jul. 26, 2013, 64 pages, Doc 1621.
U.S. Appl. No. 13/625,812 / Notice of Publication Aug. 1, 2013, 1 page, Doc 1622.
U.S. Appl. No. 13/625,812 / Amendment / Request for Reconsideration After Non-Final Rejection filed Oct. 9, 2013, 18 pages, Doc 1623.
U.S. Appl. No. 13/625,812 / Final Rejection dated Dec. 3, 2013, 35 pages, Doc 1624.
U.S. Appl. No. 13/625,812 / Response After Final Action filed Apr. 1, 2014, 25 pages, Doc 1625.
U.S. Appl. No. 13/625,812 / Advisory Action dated Apr. 9, 2014, 3 pages, Doc 1626.
U.S. Appl. No. 13/625,812 / Notice of Appeal filed May 5, 2014, 6 pages, Doc 1627.
U.S. Appl. No. 13/625,812 / Request for Continued Examination filed Aug. 4, 2014, 25 pages, Doc 1628.
U.S. Appl. No. 13/625,812 / Request for Corrected Filing Receipt filed Aug. 21, 2014, 9 pages, Doc 1629.
U.S. Appl. No. 13/625,812 / Filing Receipt Aug. 27, 2014, 3 pages, Doc 1630.
U.S. Appl. No. 13/625,812 / Notice of Allowance and Fees Due dated Dec. 9, 2014, 36 pages, Doc 1631.
U.S. Appl. No. 13/625,812 / Filing Receipt Feb. 2, 2015, 3 pages, Doc 1632.
U.S. Appl. No. 13/625,812 / Filing Receipt Feb. 6, 2015, 3 pages, Doc 1634.
U.S. Appl. No. 13/625,812 / Terminal Disclaimer filed Mar. 2, 2015, 5 pages, Doc 1635.
U.S. Appl. No. 13/625,812 / Post-Allowance Communication—Incoming filed Mar. 6, 2015, 8 pages, Doc 1636.
U.S. Appl. No. 13/625,812 / Issue Fee Payment and Amendment After Notice of Allowance filed Mar. 9, 2015, 8 pages, Doc 1637.
U.S. Appl. No. 13/625,812 / Terminal Disclaimer Review Decision Mar. 12, 2015, 1 page, Doc 1639.
U.S. Appl. No. 13/625,812 / Issue Notification dated Apr. 8, 2015, 1 page, Doc 1641.
U.S. Appl. No. 13/625,812 / Terminal Disclaimer filed Apr. 14, 2015, 14 pages, Doc 1642.
U.S. Appl. No. 13/625,812 / Terminal Disclaimer Review Decision Apr. 17, 2015, 1 page, Doc 1643.
U.S. Appl. No. 14/641,735 / Application, Declaration and Power of Attorney filed Mar. 9, 2015, 128 pages, Doc 1645.
U.S. Appl. No. 14/641,735 / Notice to File Missing Parts Mar. 20, 2015, 6 pages, Doc 1646.
U.S. Appl. No. 14/641,735 / Preliminary Amendment filed Jun. 22, 2015, 41 pages, Doc 1647.
U.S. Appl. No. 14/641,735 / Notice of Incomplete Reply Jun. 26, 2015, 3 pages, Doc 1648.
U.S. Appl. No. 14/641,735 / Applicant Response to Pre-Exam Formalities Notice filed Jul. 8, 2015, 36 pages, Doc 1649.
U.S. Appl. No. 14/641,735 / Filing Receipt Jul. 22, 2015, 4 pages, Doc 1650.
U.S. Appl. No. 14/641,735 / Terminal Disclaimer filed Aug. 27, 2025, 7 pages, Doc 1651.
U.S. Appl. No. 14/641,735 / Notice of Publication Oct. 29, 2015, 1 page, Doc 1652.
1/14/201614/641,735 / Preliminary Amendment filed Jan. 14, 2016, 11 pages, Doc 1653.

(56) References Cited

OTHER PUBLICATIONS

U.S. Appl. No. 14/641,735 / Non-Final Rejection dated Jul. 14, 2017, 103 pages, Doc 1654.
U.S. Appl. No. 14/641,735 / Letter Restarting Period for Response and Examiner's Search Strategy and Results Aug. 24, 2017, 34 pages, Doc 1655.
U.S. Appl. No. 14/641,735 / Amendment / Request for Reconsideration After Non-Final Rejection filed Nov. 24, 2017, 30 pages, Doc 1656.
U.S. Appl. No. 14/641,735 / Final Rejection dated Mar. 15, 2018, 30 pages, Doc 1657.
U.S. Appl. No. 14/641,735 / Response After Final Action filed May 15, 2018, 31 pages, Doc 1658.
U.S. Appl. No. 14/641,735 / Advisory Action dated Jun. 8, 2018, 5 pages, Doc 1659.
U.S. Appl. No. 14/641,735 / Applicant Initiated Review Summary dated Jul. 10, 2018, 5 pages, Doc 1661.
U.S. Appl. No. 14/641,735 / Request for Continued Examination filed Jul. 16, 2018, 39 pages, Doc 1662.
U.S. Appl. No. 14/641,735 / Preliminary Amendment filed Oct. 26, 2018, 13 pages, Doc 1663.
U.S. Appl. No. 14/641,735 / Non-Final Rejection dated Nov. 2, 2018, 46 pages, Doc 1664.
U.S. Appl. No. 14/641,735 / Amendment / Request for Reconsideration After Non-Final Rejection filed Feb. 4, 2019, 30 pages, Doc 1665.
U.S. Appl. No. 14/641,735 / Notice of Allowance and Fees Due dated Apr. 15, 2019, 37 pages, Doc 1666.
U.S. Appl. No. 14/641,735 / Issue Fee Payment and Response under 37 CFR § 1.312 dated Jul. 12, 2019, 8 pages, Doc 1032.
U.S. Appl. No. 14/641,735 / Notice of Allowance and Fees Due dated Jul. 26, 2019, 7 pages, Doc 1667.
U.S. Appl. No. 14/641,735 / Supplemental Notice of Allowability dated Jul. 26, 2019, 7 pages, Doc 1033.
U.S. Appl. No. 14/641,735 / Issue Notification dated Aug. 7, 2019, 1 page, Doc 1034.
U.S. Appl. No. 16/513,021 / U.S. Appl. No. 16/513,021, filed Jul. 16, 2019, 130 pages, Doc 1035.
U.S. Appl. No. 16/513,021 / Filing Receipt and Notice to File Missing Parts dated Jul. 30, 2019, 7 pages, Doc 1671.
U.S. Appl. No. 16/513,021 / Response to Notice to File Missing Parts and Preliminary Amendment dated Sep. 11, 2019, 45 pages, Doc 1038.
U.S. Appl. No. 16/513,021 / Updated Filing Receipt dated Sep. 12, 2019, 4 pages, Doc 1039.
U.S. Appl. No. 16/513,021 / Notice of Publication dated Dec. 19, 2019, 1 page, Doc 1040.
U.S. Appl. No. 16/513,021 / Non-final Office Action dated May 5, 2021, 36 pages, Doc 2290.
U.S. Appl. No. 16/513,021 / Response to Non-final Office Action filed Sep. 28, 2021, 36 pages, Doc 2346.
U.S. Appl. No. 11/319,758 / Transmittal of New Application filed Dec. 27, 2005, 79 pages, Doc 1675.
U.S. Appl. No. 11/319,758 / Pre-Exam Formalities Notice Feb. 1, 2006, 2 pages, Doc 1676.
U.S. Appl. No. 11/319,758 / Applicant Response to Pre-Exam Formalities Notice filed Jul. 3, 2006, 15 pages, Doc 1677.
U.S. Appl. No. 11/319,758 / Non-Final Rejection dated Nov. 12, 2008, 46 pages, Doc 1678.
U.S. Appl. No. 11/319,758 / Amendment / Request for Reconsideration After Non-Final Rejection dated May 12, 2009, 40 pages, Doc 1679.
U.S. Appl. No. 11/319,758 / Final Rejection dated Aug. 3, 2009, 39 pages, Doc 1680.
U.S. Appl. No. 11/319,758 / Non-Final Rejection dated Mar. 30, 2010, 58 pages, Doc 1681.
U.S. Appl. No. 11/319,758 / Final Rejection dated Oct. 28, 2010, 58 pages, Doc 1682.
U.S. Appl. No. 11/319,758 / Request for Continued Examination filed Mar. 28, 2011, 37 pages, Doc 1683.
U.S. Appl. No. 11/319,758 / Non-Final Rejection dated Jun. 3, 2011, 57 pages, Doc 1684.
U.S. Appl. No. 11/319,758 / Amendment / Request for Reconsideration After Non-Final Rejection filed Nov. 3, 2011, 35 pages, Doc 1685.
U.S. Appl. No. 11/319,758 / Final Rejection dated Jan. 17, 2012, 41 pages, Doc 1686.
U.S. Appl. No. 11/319,758 / Response After Final Action dated May 17, 2012, 35 pages, Doc 1687.
U.S. Appl. No. 11/319,758 / Advisory Action dated Jun. 20, 2012, 3 pages, Doc 1690.
U.S. Appl. No. 11/319,758 / Response After Final Action filed Jun. 28, 2012, 30 pages, Doc 1691.
U.S. Appl. No. 11/319,758 / Notice of Allowance and Fees Due dated Jul. 17, 2012, 48 pages, Doc 1692.
U.S. Appl. No. 11/319,758 / Amendment After Notice of Allowance and Issue Fee Payment filed Oct. 12, 2012, 12 pages, Doc 1693.
U.S. Appl. No. 11/319,758 / Issue Notification dated Oct. 31, 2012, 4 pages, Doc 1695.
U.S. Appl. No. 13/632,581 / Preliminary Amendment and Application filed Oct. 1, 2012, 90 pages, Doc 1697.
U.S. Appl. No. 13/632,581 / Notice to File Missing Parts and Filing Receipt Oct. 2, 2012, 6 pages, Doc 1698.
U.S. Appl. No. 13/632,581 / Applicant Response to Pre-Exam Formalities Notice filed Feb. 22, 2013, 26 pages, Doc 1699.
U.S. Appl. No. 13/632,581 / Filing Receipt Mar. 5, 2013, 4 pages, Doc 1700.
U.S. Appl. No. 13/632,581 / Notice of Publication Jun. 13, 2013, 1 page, Doc 1701.
U.S. Appl. No. 13/632,581 / Non-Final Rejection dated Jul. 3, 2013, 43 pages, Doc 1702.
U.S. Appl. No. 13/632,581 / Amendment / Request for Reconsideration After Non-Final Rejection filed Sep. 11, 2013, 48 pages, Doc 1703.
U.S. Appl. No. 13/632,581 / Final Rejection dated Dec. 18, 2013, 47 pages, Doc 1704.
U.S. Appl. No. 13/632,581 / Response After Final Action filed Mar. 18, 2014, 40 pages, Doc 1705.
U.S. Appl. No. 13/632,581 / Advisory Action dated Apr. 3, 2014, 15 pages, Doc 1706.
U.S. Appl. No. 13/632,581 / Notice of Appeal filed Apr. 17, 2014, 6 pages, Doc 1707.
U.S. Appl. No. 13/632,581 / Request for Continued Examination filed Jul. 16, 2014, 28 pages, Doc 1708.
U.S. Appl. No. 13/632,581 / Notice of Informal or Non-Responsive CPA Amendment Oct. 20, 2014, 5 pages, Doc 1709.
U.S. Appl. No. 13/632,581 / Amendment / Request for Reconsideration After Non-Final Rejection filed Nov. 4, 2014, 19 pages, Doc 1710.
U.S. Appl. No. 13/632,581 / Non-Final Rejection dated Jan. 27, 2015, 81 pages, Doc 1711.
U.S. Appl. No. 13/632,581 / Amendment / Request for Reconsideration After Non-Final Rejection filed Apr. 20, 2015, 27 pages, Doc 1712.
U.S. Appl. No. 13/632,581 / Final Rejection dated Jul. 20, 2015, 47 pages, Doc 1713.
U.S. Appl. No. 13/632,581 / After Final Consideration Program Request filed Sep. 21, 2015, 31 pages, Doc 1714.
U.S. Appl. No. 13/632,581 / Advisory Action and After Final Consideration Program Decision dated Oct. 2, 2015, 18 pages, Doc 1715.
U.S. Appl. No. 13/632,581 / Request for Continued Examination filed Nov. 30, 2015, 60 pages, Doc 1716.
U.S. Appl. No. 13/632,581 / Notice of Allowance and Fees Due dated Dec. 17, 2015, 89 pages, Doc 1717.
U.S. Appl. No. 13/632,581 / Filing Receipt Jan. 22, 2016, 4 pages, Doc 1719.
U.S. Appl. No. 13/632,581 / Terminal Disclaimer filed Mar. 7, 2016, 8 pages, Doc 1723.
U.S. Appl. No. 13/632,581 / Issue Fee Payment and Amendment After Notice of Allowance filed Mar. 6, 2016, 24 pages, Doc 1724.
U.S. Appl. No. 13/632,581 / Response to Amendment Under Rule 312 Mar. 22, 2016, 18 pages, Doc 1725.

(56) References Cited

OTHER PUBLICATIONS

U.S. Appl. No. 13/632,581 / Issue Notification dated Apr. 13, 2016, 1 page, Doc 1726.
U.S. Appl. No. 15/081,612 / Application, Declaration, and Power of Attorney filed Mar. 25, 2016, 91 pages, Doc 1727.
U.S. Appl. No. 15/081,612 / Notice to File Missing Parts Apr. 11, 2016, 8 pages, Doc 1728.
U.S. Appl. No. 15/081,612 / Preliminary Amendment filed Jun. 13, 2016, 38 pages, Doc 1729.
U.S. Appl. No. 15/081,612 / Preliminary Amendment filed Jun. 14, 2016, 6 pages, Doc 1730.
U.S. Appl. No. 15/081,612 / Filing Receipt Jun. 21, 2016, 4 pages, Doc 1731.
U.S. Appl. No. 15/081,612 / Non-Final Rejection dated Jul. 27, 2016, 91 pages, Doc 1732.
U.S. Appl. No. 15/081,612 / Terminal Disclaimer Sep. 23, 2016, 7 pages, Doc 1733.
U.S. Appl. No. 15/081,612 / Notice of Publication dated Sep. 29, 2016, 1 page, Doc 1734.
U.S. Appl. No. 15/081,612 / Notice of Allowance and Fees Due dated Oct. 17, 2016, 38 pages, Doc 1735.
U.S. Appl. No. 15/081,612 / Notice of Allowance and Fees Due dated Jan. 4, 2017, 4 pages, Doc 1736.
U.S. Appl. No. 15/081,612 / Request for Continued Examination, Amendment After Notice of Allowance and Issue Fee Payment filed Jan. 30, 2017, 11 pages, Doc 1737.
U.S. Appl. No. 15/081,612 / Notice of Allowance and Fees Due dated Jan. 30, 2017, 3 pages, Doc 1738.
U.S. Appl. No. 15/081,612 / Notice of Allowance and Fees Due dated Feb. 13, 2017, 51 pages, Doc 1739.
U.S. Appl. No. 15/081,612 / Amendment After Notice of Allowance and Issue Fee Payment Filed Mar. 20, 2017, 8 pages, Doc 1740.
U.S. Appl. No. 15/081,612 / Issue Notification dated Apr. 20, 2017, 1 page, Doc 1742.
U.S. Appl. No. 15/464,205 / Application, Power of Attorney and Declarations filed Mar. 20, 2017, 122 pages, Doc 1743.
U.S. Appl. No. 15/464,205 / Notice to File Missing Parts Mar. 28, 2017, 10 pages, Doc 1744.
U.S. Appl. No. 15/464,205 / Applicant Response to Pre-Exam Formalities Notice May 31, 2017, 99 pages, Doc 1745.
U.S. Appl. No. 15/464,205 / Filing Receipt Jun. 2, 2017, 5 pages, Doc 1746.
U.S. Appl. No. 15/464,205 / Notice of Publication Sep. 7, 2017, 1 page, Doc 1747.
U.S. Appl. No. 15/464,205 / Preliminary Amendment filed Feb. 22, 2019, 14 pages, Doc 1748.
U.S. Appl. No. 15/464,205 / Non-final Office Action dated Jul. 25, 2019, 64 pages, Doc 1041.
U.S. Appl. No. 15/464,205 / Response to Non-Final Rejection filed Oct. 22, 2019, 21 pages, Doc 1750.
U.S. Appl. No. 15/464,205 / Terminal Disclaimer filed Oct. 22, 2019, 5 pages, Doc 1043.
U.S. Appl. No. 15/464,205 / Final Office Action dated Nov. 14, 2019, 11 pages, Doc 1044.
U.S. Appl. No. 15/464,205 / Response to Final Office Action dated Feb. 12, 2020, 11 pages, Doc 1062.
U.S. Appl. No. 15/464,205 / Advisory Action dated Feb. 25, 2020, 5 pages, Doc 1063.
U.S. Appl. No. 15/464,205 / Request for Continued Examination and Amendment filed Mar. 5, 2020, 20 pages, Doc 1064.
U.S. Appl. No. 15/464,205 / Non-Final Rejection dated Mar. 27, 2020, 52 pages, Doc 1755.
U.S. Appl. No. 15/464,205 / Response to Non-Final Rejection, 19 pages, Doc 1756.
U.S. Appl. No. 15/464,205 / Final Rejection dated Sep. 3, 2020, 100 pages, Doc 1757.
U.S. Appl. No. 15/464,205 / Interview Summary dated Oct. 26, 2020, 8 pages, Doc 1758.
U.S. Appl. No. 15/464,205 / Response to Final Rejection filed Nov. 3, 2020, 21 pages, Doc 1759.
U.S. Appl. No. 15/464,205 / Advisory Action dated Nov. 16, 2020, 10 pages, Doc 1760.
U.S. Appl. No. 15/464,205 / Request for Continued Examination filed Nov. 20, 2020, 24 pages, Doc 1761.
U.S. Appl. No. 15/464,205 / Notice of Allowance/Allowability filed May 26, 2020, 20 pages, Doc 2291.
U.S. Appl. No. 15/464,205 / Request for Continued Examination and 312 Response filed Aug. 26, 2021, 13 pages, Doc 2337.
U.S. Appl. No. 15/464,205 / Notice of Allowance/Allowability dated Sep. 9, 2021, 5 pages, Doc 2347.
U.S. Appl. No. 11/006,842 / Transmittal of New Application filed Dec. 7, 2004, 86 pages, Doc 1762.
U.S. Appl. No. 11/006,842 / Pre-Exam Formalities Notice Jan. 10, 2005, 2 pages, Doc 1763.
U.S. Appl. No. 11/006,842 / Applicant Response to Pre-Exam Formalities Notice filed Apr. 1, 2005, 9 pages, Doc 1764.
U.S. Appl. No. 11/006,842 / Preliminary Amendment filed May 2, 2005, 94 pages, Doc 1765.
U.S. Appl. No. 11/006,842 / Requirement for Restriction / Election dated Jan. 23, 2008, 5 pages, Doc 1766.
U.S. Appl. No. 11/006,842 / Response to Election / Restriction filed Feb. 25, 2008, 28 pages, Doc 1767.
U.S. Appl. No. 11/006,842 / Requirement for Restriction / Election dated May 13, 2008, 5 pages, Doc 1768.
U.S. Appl. No. 11/006,842 / Miscellaneous Communication to Applicant May 15, 2008, 4 pages, Doc 1769.
U.S. Appl. No. 11/006,842 / Amendment / Request for Reconsideration After Non-Final Rejection filed Aug. 13, 2008, 29 pages, Doc 1770.
U.S. Appl. No. 11/006,842 / Non-Final Rejection dated Nov. 3, 2008, 28 pages, Doc 1771.
U.S. Appl. No. 11/006,842 / Amendment / Request for Reconsideration After Non-Final Rejection filed May 4, 2009, 40 pages, Doc 1772.
U.S. Appl. No. 11/006,842 / Supplemental Response or Supplemental Amendment filed Jul. 17, 2009, 25 pages, Doc 1773.
U.S. Appl. No. 11/006,842 / Notice of Allowance and Fees Due dated Jul. 27, 2009, 37 pages, Doc 1774.
U.S. Appl. No. 11/006,842 / Amendment After Notice of Allowance and Issue Fee Payment filed Oct. 27, 2009, 4 pages, Doc 1776.
U.S. Appl. No. 11/006,842 / Miscellaneous Communication to Applicant and Bibliographic Data Sheet Nov. 3, 2009, 2 pages, Doc 1777.
U.S. Appl. No. 11/006,842 / Issue Notification dated Nov. 18, 2009, 1 page, Doc 1778.
U.S. Appl. No. 11/006,842 / Request for Certificate of Correction filed Jun. 1, 2015, 5 pages, Doc 1779.
U.S. Appl. No. 11/006,842 / Certificate of Correction Sep. 15, 2015, 1 page, Doc 1780.
U.S. Appl. No. 12/613,450 / Application, Declaration and Power of Attorney filed Nov. 5, 2009, 63 pages, Doc 1781.
U.S. Appl. No. 12/613,450 / Notice to File Missing Parts Nov. 18, 2009, 6 pages, Doc 1782.
U.S. Appl. No. 12/613,450 / Applicant Response to Pre-Exam Formalities Notice and Preliminary Amendment filed Jan. 19, 2010, 19 pages, Doc 1783.
U.S. Appl. No. 12/613,450 / Filing Receipt Jan. 27, 2010, 3 pages, Doc 1784.
U.S. Appl. No. 12/613,450 / Notice of Publication May 6, 2010, 1 page, Doc 1785.
U.S. Appl. No. 12/613,450 / Requirement for Restriction / Election dated Jun. 10, 2011, 5 pages, Doc 1786.
U.S. Appl. No. 12/613,450 / Response to Election / Restriction filed Jul. 6, 2011, 20 pages, Doc 1787.
U.S. Appl. No. 12/613,450 / Non-Final Rejection dated Aug. 25, 2011, 20 pages, Doc 1788.
U.S. Appl. No. 12/613,450 / Amendment / Request for Reconsideration After Non-Final Rejection filed Dec. 27, 2011, 33 pages, Doc 1789.
U.S. Appl. No. 12/613,450 / Final Rejection dated Feb. 14, 2012, 18 pages, Doc 1790.
U.S. Appl. No. 12/613,450 / Response After Final Action filed Jun. 8, 2012, 24 pages, Doc 1791.

(56) References Cited

OTHER PUBLICATIONS

U.S. Appl. No. 12/613,450 / Advisory Action and Amendment After Final or Under 37CFR 1.312 Jun. 20, 2012, 4 pages, Doc 1792.
U.S. Appl. No. 12/613,450 / Request for Continued Examination filed Jul. 12, 2012, 26 pages, Doc 1793.
U.S. Appl. No. 12/613,450 / Notice of Allowance and Fees Due filed Oct. 7, 2013, 70 pages, Doc 1794.
U.S. Appl. No. 12/613,450 / Terminal Disclaimer filed Jan. 2, 2014, 7 pages, Doc 1798.
U.S. Appl. No. 12/613,450 / Miscellaneous Communication to Applicant Jan. 14, 2014, 6 pages, Doc 1799.
U.S. Appl. No. 12/613,450 / Issue Notification dated Jan. 22, 2014, 1 page, Doc 1800.
U.S. Appl. No. 14/149,749 / Application filed Jan. 7, 2014, 61 pages, Doc 1801.
U.S. Appl. No. 14/149,749 / Notice to File Missing Parts Jan. 23, 2014, 7 pages, Doc 1802.
U.S. Appl. No. 14/149,749 / Applicant Response to Pre-Exam Formalities Notice filed May 23, 2014, 18 pages, Doc 1803.
U.S. Appl. No. 14/149,749 / Notice of Incomplete Reply May 29, 2014, 3 pages, Doc 1804.
U.S. Appl. No. 14/149,749 / Applicant Response to Pre-Exam Formalities Notice filed Aug. 25, 2014, 108 pages, Doc 1805.
U.S. Appl. No. 14/149,749 / Filing Receipt Sep. 4, 2014, 4 pages, Doc 1806.
U.S. Appl. No. 14/149,749 / Notice of Publication Dec. 11, 2014, 1 page, Doc 1809.
U.S. Appl. No. 14/149,749 / Terminal Disclaimer filed Feb. 23, 2015, 5 pages, Doc 1810.
U.S. Appl. No. 14/149,749 / Terminal Disclaimer—Electronic—Approved Feb. 23, 2015, 1 page, Doc 1811.
U.S. Appl. No. 14/149,749 / Examiner Initiated Interview Summary dated Feb. 24, 2015, 2 pages, Doc 1812.
U.S. Appl. No. 14/149,749 / Notice of Allowance and Fees Due dated Apr. 17, 2015, 113 pages, Doc 1813.
U.S. Appl. No. 14/149,749 / e-Terminal Disclaimer filed and approved, and Issue Fee Payment filed May 27, 2015, 22 pages, Doc 1815.
U.S. Appl. No. 14/149,749 / Response to Amendment Under Rule 312 May 29, 2015, 1 page, Doc 1816.
U.S. Appl. No. 14/149,749 / Response to Amendment Under Rule 312 Jun. 1, 2015, 6 pages, Doc 1817.
U.S. Appl. No. 14/149,749 / Issue Notification dated Jun. 17, 2015, 1 page, Doc 1819.
U.S. Appl. No. 14/149,749 / Fee Worksheet Aug. 12, 2015, 1 page, Doc 1820.
U.S. Appl. No. 14/726,192 / Application, Declaration and Power of Attorney filed May 29, 2015, 65 pages, Doc 1821.
U.S. Appl. No. 14/726,192 / Notice to File Missing Parts Jun. 9, 2015, 6 pages, Doc 1822.
U.S. Appl. No. 14/726,192 / Preliminary Amendment filed Aug. 12, 2015, 119 pages, Doc 1823.
U.S. Appl. No. 14/726,192 / Filing Receipt Aug. 20, 2015, 4 pages, Doc 1824.
U.S. Appl. No. 14/726,192 / Terminal Disclaimer filed Nov. 20, 2015, 6 pages, Doc 1825.
U.S. Appl. No. 14/726,192 / Terminal Disclaimer—Electronic—Approved Nov. 20, 2015, 1 page, Doc 1826.
U.S. Appl. No. 14/726,192 / Notice of Publication Nov. 27, 2015, 1 page, Doc 1827.
U.S. Appl. No. 14/726,192 / Notice of Allowance and Fees Due dated May 2, 2016, 139 pages, Doc 1828.
U.S. Appl. No. 14/726,192 / Issue Fee Payment and Amendment After Notice of Allowance filed Jul. 18, 2016, 17 pages, Doc 1830.
U.S. Appl. No. 14/726,192 / Response to Amendment Under Rule 312 Jul. 21, 2016, 1 page, Doc 1831.
U.S. Appl. No. 14/726,192 / Response to Amendment Under Rule 312 and Amendment After Final filed Jul. 22, 2016, 3 pages, Doc 1832.
U.S. Appl. No. 14/726,192 / Issue Notification dated Aug. 3, 2016, 1 page, Doc 1834.
U.S. Appl. No. 15/240,964 / Preliminary Amendment, Declaration and Power of Attorney filed Aug. 31, 2016, 80 pages, Doc 1835.
U.S. Appl. No. 15/240,964 / Filing Receipt and Response Re: Informal Power of Attorney Aug. 31, 2016, 5 pages, Doc 1836.
U.S. Appl. No. 15/240,964 / Notice of Publication Dec. 8, 2016, 1 page, Doc 1839.
U.S. Appl. No. 15/240,964 / Non-Final Rejection dated Mar. 14, 2017, 58 pages, Doc 1840.
U.S. Appl. No. 15/240,964 / Amendment / Request for Reconsideration After Non-Final Rejection filed Jun. 14, 2017, 30 pages, Doc 1841.
U.S. Appl. No. 15/240,964 / Final Rejection dated Aug. 9, 2017, 185 pages, Doc 1842.
U.S. Appl. No. 15/240,964 / Response After Final Action filed Oct. 10, 2017, 33 pages, Doc 1843.
U.S. Appl. No. 15/240,964 / Advisory Action dated Oct. 30, 2017, 3 pages, Doc 1844.
U.S. Appl. No. 15/240,964 / Request for Continued Examination filed Nov. 9, 2017, 36 pages, Doc 1845.
U.S. Appl. No. 15/240,964 / Non-Final Rejection dated Jul. 30, 2018, 267 pages, Doc 1846.
U.S. Appl. No. 15/240,964 / Response to Non-Final Rejection filed Oct. 30, 2018, 45 pages, Doc 1847.
U.S. Appl. No. 15/240,964 / e-Terminal Disclaimer Filed and Approved Feb. 8, 2019, 8 pages, Doc 1848.
U.S. Appl. No. 15/240,964 / Notice of Allowance dated Feb. 21, 2019, 276 pages, Doc 1849.
U.S. Appl. No. 15/240,964 / Issue Fee Payment and Response Under 37 CFR § 1.312 filed May 16, 2019, 16 pages, Doc 1045.
U.S. Appl. No. 15/240,964 / Notice to File Corrected Application Papers dated May 16, 2019, 3 pages, Doc 1046.
U.S. Appl. No. 15/240,964 / Response to Notice to File Corrected Application Papers filed Jul. 22, 2019, 11 pages, Doc 1853.
U.S. Appl. No. 15/240,964 / Issue Notification dated Aug. 21, 2019, 1 page, Doc 1048.
U.S. Appl. No. 16/427,054 / U.S. Appl. No. 16/427,054, filed May 30, 2019, 68 pages, Doc 1049.
U.S. Appl. No. 16/427,054 / Filing Receipt and Notice to File Missing Parts Jun. 6, 2019, 7 pages, Doc 1857.
U.S. Appl. No. 16/427,054 / Response to Notice to File Missing Parts and Preliminary Amendment filed Aug. 8, 2019, 19 pages, Doc 1052.
U.S. Appl. No. 16/427,054 / Updated Filing Receipt dated Aug. 12, 2019, 4 pages, Doc 1053.
U.S. Appl. No. 16/427,054 / Notice of Publication dated Nov. 21, 2019, 1 page, Doc 1054.
U.S. Appl. No. 16/427,054 / Non-Final Rejection dated Nov. 9, 2020, 367 pages, Doc 1861.
U.S. Appl. No. 16/427,054 / Response to Non-Final Rejection dated Feb. 8, 2021, 22 pages, Doc 2163.
U.S. Appl. No. 16/427,054 / Terminal Disclaimer Feb. 8, 2021, 5 pages, Doc 2164.
U.S. Appl. No. 16/427,054 / Final Office Action dated Mar. 25, 2021, 22 pages, Doc 2176.
U.S. Appl. No. 16/427,054 / Request for Continued Examination filed Aug. 25, 2021, 3 pages, Doc 2338.
U.S. Appl. No. 11/320,538 / Transmittal of New Application filed Dec. 27, 2005, 76 pages, Doc 1862.
U.S. Appl. No. 11/320,538 / Pre-Exam Formalities Notice Feb. 2, 2006, 2 pages, Doc 1863.
U.S. Appl. No. 11/320,538 / Applicant Response to Pre-Exam Formalities Notice filed Aug. 4, 2006, 36 pages, Doc 1864.
U.S. Appl. No. 11/320,538 / Non-Final Rejection dated Apr. 1, 2009, 27 pages, Doc 1865.
U.S. Appl. No. 11/320,538 / Amendment / Request for Reconsideration After Non-Final Rejection dated Jul. 1, 2009, 26 pages, Doc 1866.
U.S. Appl. No. 11/320,538 / Final Rejection dated Nov. 2, 2009, 29 pages, Doc 1867.
U.S. Appl. No. 11/320,538 / Amendment Submitted / Entered with Filing of CPA / RCE filed Jan. 4, 2010, 24 pages, Doc 1868.

(56) References Cited

OTHER PUBLICATIONS

U.S. Appl. No. 11/320,538 / Advisory Action dated Jan. 19, 2010, 4 pages, Doc 1869.
U.S. Appl. No. 11/320,538 / Request for Continued Examination filed Apr. 2, 2010, 29 pages, Doc 1870.
U.S. Appl. No. 11/320,538 / Non-Final Rejection dated Jun. 9, 2010, 24 pages, Doc 1871.
U.S. Appl. No. 11/320,538 / Final Rejection dated Dec. 22, 2010, 28 pages, Doc 1872.
U.S. Appl. No. 11/320,538 / Notice of Appeal Filed and Pre-Brief Conference Request filed May 23, 2011, 10 pages, Doc 1873.
U.S. Appl. No. 11/320,538 / Pre-Brief Appeal Conference Decision Jun. 30, 2011, 2 pages, Doc 1874.
U.S. Appl. No. 11/320,538 / Request for Continued Examination filed Dec. 23, 2011, 26 pages, Doc 1875.
U.S. Appl. No. 11/320,538 / Non-Final Rejection dated Dec. 19, 2012, 50 pages, Doc 1876.
U.S. Appl. No. 11/320,538 / Amendment / Request for Reconsideration After Non-Final Rejection filed Apr. 17, 2013, 25 pages, Doc 1877.
U.S. Appl. No. 11/320,538 / Notice of Allowance and Fees Due dated Aug. 1, 2013, 49 pages, Doc 1878.
U.S. Appl. No. 11/320,538 / Issue Fee Payment filed Nov. 1, 2013, 9 pages, Doc 1879.
U.S. Appl. No. 11/320,538 / Notice of Allowance and Fees Due dated Nov. 19, 2013, 46 pages, Doc 1880.
U.S. Appl. No. 11/320,538 / Issue Notification dated Dec. 4, 2013, 1 page, Doc 1882.
U.S. Appl. No. 14/086,741 / Application filed Nov. 21, 2013, 79 pages, Doc 1883.
U.S. Appl. No. 14/086,741 / Notice to File Missing Parts and Filing Receipt Dec. 12, 2013, 7 pages, Doc 1884.
U.S. Appl. No. 14/086,741 / Preliminary Amendment and Applicant Response to Pre-Exam Formalities Notice filed Jun. 12, 2014, 89 pages, Doc 1885.
U.S. Appl. No. 14/086,741 / Filing Receipt Jun. 17, 2014, 4 pages, Doc 1886.
U.S. Appl. No. 14/086,741 / Notice of Publication Sep. 25, 2014, 1 page, Doc 1887.
U.S. Appl. No. 14/086,741 / Terminal Disclaimer and Power of Attorney filed Sep. 29, 2014, 7 pages, Doc 1888.
U.S. Appl. No. 14/086,741 / Terminal Disclaimer Review Decision Sep. 30, 2014, 1 page, Doc 1889.
U.S. Appl. No. 14/086,741 / Notice of Allowance and Fees Due and Communication Re: Power of Attorney dated Oct. 3, 2014, 46 pages, Doc 1890.
U.S. Appl. No. 14/086,741 / Miscellaneous Communication to Applicant and List of References Nov. 26, 2014, 3 pages, Doc 1891.
U.S. Appl. No. 14/086,741 / Amendment after Notice of Allowance and Issue Fee Payment filed Jan. 5, 2015, 19 pages, Doc 1892.
U.S. Appl. No. 14/086,741 / Petition Auto-Grant Letter from EFS Jan. 7, 2015, 2 pages, Doc 1894.
U.S. Appl. No. 14/086,741 / Response to Amendment under Rule 312 filed Jan. 22, 2015, 2 pages, Doc 1895.
U.S. Appl. No. 14/086,741 / Notice of Allowance and Fees Due dated Mar. 16, 2015, 48 pages, Doc 1896.
U.S. Appl. No. 14/086,741 / Issue Notification dated Apr. 1, 2015, 1 page, Doc 1898.
U.S. Appl. No. 14/596,154 / Application and Declaration filed Jan. 13, 2015, 82 pages, Doc 1899.
U.S. Appl. No. 14/596,154 / Notice to File Missing Parts and Filing Receipt Jan. 27, 2015, 7 pages, Doc 1901.
U.S. Appl. No. 14/596,154 / Preliminary Amendment and Applicant Response to Pre-Exam Formalities Notice filed Mar. 27, 2015, 88 pages, Doc 1902.
U.S. Appl. No. 14/596,154 / Filing Receipt Apr. 2, 2015, 3 pages, Doc 1903.
U.S. Appl. No. 14/596,154 / e-Terminal Disclaimer filed and Approved Nov. 20, 2015, 7 pages, Doc 1905.
U.S. Appl. No. 14/596,154 / Non-Final Rejection dated Sep. 21, 2017, 121 pages, Doc 1906.
U.S. Appl. No. 14/596,154 / Amendment / Request for Reconsideration After Non-Final Rejection filed Dec. 21, 2017, 48 pages, Doc 1907.
U.S. Appl. No. 14/596,154 / Notice of Allowance and Fees Due dated May 2, 2018, 56 pages, Doc 1908.
U.S. Appl. No. 14/596,154 / Notice of Allowance and Fees Due dated May 21, 2018, 11 pages, Doc 1909.
U.S. Appl. No. 14/596,154 / Issue Fee Payment filed Jul. 27, 2018, 8 pages, Doc 1910.
U.S. Appl. No. 14/596,1541 / List of References and Considered by Examiner Aug. 8, 2018, 2 pages, Doc 1912.
U.S. Appl. No. 14/596,154 / Issue Notification dated Aug. 21, 2018, 1 page, Doc 1913.
U.S. Appl. No. 16/710,731 / Reissue Application filed Dec. 11, 2019, 91 pages, Doc 1914.
U.S. Appl. No. 16/710,731 / Filing Receipt dated Dec. 12, 2019, 5 pages, Doc 1915.
U.S. Appl. No. 16/710,731 / Request for Corrected Filing Receipt filed Feb. 19, 2020, 16 pages, Doc 1916.
U.S. Appl. No. 16/710,731 / Corrected Filing Receipt dated Feb. 24, 2020, 4 pages, Doc 1066.
U.S. Appl. No. 16/710,731 / Non-Final Rejection dated Nov. 24, 2020, 15 pages, Doc 1918.
U.S. Appl. No. 16/710,731 / Response to Non-Final Rejection dated Nov. 24, 2020, 21 pages, Doc 2177.
U.S. Appl. No. 16/710,731 / Response to Non-Final Rejection filed Mar. 23, 2021, 21 pages, Doc 2307.
U.S. Appl. No. 16/710,731 / Non-Final Rejection dated Apr. 21, 2021, 11 pages, Doc 2292.
U.S. Appl. No. 16/710,731 / Response to Non-Final Rejection filed Sep. 15, 2021, 24 pages, Doc 2348.
U.S. Appl. No. 16/048,113 / Application filed Jul. 27, 2018, 86 pages, Doc 1919.
U.S. Appl. No. 16/048,113 / Filing Receipt and Notice to File Missing Parts Aug. 24, 2018, 6 pages, Doc 1920.
U.S. Appl. No. 16/048,113 / Notice of Publication Jan. 31, 2019, 1 page, Doc 1923.
U.S. Appl. No. 16/048,113 / Non-Final Rejection dated Oct. 2, 2020, 130 pages, Doc 1924.
U.S. Appl. No. 16/048,113 / Response to Non-Final Rejection dated Feb. 2, 2021, 22 pages, Doc 2165.
U.S. Appl. No. 16/048,113 / Terminal Disclaimer Oct. 2, 2020, 5 pages, Doc 2166.
U.S. Appl. No. 16/048,113 / Notice of Allowance/Allowability dated Apr. 6, 2021, 75 pages, Doc 2293.
U.S. Appl. No. 16/048,113 / Issue Fee Payment and 312 Response filed Jul. 6, 2021, 12 pages, Doc 2307.
U.S. Appl. No. 16/048,113 / Issue Notification dated Aug. 4, 2021, 1 page, Doc 2339.
U.S. Appl. No. 11/361,500 / Transmittal of New Application Feb. 23, 2006, 77 pages, Doc 1925.
U.S. Appl. No. 11/361,500 / Pre-Exam Formalities Notice Mar. 23, 2006, 2 pages, Doc 1926.
U.S. Appl. No. 11/361,500 / Applicant Response to Pre-Exam Formalities Notice filed Jul. 19, 2006, 27 pages, Doc 1927.
U.S. Appl. No. 11/361,500 / Notice of Publication Nov. 16, 2006, 1 page, Doc 1928.
U.S. Appl. No. 11/361,500 / Non-Final Rejection dated May 27, 2009, 27 pages, Doc 1929.
U.S. Appl. No. 11/361,500 / Amendment / Request for Reconsideration After Non-Final Rejection filed Aug. 27, 2009, 37 pages, Doc 1930.
U.S. Appl. No. 11/361,500 / Notice of Allowance and Fees Due dated Dec. 11, 2009, 134 pages, Doc 1931.
U.S. Appl. No. 11/361,500 / Issue Fee Payment and Amendment After Notice of Allowance filed Jan. 6, 2010, 26 pages, Doc 1932.
U.S. Appl. No. 11/361,500 / Response to Amendment Under Rule 312 Jan. 25, 2010, 7 pages, Doc 1933.
U.S. Appl. No. 11/361,500 / Issue Notification dated Feb. 24, 2010, 1 page, Doc 1934.

(56) References Cited

OTHER PUBLICATIONS

U.S. Appl. No. 11/361,500 / Filing Receipt and Notice to File Missing Parts Feb. 25, 2010, 5 pages, Doc 1936.
U.S. Appl. No. 11/361,500 / Applicant Response to Pre-Exam Formalities Notice filed Apr. 26, 2010, 13 pages, Doc 1937.
U.S. Appl. No. 11/361,500 / Filing Receipt May 4, 2010, 3 pages, Doc 1938.
U.S. Appl. No. 11/361,500 / Notice of Publication Aug. 12, 2010, 1 page, Doc 1939.
U.S. Appl. No. 11/361,500 / Non-Final Rejection dated Aug. 30, 2012, 31 pages, Doc 1940.
U.S. Appl. No. 11/361,500 / Amendment / Request for Reconsideration After Non-Final Rejection filed Nov. 20, 2012, 15 pages, Doc 1941.
U.S. Appl. No. 11/361,500 / Terminal Disclaimer filed Jan. 2, 2013, 5 pages, Doc 1942.
U.S. Appl. No. 11/361,500 / Terminal Disclaimer Review Decision Jan. 4, 2013, 1 page, Doc 1943.
U.S. Appl. No. 11/361,500 / Notice of Allowance and Fees Due dated Jan. 10, 2013, 144 pages, Doc 1944.
U.S. Appl. No. 11/361,500 / Issue Fee Payment Apr. 10, 2013, 8 pages, Doc 1945.
U.S. Appl. No. 11/361,500 / Issue Notification dated Apr. 24, 2013, 1 page, Doc 1948.
U.S. Appl. No. 12/702,243 / Application and Preliminary Amendment filed Feb. 8, 2010, 84 pages, Doc 1952.
U.S. Appl. No. 12/702,243 / Notice to File Missing Parts and Filing Receipt Feb. 25, 2010, 5 pages, Doc 1953.
U.S. Appl. No. 12/702,243 / Applicant Response to Pre-Exam Formalities Notice Apr. 26, 2010, 13 pages, Doc 1954.
U.S. Appl. No. 12/702,243 / Filing Receipt May 4, 2010, 3 pages, Doc 1955.
U.S. Appl. No. 12/702,243 / Notice of Publication Aug. 12, 2010, 1 page, Doc 1956.
U.S. Appl. No. 12/702,243 / Non-Final Rejection dated Aug. 30, 2012, 31 pages, Doc 1957.
U.S. Appl. No. 12/702,243 / Amendment / Request for Reconsideration After Non-Final Rejection filed Nov. 20, 2012, 15 pages, Doc 1958.
U.S. Appl. No. 12/702,243 / Terminal Disclaimer filed Jan. 2, 2013, 5 pages, Doc 1959.
U.S. Appl. No. 12/702,243 / Terminal Disclaimer Review Decision Jan. 4, 2013, 1 page, Doc 1960.
U.S. Appl. No. 12/702,243 / Notice of Allowance and Fees Due dated Jan. 10, 2013, 120 pages, Doc 1961.
U.S. Appl. No. 12/702,243 / Issue Fee Payment and Post-Allowance Communication filed Apr. 10, 2013, 8 pages, Doc 1962.
U.S. Appl. No. 12/702,243 / List of References and Considered by Examiner Apr. 13, 2013, 4 pages, Doc 1964.
U.S. Appl. No. 12/702,243 / Issue Notification dated Apr. 24, 2013, 1 page, Doc 1965.
U.S. Appl. No. 13/860,482 / Application and Preliminary Amendment filed Apr. 10, 2013, 99 pages, Doc 1969.
U.S. Appl. No. 13/860,482 / Notice to File Missing Parts and Filing Receipt May 21, 2013, 6 pages, Doc 1970.
U.S. Appl. No. 13/860,482 / Applicant Response to Pre-Exam Formalities Notice filed Oct. 22, 2013, 7 pages, Doc 1971.
U.S. Appl. No. 13/860,482 / Filing Receipt and Fee Worksheet Oct. 28, 2013, 4 pages, Doc 1972.
U.S. Appl. No. 13/860,482 / Notice of Publication Feb. 6, 2014, 1 page, Doc 1973.
U.S. Appl. No. 13/860,482 / Non-Final Rejection dated Jun. 9, 2014, 14 pages, Doc 1974.
U.S. Appl. No. 13/860,482 / Amendment / Request for Reconsideration After Non-Final Rejection and Terminal Disclaimer filed Sep. 8, 2014, 24 pages, Doc 1975.
U.S. Appl. No. 13/860,482 / Terminal Disclaimer Review Decision Sep. 9, 2014, 1 page, Doc 1976.
U.S. Appl. No. 13/860,482 / Terminal Disclaimer Filed Oct. 8, 2014, 4 pages, Doc 1978.
U.S. Appl. No. 13/860,482 / Terminal Disclaimer Review Decision Oct. 9, 2014, 1 page, Doc 1979.
U.S. Appl. No. 13/860,482 / Notice of Allowance and Fees Due dated Nov. 5, 2014, 95 pages, Doc 1981.
U.S. Appl. No. 13/860,482 / Issue Fee Payment and Amendment Made After Notice of Allowance filed Feb. 4, 2015, 8 pages, Doc 1982.
U.S. Appl. No. 13/860,482 / Issue Information Including Classification, Examiner, Name, Claim, Renumbering, etc. Feb. 6, 2015, 1 page, Doc 1983.
U.S. Appl. No. 13/860,482 / Issue Notification dated Mar. 4, 2015, 1 page, Doc 1985.
U.S. Appl. No. 14/614,292 / Application and Declaration filed Feb. 4, 2015, 82 pages, Doc 1986.
U.S. Appl. No. 14/614,292 / Notice to File Missing Parts and Filing Receipt Feb. 20, 2015, 6 pages, Doc 1987.
U.S. Appl. No. 14/614,292 / Applicant Response to Pre-Exam Formalities Notice Apr. 17, 2015, 34 pages, Doc 1988.
U.S. Appl. No. 14/614,292 / Filing Receipt and Fee Worksheet Apr. 24, 2015, 4 pages, Doc 1989.
U.S. Appl. No. 14/614,292 / Notice of Publication Aug. 6, 2015, 1 page, Doc 1990.
U.S. Appl. No. 14/614,292 / e-Terminal Disclaimer Filed and Approved Nov. 20, 2015, 7 pages, Doc 1991.
U.S. Appl. No. 14/614,292 / Non-Final Rejection dated May 19, 2016, 84 pages, Doc 1992.
U.S. Appl. No. 14/614,292 / Amendment / Request for Reconsideration After Non-Final Rejection filed Aug. 18, 2016, 23 pages, Doc 1993.
U.S. Appl. No. 14/614,292 / Notice of Allowance and Fees Due dated Sep. 21, 2016, 153 pages, Doc 1994.
U.S. Appl. No. 14/614,292 / Issue Fee Payment and Amendment After Notice of Allowance filed Dec. 21, 2016, 8 pages, Doc 1995.
U.S. Appl. No. 14/614,292 / Issue Notification dated Jan. 18, 2017, 1 page, Doc 1997.
U.S. Appl. No. 15/411,823 / Application, Power of Attorney, Declaration and Preliminary Amendment filed Jan. 20, 2017, 116 pages, Doc 1998.
U.S. Appl. No. 15/411,823 / Filing Receipt and Fee Worksheet Jan. 31, 2017, 4 pages, Doc 1999.
U.S. Appl. No. 15/411,823 / Notice of Publication May 11, 2017, 1 page, Doc 2000.
U.S. Appl. No. 15/411,823 / Non-Final Rejection dated Jan. 25, 2018, 85 pages, Doc 2001.
U.S. Appl. No. 15/411,823 / e-Terminal Disclaimer Filed and Approved Apr. 24, 2018, 28 pages, Doc 2002.
U.S. Appl. No. 15/411,823 / Notice of Allowance and Fees Due filed Jul. 13, 2018, 101 pages, Doc 2003.
U.S. Appl. No. 15/411,823 / Issue Fee Payment filed and Miscellaneous Incoming Letter Oct. 15, 2018, 8 pages, Doc 2004.
U.S. Appl. No. 15/411,823 / Issue Notification dated Nov. 7, 2018, 1 page, Doc 2008.
U.S. Appl. No. 16/164,430 / Application filed Oct. 18, 2018, 84 pages, Doc 2009.
U.S. Appl. No. 16/164,430 / Notice to File Missing Parts and Filing Receipt Nov. 6, 2018, 7 pages, Doc 2010.
U.S. Appl. No. 16/164,430 / Response to Notice of Missing Parts filed Jan. 18, 2019, 37 pages, Doc 2011.
U.S. Appl. No. 16/164,430 / Updatd Filing Receipt Jan. 23, 2019, 5 pages, Doc 2012.
U.S. Appl. No. 16/164,430 / Notice of Publication May 2, 2019, 1 page, Doc 2013.
U.S. Appl. No. 16/164,430 / Non-Final Rejection dated Oct. 18, 2019, 122 pages, Doc 2014.
U.S. Appl. No. 16/164,430 / Non-final Office Action dated Oct. 18, 2019, 107 pages, Doc 1058.
U.S. Appl. No. 16/164,430 / Response to Non-Final Rejection filed Jan. 21, 2020, 15 pages, Doc 2015.
U.S. Appl. No. 16/164,430 / Notice of Allowance dated Mar. 6, 2020, 86 pages, Doc 2016.
U.S. Appl. No. 16/164,430 / Issue Fee Payment filed Jun. 8, 2020, 4 pages, Doc 2017.

(56) References Cited

OTHER PUBLICATIONS

U.S. Appl. No. 16/164,430 / Supplemental Notice of Allowability dated Jun. 16, 2020, 12 pages, Doc 2018.
U.S. Appl. No. 16/164,430 / Issue Notification dated Jun. 17, 2020, 1 page, Doc 2154.
U.S. Appl. No. 16/164,430 / Request for Certificate of Correction filed Sep. 3, 2020, 6 pages, Doc 2021.
U.S. Appl. No. 16/164,430 / Certificate of Correction Oct. 6, 2020, 1 page, Doc 2023.
U.S. Appl. No. 16/898,134 / Application filed Jun. 10, 2020, 84 pages, Doc 2024.
U.S. Appl. No. 16/898,134 / Filing Receipt and Notice to File Missing Parts Jun. 19, 2020, 8 pages, Doc 2025.
U.S. Appl. No. 16/898,134 / Preliminary Amendment and Response to Mising Parts filed Aug. 18, 2020, 39 pages, Doc 2026.
U.S. Appl. No. 16/898,134 / Updated Filing Receipt Aug. 21, 2020, 6 pages, Doc 2027.
U.S. Appl. No. 16/898,134 / Notice of Publication Nov. 27, 2020, 2 pages, Doc 2028.
U.S. Appl. No. 16/898,134 / Non-final Office Action dated Jun. 30, 2021, 57 pages, Doc 2308.
U.S. Appl. No. 16/898,134 / Response to Non-final Office Action and Terminal Disclaimer filed Jul. 30, 2021, 30 pages, Doc 2342.
U.S. Appl. No. 16/898,134 / Notice of Allowance/Allowability dated Sep. 22, 2021, 8 pages, Doc 2349.
U.S. Appl. No. 11/412,417 / New Application filed Apr. 26, 2006, 96 pages, Doc 2029.
U.S. Appl. No. 11/412,417 / Pre-Exam Formalities Notice May 19, 2006, 2 pages, Doc 2030.
U.S. Appl. No. 11/412,417 / Applicant Response to Pre-Exam Formalities Notice filed Jul. 19, 2006, 14 pages, Doc 2031.
U.S. Appl. No. 11/412,417 / Non-Final Rejection dated Apr. 1, 2008, 53 pages, Doc 2032.
U.S. Appl. No. 11/412,417 / Amendment / Request for Reconsideration After Non-Final Rejection filed Aug. 1, 2008, 34 pages, Doc 2033.
U.S. Appl. No. 11/412,417 / Final Rejection dated Nov. 13, 2008, 40 pages, Doc 2034.
U.S. Appl. No. 11/412,417 / Request for Continued Examination and Amendment Submitted with Filing of Request for Continued Examination filed May 12, 2009, 36 pages, Doc 2035.
U.S. Appl. No. 11/412,417 / Non-Final Rejection dated Jun. 30, 2009, 141 pages, Doc 2036.
U.S. Appl. No. 11/412,417 / Amendment / Request for Reconsideration After Non-Final Rejection filed Oct. 30, 2009, 36 pages, Doc 2037.
U.S. Appl. No. 11/412,417 / Final Rejection dated Jan. 4, 2010, 43 pages, Doc 2038.
U.S. Appl. No. 11/412,417 / Request for Continued Examination filed May 4, 2010, 32 pages, Doc 2039.
U.S. Appl. No. 11/412,417 / Supplemental Remarks or Supplemental Amendment filed Jun. 22, 2010, 25 pages, Doc 2040.
U.S. Appl. No. 11/412,417 / Notice of Allowance and Fees Due dated Jul. 6, 2010, 23 pages, Doc 2041.
U.S. Appl. No. 11/412,417 / Request for Continued Examination filed Oct. 5, 2010, 4 pages, Doc 2043.
U.S. Appl. No. 11/412,417 / Notice of Allowance and Fees Due dated Oct. 26, 2010, 17 pages, Doc 2044.
U.S. Appl. No. 11/412,417 / Issue Fee Payment and Miscellaneous Incoming Letter filed Jan. 26, 2011, 3 pages, Doc 2045.
U.S. Appl. No. 11/412,417 / Issue Notification dated Feb. 9, 2011, 1 page, Doc 2047.
U.S. Appl. No. 13/030,084 / Application and Declaration filed Feb. 17, 2011, 105 pages, Doc 2048.
U.S. Appl. No. 13/030,084 / Notice to File Missing Parts Mar. 3, 2011, 6 pages, Doc 2049.
U.S. Appl. No. 13/030,084 / Applicant Response to Pre-Exam Formalities Notice filed Aug. 3, 2011, 29 pages, Doc 2050.
U.S. Appl. No. 13/030,084 / Filing Receipt Aug. 11, 2011, 4 pages, Doc 2051.
U.S. Appl. No. 13/030,084 / Non-Final Rejection dated Oct. 26, 2011, 39 pages, Doc 2052.
U.S. Appl. No. 13/030,084 / Notice of Publication Nov. 17, 2011, 1 page, Doc 2053.
U.S. Appl. No. 13/030,084 / Informal or Non-Responsive Amendment filed Jan. 26, 2012, 35 pages, Doc 2054.
U.S. Appl. No. 13/030,084 / Notice to Applicant Regarding a Non-Compliant or Non-Responsive Amendment Jan. 31, 2012, 4 pages, Doc 2055.
U.S. Appl. No. 13/030,084 / Amendment / Request for Reconsideration After Non-Final Rejection filed Feb. 9, 2012, 36 pages, Doc 2056.
U.S. Appl. No. 13/030,084 / Final Rejection dated Mar. 28, 2012, 62 pages, Doc 2057.
U.S. Appl. No. 13/030,084 / Response After Final Action filed Jun. 14, 2012, 90 pages, Doc 2058.
U.S. Appl. No. 13/030,084 / Advisory Action dated Jun. 26, 2012, 4 pages, Doc 2059.
U.S. Appl. No. 13/030,084 / Request for Continued Examination filed Jul. 23, 2012, 91 pages, Doc 2060.
U.S. Appl. No. 13/030,084 / Notice to Applicant Regarding a Non-Compliant or Non-Responsive Amendment Jul. 25, 2012, 2 pages, Doc 2061.
U.S. Appl. No. 13/030,084 / Amendment / Request for Reconsideration After Non-Final Rejection filed Jan. 2, 2013, 40 pages, Doc 2062.
U.S. Appl. No. 13/030,084 / Non-Final Rejection dated Apr. 30, 2013, 45 pages, Doc 2064.
U.S. Appl. No. 13/030,084 / Amendment / Request for Reconsideration After Non-Final Rejection dated Jul. 30, 2013, 30 pages, Doc 2065.
U.S. Appl. No. 13/030,084 / Non-Final Rejection dated Oct. 10, 2013, 50 pages, Doc 2066.
U.S. Appl. No. 13/030,084 / Amendment / Request for Reconsideration After Non-Final Rejection filed Jan. 2, 2014, 27 pages, Doc 2067.
U.S. Appl. No. 13/030,084 / Final Rejection dated Mar. 19, 2014, 48 pages, Doc 2068.
U.S. Appl. No. 13/030,084 / Amendment Submitted / Entered with Filing of CPA / Request for Continued Examination filed May 19, 2014, 41 pages, Doc 2069.
U.S. Appl. No. 13/030,084 / Advisory Action dated Jun. 6, 2014, 6 pages, Doc 2070.
U.S. Appl. No. 13/030,084 / Applicant Initiated Interview Summary dated Jul. 1, 2014, 3 pages, Doc 2071.
U.S. Appl. No. 13/030,084 / Request for Continued Examination filed Aug. 15, 2014, 31 pages, Doc 2072.
U.S. Appl. No. 13/030,084 / Non-Final Rejection dated Mar. 24, 2015, 45 pages, Doc 2073.
U.S. Appl. No. 13/030,084 / Amendment / Request for Reconsideration After Non-Final Rejection filed Jun. 24, 2015, 31 pages, Doc 2074.
U.S. Appl. No. 13/030,084 / e-Terminal Disclaimer filed and approved and Communication Re: Power of Attorney Sep. 10, 2015, 9 pages, Doc 2077.
U.S. Appl. No. 13/030,084 / Notice of Allowance and Fees Due Sep. 17, 2015, 46 pages, Doc 2078.
U.S. Appl. No. 13/030,084 / Post-Allowance Communication—Incoming Nov. 13, 2015, 4 pages, Doc 2082.
U.S. Appl. No. 13/030,084 / Miscellaneous Communication Applicant Nov. 30, 2015, 49 pages, Doc 2083.
U.S. Appl. No. 13/030,084 / Issue Fee Payment filed Dec. 10, 2015, 8 pages, Doc 2084.
U.S. Appl. No. 13/030,084 / Issue Notification dated Jan. 16, 2016, 1 page, Doc 2086.
U.S. Appl. No. 14/968,429 / Application filed Dec. 14, 2015, 119 pages, Doc 2087.
U.S. Appl. No. 14/968,429 / Filing Receipt and Notice to File Corrected Application Papers Jan. 4, 2016, 6 pages, Doc 2088.
U.S. Appl. No. 14/968,429 / Applicant Response to Pre-Exam Formalities Notice filed Jan. 14, 2016, 38 pages, Doc 2089.
U.S. Appl. No. 14/968,429 / Filing Receipt and Miscellaneous Communication to Applicant Jan. 21, 2016, 5 pages, Doc 2090.

(56) References Cited

OTHER PUBLICATIONS

U.S. Appl. No. 14/968,429 / Notice of Publication Apr. 28, 2016, 1 page, Doc 2093.
U.S. Appl. No. 14/968,429 / Non-Final Rejection dated May 15, 2017, 56 pages, Doc 2094.
U.S. Appl. No. 14/968,429 / Amendment / Request for Reconsideration After Non-Final Rejection, 22 pages, Doc 2095.
U.S. Appl. No. 14/968,429 / Final Rejection dated Oct. 24, 2017, 11 pages, Doc 2096.
U.S. Appl. No. 14/968,429 / Response After Final Action and After Final Consideration Program Request filed Dec. 26, 2017, 31 pages, Doc 2097.
U.S. Appl. No. 14/968,429 / Advisory Action and After Final Consideration Program Decision dated Jan. 11, 2018, 7 pages, Doc 2098.
U.S. Appl. No. 14/968,429 / e-Terminal Disclaimer filed and Approved and Response After Final Action filed Feb. 7, 2018, 25 pages, Doc 2099.
U.S. Appl. No. 14/968,429 / Amendment After Final filed Feb. 26, 2018, 16 pages, Doc 2100.
U.S. Appl. No. 14/968,429 / Notice of Allowance and Fees Due dated Mar. 19, 2018, 47 pages, Doc 2101.
U.S. Appl. No. 14/968,429 / Amendment After Notice of Allowance and Issue Fee Payment filed May 29, 2018, 17 pages, Doc 2102.
U.S. Appl. No. 14/968,429 / Amendment After Notice of Allowance filed May 31, 2018, 14 pages, Doc 2103.
U.S. Appl. No. 14/968,429 / Amendment After Notice of Allowance filed Jun. 13, 2018, 14 pages, Doc 2104.
U.S. Appl. No. 14/968,429 / Response to Amendment Under Rule 312 Jul. 10, 2018, 5 pages, Doc 2105.
U.S. Appl. No. 14/968,429 / Response to Amendment Under Rule 312 Jul. 23, 2018, 3 pages, Doc 2106.
U.S. Appl. No. 14/968,429 / Issue Notification dated Aug. 1, 2018, 1 page, Doc 2107.
U.S. Appl. No. 14/968,429 / Request for Certificate of Correction filed Oct. 12, 2018, 6 pages, Doc 2108.
U.S. Appl. No. 14/968,429 / Certificate of Correction Nov. 20, 2018, 1 page, Doc 2109.
U.S. Appl. No. 16/048,061 / Application filed Jul. 27, 2018, 109 pages, Doc 2110.
U.S. Appl. No. 16/048,061 / Notice to File Missing Parts and Filing Receipt Aug. 13, 2018, 7 pages, Doc 2111.
U.S. Appl. No. 16/048,061 / Applicant Response to Pre-Exam Formalities Notice filed Oct. 12, 2018, 45 pages, Doc 2112.
U.S. Appl. No. 16/048,061 / Filing Receipt Oct. 16, 2018, 5 pages, Doc 2113.
U.S. Appl. No. 16/048,061 / Request for Corrected Filing Receipt filed Oct. 31, 2018, 8 pages, Doc 2114.
U.S. Appl. No. 16/048,061 / Filing Receipt Nov. 5, 2018, 4 pages, Doc 2115.
U.S. Appl. No. 16/048,061 / Notice of Publication Jan. 24, 2019, 1 page, Doc 2116.
U.S. Appl. No. 16/048,061 / Non-Final Rejection dated Sep. 25, 2020, 68 pages, Doc 2117.
U.S. Appl. No. 16/048,061 / Response to Non-Final Rejection filed Jan. 25, 2021, 17 pages, Doc 2167.
U.S. Appl. No. 16/048,061 / Terminal Disclaimer filed Jan. 25, 2021, 6 pages, Doc 2168.
U.S. Appl. No. 16/048,061 / Notice of Allowance/Allowability dated Apr. 9, 2021, 33 pages, Doc 2294.
U.S. Appl. No. 16/048,061 / Issue Fee Payment and 312 Response filed Jul. 9, 2021, 19 pages, Doc 2312.
U.S. Appl. No. 16/048,061 / eTerminal Disclaimer filed Jul. 9, 2021, 3 pages, Doc 2313.
U.S. Appl. No. 16/048,061 / Issue Notification dated Aug. 4, 2021, 1 page, Doc 2350.
U.S. Appl. No. 16/164,535 / Application filed Oct. 18, 2018, 122 pages, Doc 2118.
U.S. Appl. No. 16/164,535 / Notice to File Corrected Application Papers and Filing Receipt Nov. 7, 2018, 7 pages, Doc 2119.
U.S. Appl. No. 16/164,535 / Applicant Response to Pre-Exam Formalities Notice filed Jan. 7, 2019, 27 pages, Doc 2120.
U.S. Appl. No. 16/164,535 / Updated Filing Receipt Jan. 11, 2019, 5 pages, Doc 2121.
U.S. Appl. No. 16/164,535 / Notice of Publication Apr. 25, 2019, 1 page, Doc 2122.
U.S. Appl. No. 16/164,535 / Non-Final Rejection dated Nov. 24, 2020, 76 pages, Doc 2123.
U.S. Appl. No. 16/164,535 / Response to Non-Final Rejection filed Feb. 19, 2021, 17 pages, Doc 2169.
U.S. Appl. No. 16/164,535 / Terminal Disclaimer filed Feb. 19, 2021, 6 pages, Doc 2170.
U.S. Appl. No. 16/164,535 / Notice of Allowance/Allowability dated Feb. 19, 2021, 6 pages, Doc 2295.
U.S. Appl. No. 16/164,535 / Request for Continued Examination and Amendment filed Jun. 17, 2021, 58 pages, Doc 2309.
U.S. Appl. No. 16/164,535 / Notice of Allowance / Allowability and Examiner-Initialed SB08 Listing dated Jul. 8, 2021, 20 pages, Doc 2311.
U.S. Appl. No. 16/164,535 / Issue Fee Payment and 312 Response filed Oct. 8, 2021, 17pages, Doc 2356.
U.S. Appl. No. 17/378,119 / Patent Application filed Jul. 16, 2021, 125 pages, Doc 2343.
U.S. Appl. No. 17/378,119 / Filing Receipt dated Jul. 29, 2021, 4 pages, Doc 2344.
U.S. Appl. No. 17/378,119 / Notice to File Corrected Application Papers dated Jul. 29, 2021, 2 pages, Doc 2345.
U.S. Appl. No. 11/480,094 / Application filed Jun. 29, 2006, 125 pages, Doc 2124.
U.S. Appl. No. 11/480,094 / Pre-Exam Formalities Notice Aug. 2, 2006, 2 pages, Doc 2125.
U.S. Appl. No. 11/480,094 / Applicant Response to Pre-Exam Formalities Notice filed Nov. 2, 2006, 32 pages, Doc 2126.
U.S. Appl. No. 11/480,094 / Filing Receipt Dec. 7, 2006, 3 pages, Doc 2127.
U.S. Appl. No. 11/480,094 / Non-Final Rejection dated Nov. 7, 2008, 28 pages, Doc 2128.
U.S. Appl. No. 11/480,094 / Amendment / Request for Reconsideration After Non-Final Rejection filed May 7, 2009, 37 pages, Doc 2129.
U.S. Appl. No. 11/480,094 / Final Rejection dated Jul. 28, 2009, 16 pages, Doc 2130.
U.S. Appl. No. 11/480,094 / Request for Continued Examination filed Dec. 28, 2009, 39 pages, Doc 2131.
U.S. Appl. No. 11/480,094 / Non-Final Rejection dated Dec. 15, 2010, 33 pages, Doc 2132.
U.S. Appl. No. 11/480,094 / Amendment / Request for Reconsideration After Non-Final Rejection filed May 16, 2011, 34 pages, Doc 2133.
U.S. Appl. No. 11/480,094 / Final Rejection dated Aug. 1, 2011, 26 pages, Doc 2134.
U.S. Appl. No. 11/480,094 / Response After Final Action filed Nov. 1, 2011, 35 pages, Doc 2135.
U.S. Appl. No. 11/480,094 / Advisory Action dated Nov. 14, 2011, 3 pages, Doc 2136.
U.S. Appl. No. 11/480,094 / Notice of Appeal Filed Nov. 28, 2011, 5 pages, Doc 2137 pages.
U.S. Appl. No. 11/480,094 / Abandonment Jul. 31, 2012, 2 pages, Doc 2138.

\* cited by examiner

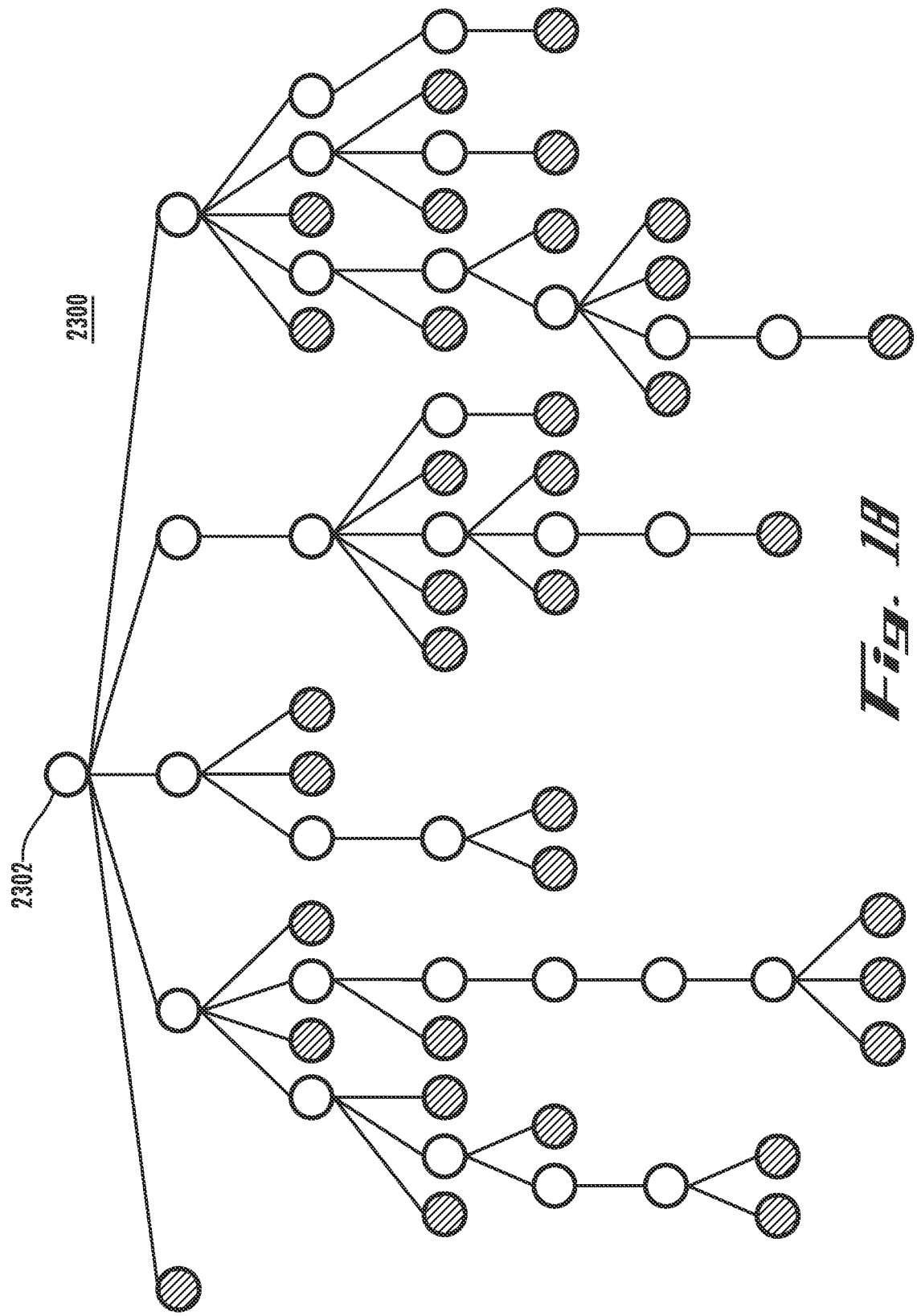

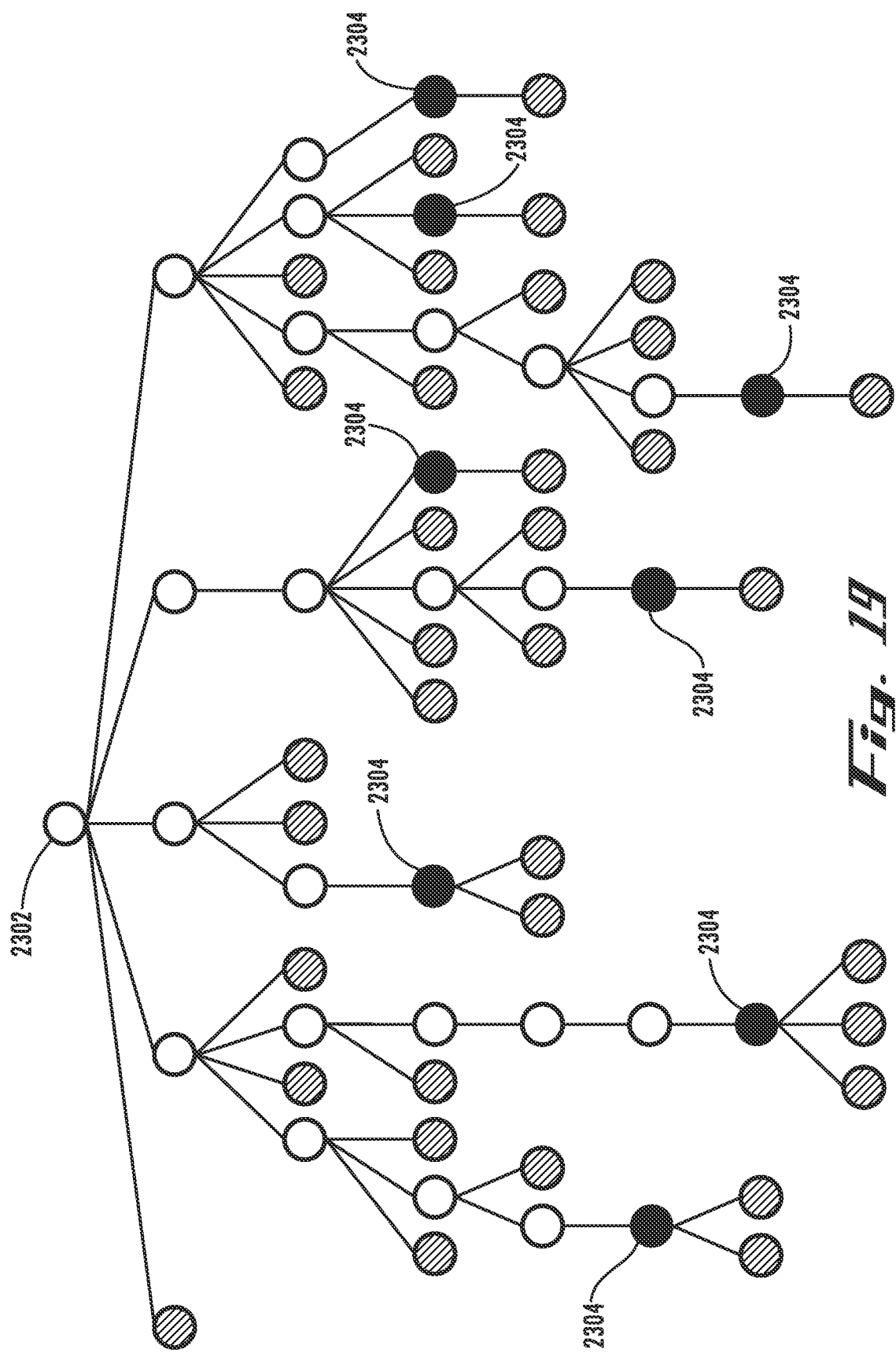

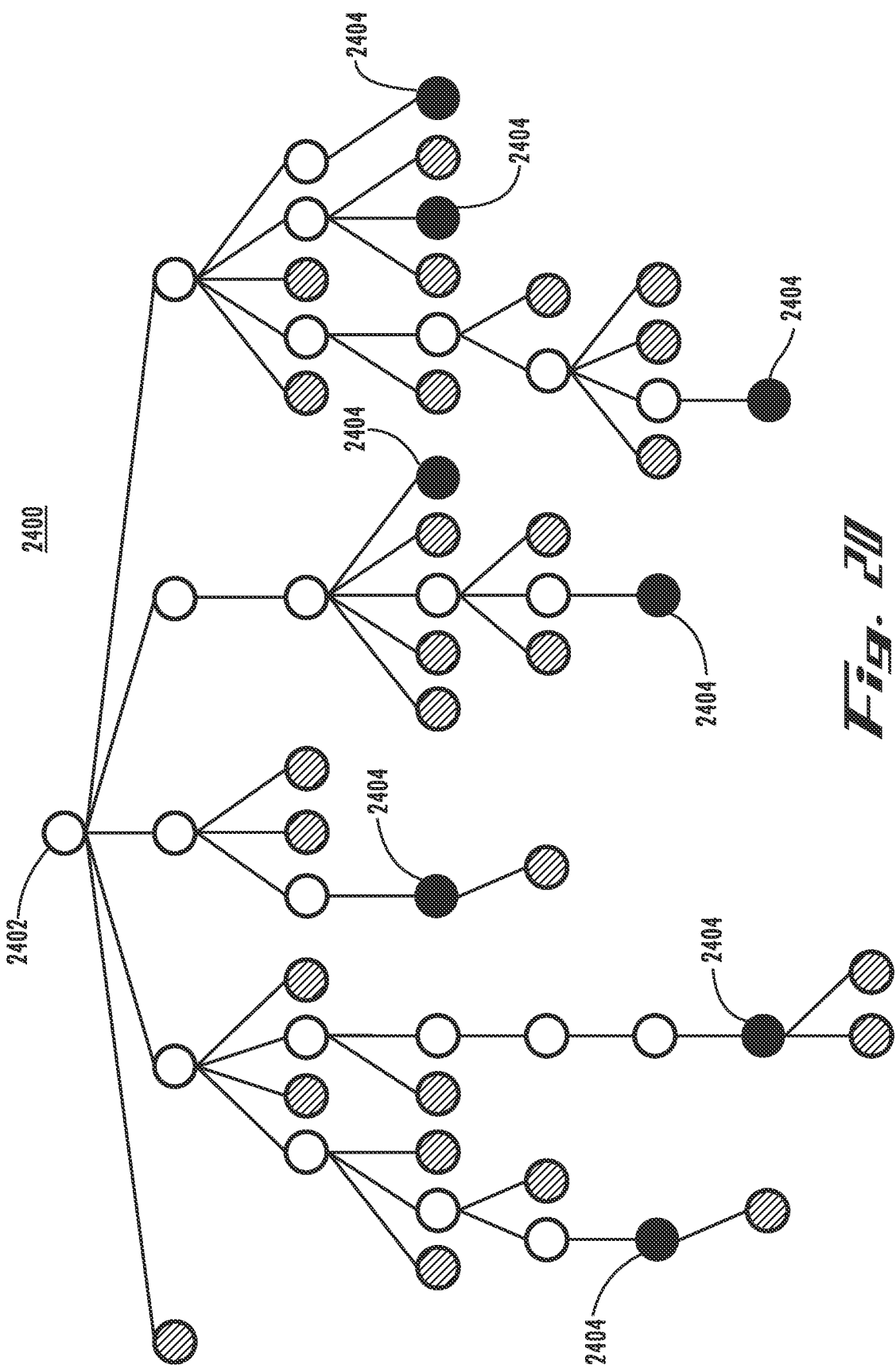

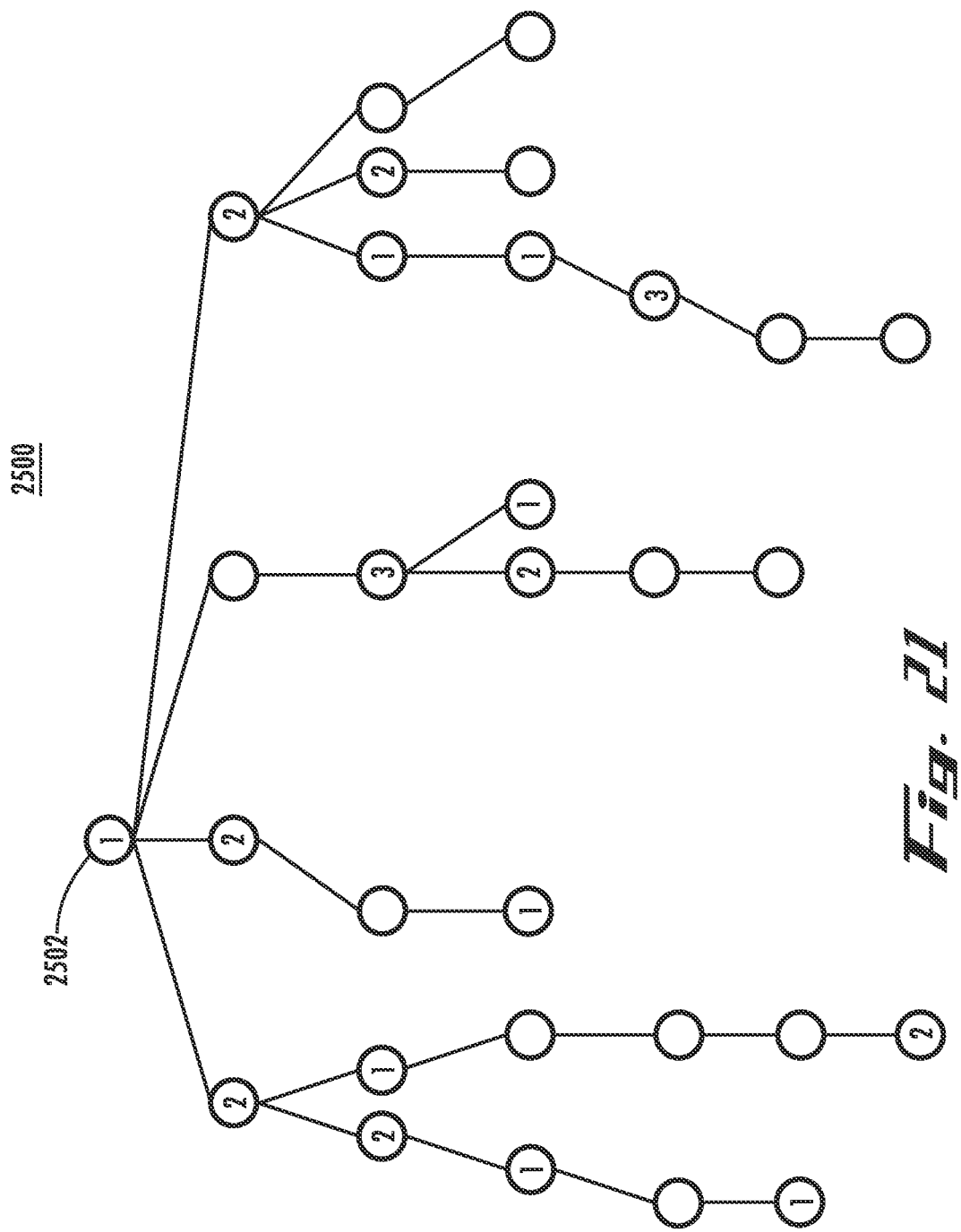

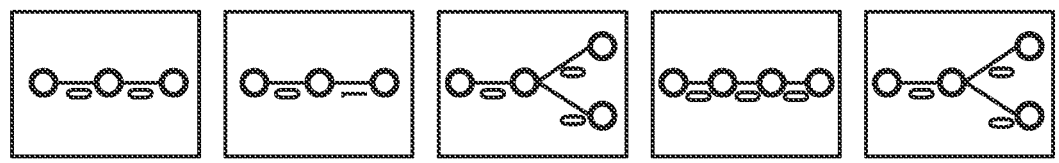
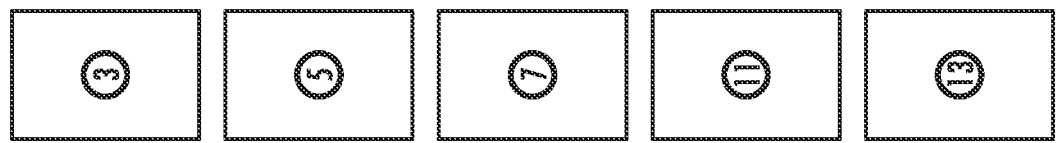
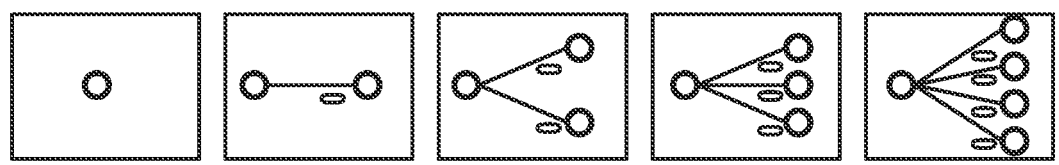
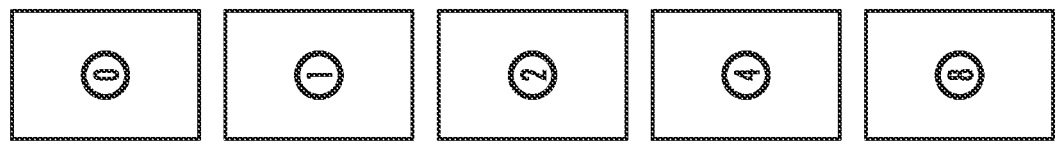
Fig. 2F

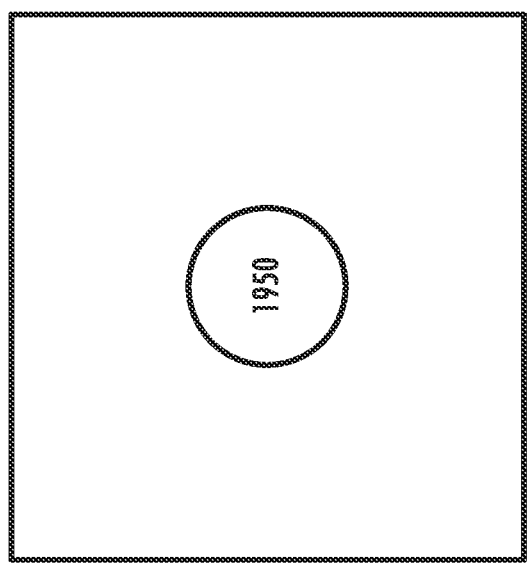
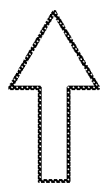
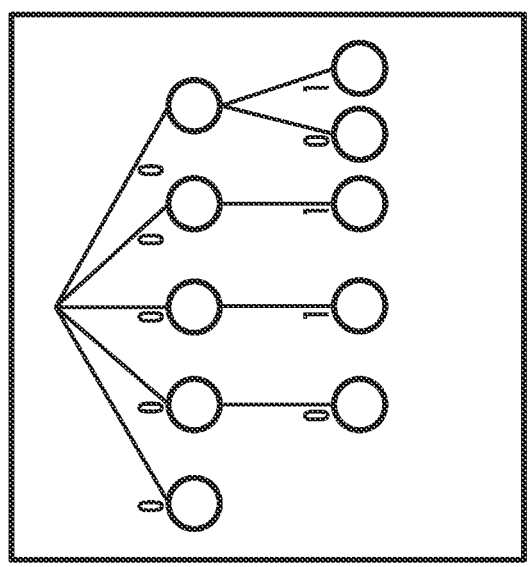
Fig. 26

| Natural # | BEL Trees/Tags | Non-Composite Numerals |
|:---:|:---:|:---:|
| 0 | ○ | — |
| 1 | ● | — |
| 2 | ●—0—● | 3 |
| 3 | ●—1—● | 5 |
| 4 | ● with two children (0, 0) | 7 |
| 5 | ●—0—●—0—● | 11 |
| 6 | ● with two children (0, 1) | 13 |

METHOD AND/OR SYSTEM FOR TREE TRANSFORMATION

This application claims the benefit of U.S. Provisional Patent Application Ser. No. 60/648,950, filed on Jan. 31, 2005, and assigned to the assignee of claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIGS. 17-22 are schematic diagrams of trees illustrating a transformation of an unlabeled tree to a BELT according to an embodiment;

FIG. 23 is a schematic diagram associating particular node label values with portions of BELTs according to an embodiment of the BELT shown in FIG. 22;

FIG. 25 is a table illustrating a particular embodiment of an association between numerals and BELTs and/or portions of BELTs;

FIG. 26 illustrates a representation of node label values as a portion of a BELT according to an embodiment;

FIG. 28 is a table illustrating a portion of the Kleene enumeration of non-composite numerals.

DETAILED DESCRIPTION

Figure 1:
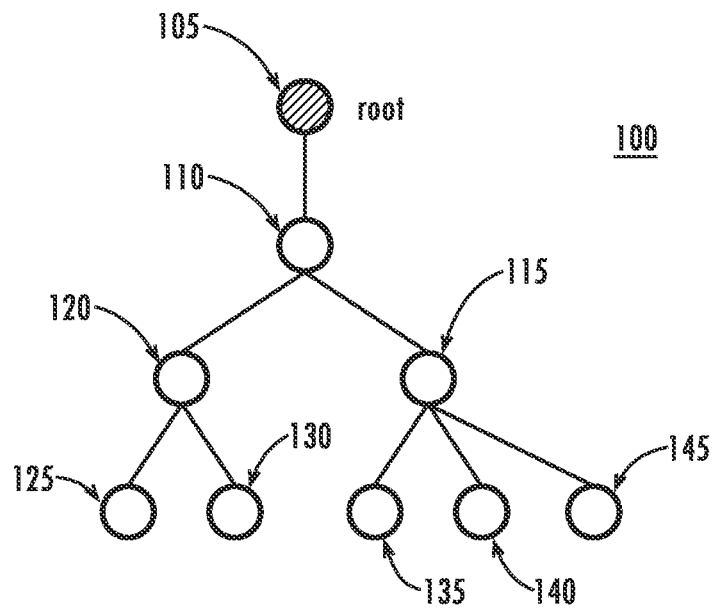
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete non-backtracking loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
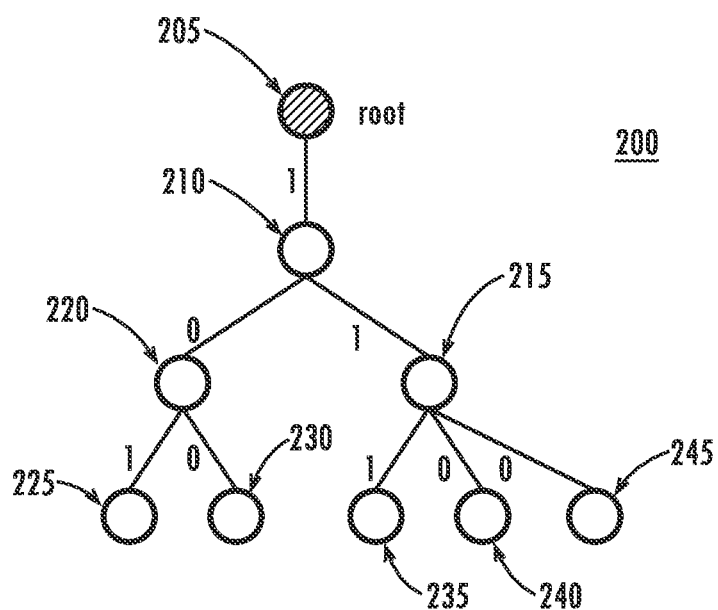
FIG. 2 is a schematic diagram illustrating one embodiment of a binary edge labeled tree (BELT)
Figure 3:
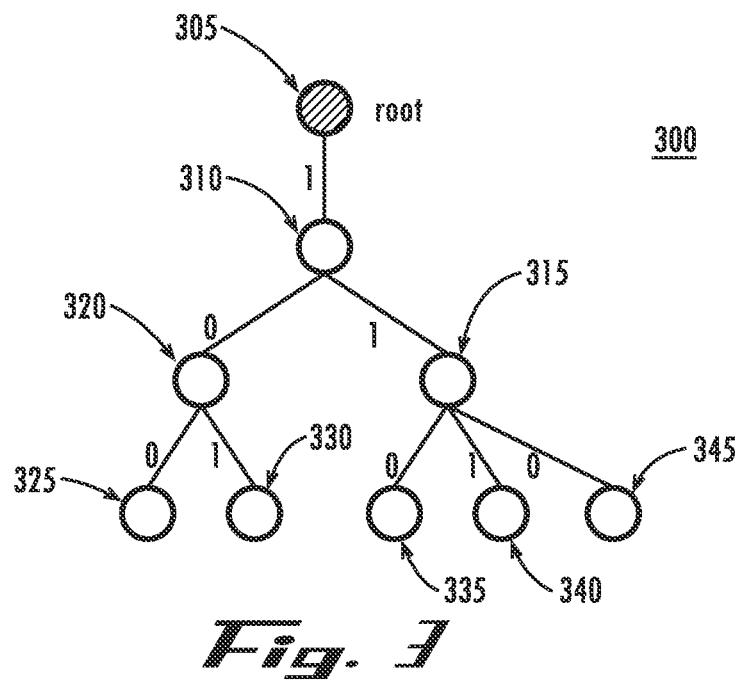
FIG. 3 is a schematic diagram illustrating another embodiment of a BELT.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar or isomorphic to the embodiment of FIG. 2.

Figure 4:
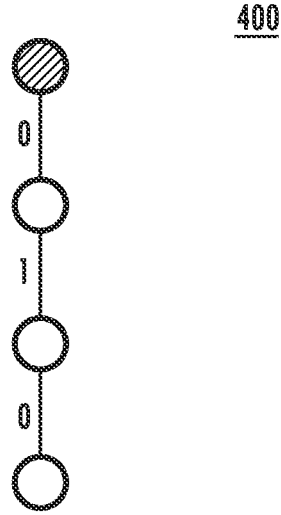
FIG. 4 is a schematic diagram illustrating an embodiment of a binary edge labeled string.

A subset of BELTs may be referred to in this context as binary edge labeled strings (BELSs). One embodiment, 400, is illustrated in FIG. 4. Thus, as illustrated by embodiment 400, this particular binary edge labeled string comprises four nodes and three edges, where the edges are labeled, respectively, binary zero, binary one and binary zero. Thus, a binary edge labeled string comprises a binary edge labeled tree in which each node has no more than two edges. To reiterate, in this context, a string comprises a binary edge labeled string and a tree comprises a binary edge labeled tree if each edge of the string or tree respectively stores a single bit. Likewise, in this context, two nodes are employed to support an edge holding, storing and/or representing a single piece of binary data. At this point, it is worth noting that strings and trees having nodes and edges, such as previously described, may be represented in a computing platform or similar computing device through a data structure or a similar mechanism intended to capture the hierarchical relationship of the data. It is intended that all such embodiments are included within the scope of the claimed subject matter.

In addition to, or as an alternative to storing, holding and/or representing information in edges of a tree in an edge labeled tree, a tree may similarly store, hold and/or represent information in nodes of a tree. Here, such a tree storing, holding and/or representing information in node of a tree may comprise a "node labeled tree" in which information may be stored, held and/or represented in node label values associated with particular nodes. Additionally, a tree storing, holding and/or representing information in nodes and edges may comprise a "feature tree" in which information may be stored, held and/or represented in node label values and/or edge label values. Accordingly, edge labeled trees and node labeled trees comprise particular types of trees in a greater class of trees known as feature trees.

While node and edge labeled trees may be used to express hierarchical data, a tree may not necessarily store, hold and/or represent information in any of its nodes or edges. For example, an "unlabeled tree" may represent hierarchical data without having any information stored, held or represented in any of its edges or nodes (including root nodes and/or terminal nodes). Rather, such hierarchical data may be expressed in how nodes and/or edges in an unlabeled tree may relate to other nodes and/or edges.

According to an embodiment, a "set" may define a collection of unique unordered elements or members. For example, for the purpose of illustration, a set may contain members or elements of a distinct classification, such as the set of all automobiles in a parking lot of a particular color. In a particular embodiment, trees may be classified into sets defined by certain characteristics, such as the set containing node labeled trees, BELTs, unlabeled trees, and the like. However, this is merely an example of how trees may be classified into distinct sets and the claimed subject matter is not limited in this respect.

According to an embodiment, a "transformation" may define a process by which elements of a first set may be mapped into and/or associated with elements of a second set. For example, in a particular embodiment, a transformation may map and/or associate a member of the set of unlabeled trees with a member of the set of node labeled trees. Similarly, according to a particular embodiment, a transformation may map and/or associate a member of the set of node labeled trees with a member of the set of BELTs. Likewise, a transformation may map and/or associate a member of the set of unlabeled trees with a member of the set of BELTs. However, these are merely examples of how a transformation may map and/or associate members of one set to members of another set, and the claimed subject matter is not limited in these respects.

According to an embodiment, a transformation may associate and/or map an element in a first set with an element in a second set as an "elementary equivalent." Here, in a particular embodiment, such a transformation may associate such elementary equivalent elements in different sets in a one-to-one and onto mapping in which the transformation defines for elements in a first set corresponding, unique elementary equivalents in a second set. Similarly, a transformation may also map and/or associate members of the second set to corresponding elementary equivalents in the first set. Examples of a transformations mapping and/or associating elementary equivalent elements of different sets may be found in, for example, *Logical Number Theory, An Introduction*, by Craig Smorynski, p. 305. In a particular embodiment, for example, a transformation may map and/or associate trees of a first type (e.g., a member of the set of unlabeled trees, node labeled trees or BELTs) to elementary equivalent trees of a second type. However, this is merely an example of how a transformation may map and/or associate members of different sets as elementary equivalents, and the claimed subject matter is not limited in these respects.

Also, operations and/or manipulations of elements in a first set may provide elements that are also in the first set. For example, for the purpose of illustration, the addition of positive integers (the first set) to positive integers results in positive integers. According to an embodiment, operations and/or manipulations on a tree of a particular type (e.g., unlabeled tree, node labeled tree or BELT) may result in another tree of the same type, for example.

A transformation of elements in a first set to elementary equivalents in a second set may also map and/or associate results from an operation and/or manipulation of the elements of the first set to elementary equivalents of the results in the second set. For the operation and/or manipulation of the elements in the first set, a corresponding operation and/or manipulation may exist for elements in a second set which are elementary equivalents of the elements of the first set. Here, the corresponding operation and/or manipulation of elements in the second set may provide elementary equivalents of the results of the operation and/or manipulation of the elements in the first set. Continuing with the example of the addition of positive integers, for the purpose of illustration, the set of negative integers may comprise a set of elements that are elementary equivalents of positive integers mapped and/or associated by a transformation comprising multiplication by negative one. Here, addition of negative integers provides a negative integer which may comprise an elementary equivalent of a sum resulting from the addition of positive integers (which themselves comprise elementary equivalents of the added negative integers).

According to an embodiment, an operation and/or manipulation of a first tree of a particular first type (representing hierarchical data) may result in a second tree of the first type. Here, a transformation associating and/or mapping the first tree of the first type to an elementary equivalent first tree of a second type may also map the second tree of the first type to an elementary equivalent second tree of the second type. Here, a corresponding operation and/or manipulation on the first tree of the second type may provide the second tree of the second type. However, these are merely examples of how a transformation may associate and/or map elements of a first set with elements of a second set as elementary equivalents, and the claimed subject matter is not limited in these respects.

Binary edge labeled trees and binary node labeled trees may be employed nearly interchangeably to represent substantially the same hierarchy of data. In particular, a binary node labeled tree may be associated with a binary edge labeled tree in which the nodes of the binary node labeled tree take the same values as the edges of the binary edge labeled tree, except that the root node of the binary node labeled tree may comprise a node having a zero value or a null value. Thus, rather than employing binary edge labeled trees to express hierarchical data, the hierarchical data may alternatively be expressed in corresponding binary node labeled trees.

As discussed above, operations and/or manipulations of trees may correspond with operations and/or manipulations of the hierarchical data represented in such trees. Similarly, operations and/or manipulations of trees of a particular type (e.g., unlabeled trees) may correspond with operations and/or manipulations of elementary equivalent trees of a different type (e.g., node labeled trees and/or BELTs). Here, a transformation may associate and/or map trees of the first type to trees of the second type as elementary equivalents.

Operations on trees may, in some situations, be efficient for processing hierarchical data in the form of a BELT. According to an embodiment, it may be desirable to transform an unlabeled tree to a node labeled tree and/or BELT. Here, the BELT resulting from the transformation may comprise an elementary equivalent of the original unlabeled tree by expressing essentially the same hierarchical data as the unlabeled tree. Accordingly, operations on the hierarchical data expressed in the unlabeled tree may be carried out on the resulting BELT. For example, expressing hierarchical data of an unlabeled tree in a BELT may enable greater efficiency in indexing the hierarchical data for processing. Also, expression of hierarchical data of an unlabeled tree in the form of a BELT may enable an expression of the hierarchical data as a binary string that may use less memory for storage of the hierarchical data, for example. However, these are merely examples of potential or possible advantages to transforming an unlabeled tree to a BELT and the claimed subject matter is not limited in these respects.

In accordance with the claimed subject matter, therefore, any tree, regardless of whether it is binary edge labeled, binary node labeled, non-binary, a feature tree, or otherwise, may be manipulated and/or operated upon. For example, and as shall be described in more detail below, a node labeled tree in which the nodes are labeled with natural numerals or data values may be transformed to a binary edge labeled tree. Furthermore, this may be accomplished with approximately the same amount of storage. For example, for this particular embodiment, this may involve substantially the same amount of node and/or edge data label values.

As previously noted, the claimed subject matter is not limited in scope to this particular example, however, as illustrated in more detail hereinafter, the tree illustrated in FIG. 5 may be transformed to a binary edge labeled tree through a sequence of processing depicted here as graph operations, although such a transformation may alternatively be implemented by operations implemented otherwise, one such example being by a computing platform, for example. Alternatively, it may be desirable, depending upon the particular embodiment, to transform trees to, for example, binary node labeled trees. Likewise, other embodiments in which trees of one form are transformed to trees of another form are also included within the scope of the claimed subject. In this example, a particular tree, embodiment 1100, is illustrated in FIG. 5, comprises a node labeled tree rather than an edge labeled tree.

According to an embodiment, trees or portions of trees may be represented by natural numerals according to an association of trees and natural numerals. Without belaboring the present discussion, additional descriptions of how natural numerals may be associated with trees is discussed in greater detail below and in U.S. patent application Ser. No. 11/005,859, filed on Dec. 6, 2004, by J. J. LeTourneau, titled, "Manipulating Sets of Hierarchical Data," assigned to the assignee of the presently claimed subject matter. It should be understood, however, that while the particular embodiments illustrated are directed to particular associations of numerals and trees, there may be many associations of trees to numerals according to corresponding particular "association embodiments," and the claimed subject matter is not limited to any such particular association.

According to an embodiment, a transformation of node labeled tree 1100 to a BELT makes use of an association of BELTs and/or portions of BELTs with numerals according to a particular association embodiment. As illustrated below, according to a particular embodiment, node label values of node labeled tree 1100 may express essentially the same information of BELTs or portions of a BELT. Accordingly, such a transformation may comprise, at least in part, replacing at least some of the node label values with corresponding BELTs or portions of BELTs.

Figure 5:
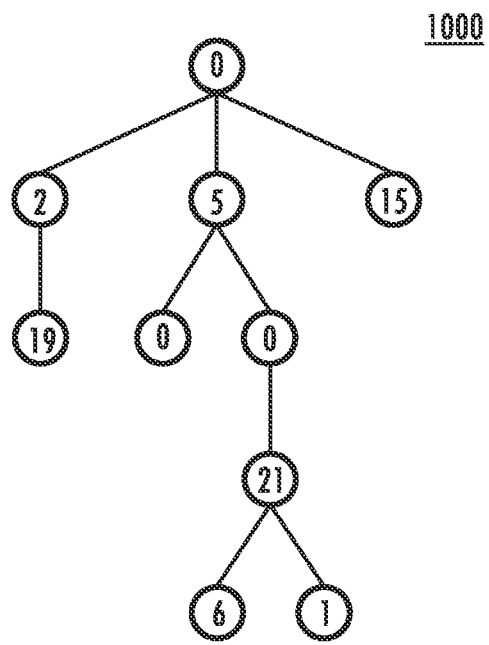
FIG. 5 is a schematic diagram of an embodiment of a node labeled tree.
Figure 6:
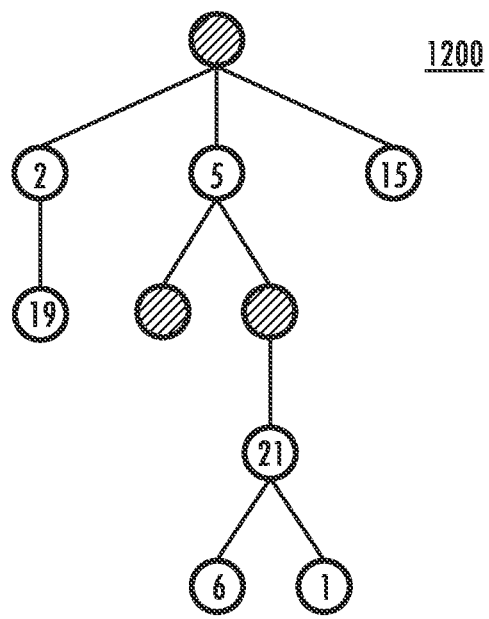
FIGS. 6-10 are schematic diagrams illustrating a process to transform a node labeled tree to a BELT according to an embodiment.
Figure 7:
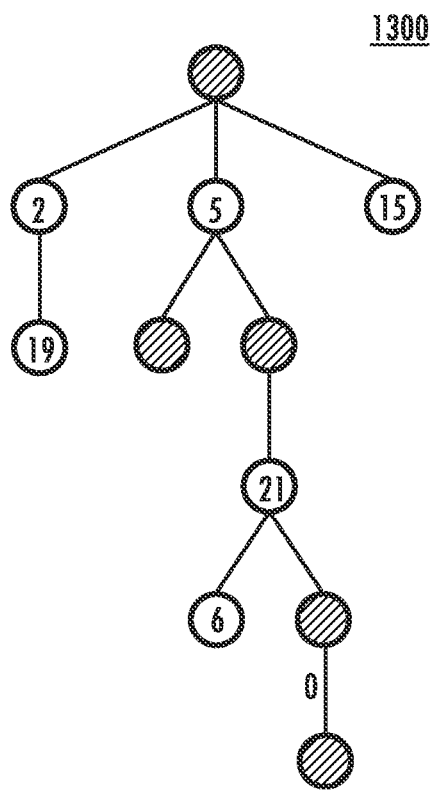
Figure 8:
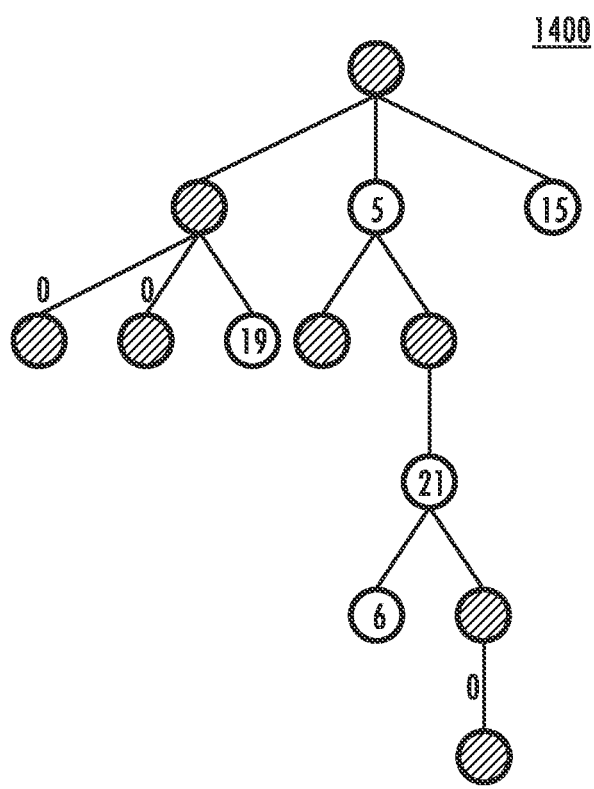

Referring now to FIG. 5, node values are deleted for those nodes storing the value zero. This is illustrated, for example, in FIG. 6. Node values are also deleted for the nodes storing the value one. In this case, a new single unlabeled node is attached to those nodes that had stored the value one, and the edge between the prior node and the new node is labeled with a zero value. This is illustrated, for example, in FIG. 7. For nodes with a label value k that is a power of 2, and larger than one, the node label value is deleted and ($\log_2(k)+1$) new nodes are attached, labeling the edge between the new nodes and the old nodes with a zero value. This, for example, is illustrated in FIG. 8.

Figure 9:
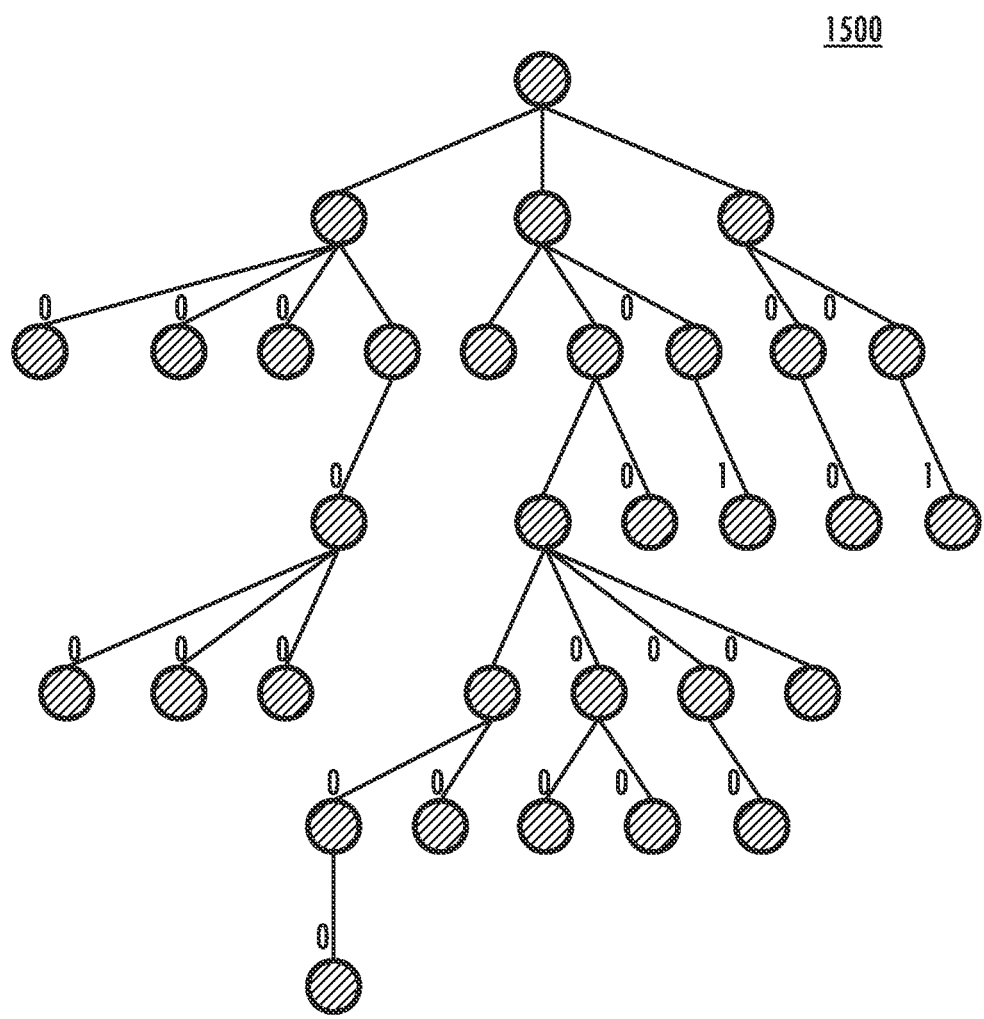
Figure 10:
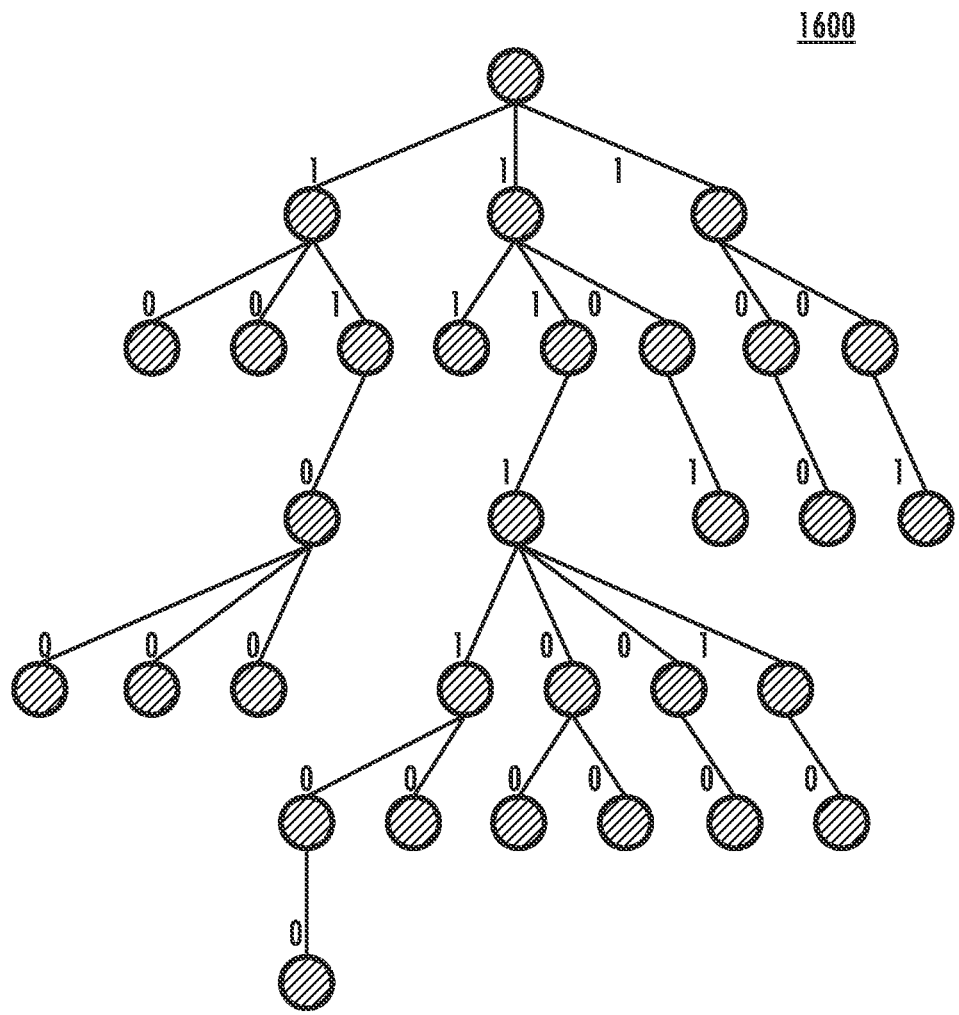

The remaining node label values comprise non-powers of two that are three or larger. These node label values are factored into one or more non-composite numerals. For such a resulting non-composite numeral factor of a node's label value, a tag representing the non-composite numeral factor may be connected to the node by an edge having an edge label value of binary zero. The tag may comprise a portion of a BELT representing the non-composite numeral factor according to an association of BELTs and numerals of a particular association embodiment. Such an association of BELTs and numerals is illustrated in detail below. However, it should be understood that this is merely an example of an association of numerals and BELTs and that the claimed subject matter is not limited in these respects. This is illustrated, for example, in FIG. 9. The remaining edges of the tree are labeled with a binary value of one. This is illustrated in FIG. 10.

Figure 11:
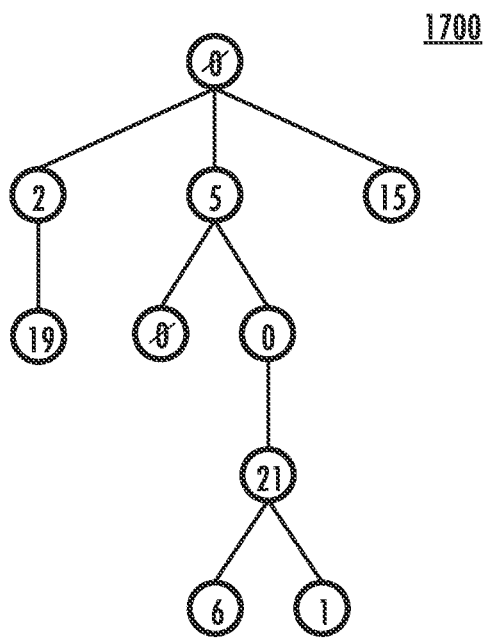
FIGS. 11-16 are schematic diagrams illustrating a process to transform a node labeled tree comprising one or more null node label values to a BELT according to an embodiment.

In another embodiment, however, a particular tree may include null types or, more particularly, some node values denoted by the empty set. This is illustrated, for example, by the tree in FIG. 11, although, of course, this is simply one example. An advantage of employing null types includes the ability to address a broader array of hierarchical data sets. For example, without loss of generality and not intending to limit the scope of the claimed subject matter in any way, a null type permits representing in a relational database, as one example, situations in which a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data.

A particular application of null node label values may be applied to a transformation of BELTs to binary node labeled trees (BNLTs). While FIGS. 2 through 4 illustrate specific examples of BELTs, it should be understood that the information expressed in a BELT may comprise essentially the same information represented in a BNLT having the same structure of corresponding nodes and edges. Here, a transformation from a BELT to a BNLT may comprise assigning node label values to nodes in the resulting BNLT the edge label values of edges in the BELT connecting corresponding nodes to their parents. The root node in the resulting BNLT may then be assigned a null label value. Similarly, a BNLT may be transformed to a BELT by assigning label values of nodes to edges connecting the nodes to corresponding parent nodes. As such, BELTs and BNLTs may comprise members of class of trees called binary labeled trees (BLTs) in which either nodes or edges hold, store and/or represent a binary label value.

Figure 12:
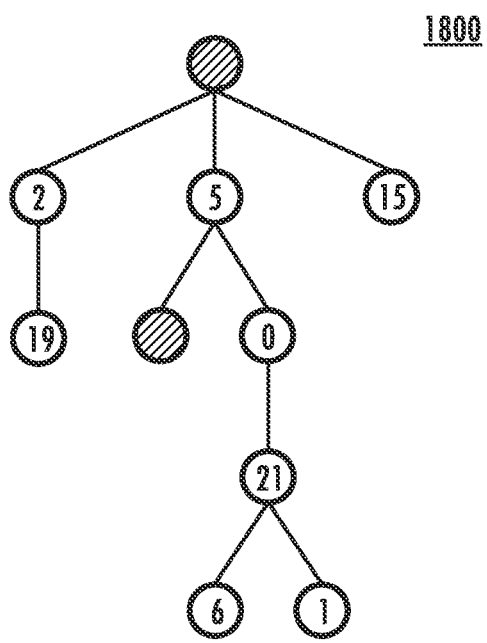

For this particular embodiment, a tree with nulls, as described above, may be transformed to a tree without nulls. This shall be illustrated, for example, for nodes labeled with a null, such as for the tree in FIG. 11; however, the claimed subject matter is not limited in scope in this respect, of course. In this particular embodiment, the nulls are deleted from those nodes having a null. This is illustrated, for example, by FIG. 12.

Figure 13:
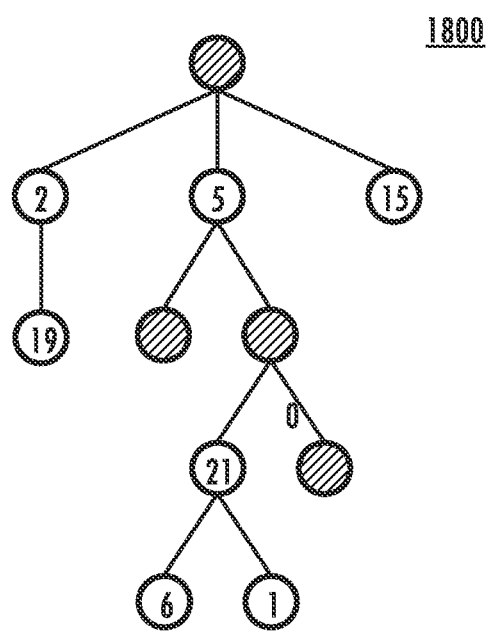
Figure 14:
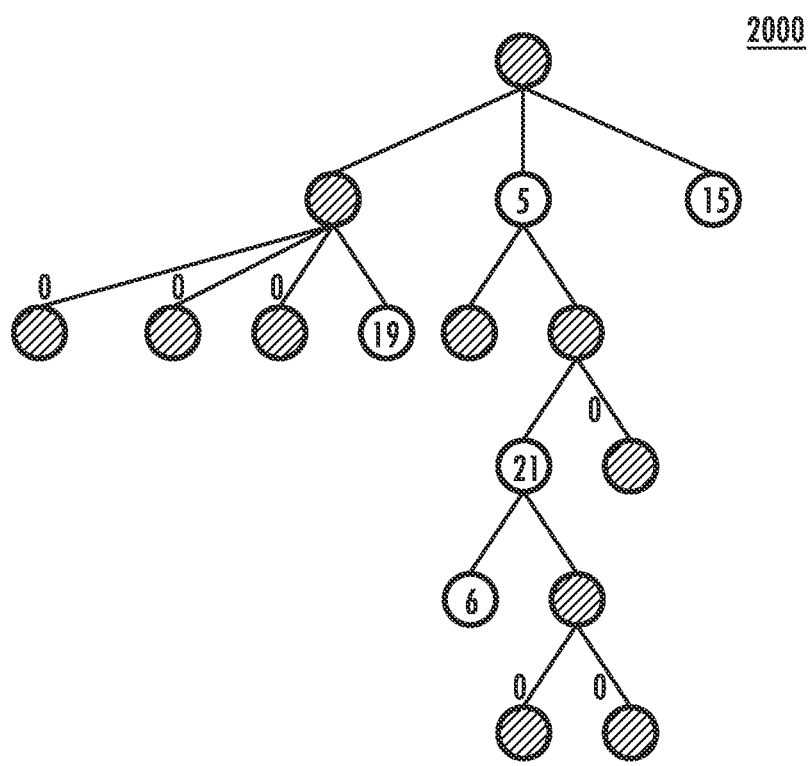

Referring now to FIG. 13, node values are also deleted for those nodes storing the value zero. Furthermore, a single new node is attached to the nodes previously storing the zero values. The edge between the prior nodes and the new nodes are labeled with a zero value. For nodes with a value k that is a power of two, including the value one, the node value is deleted and ($\log_2(k)+2$) new nodes are attached, labeling the edge between the new nodes and the old nodes with a zero value. This is illustrated, for example, in FIG. 14.

Figure 15:
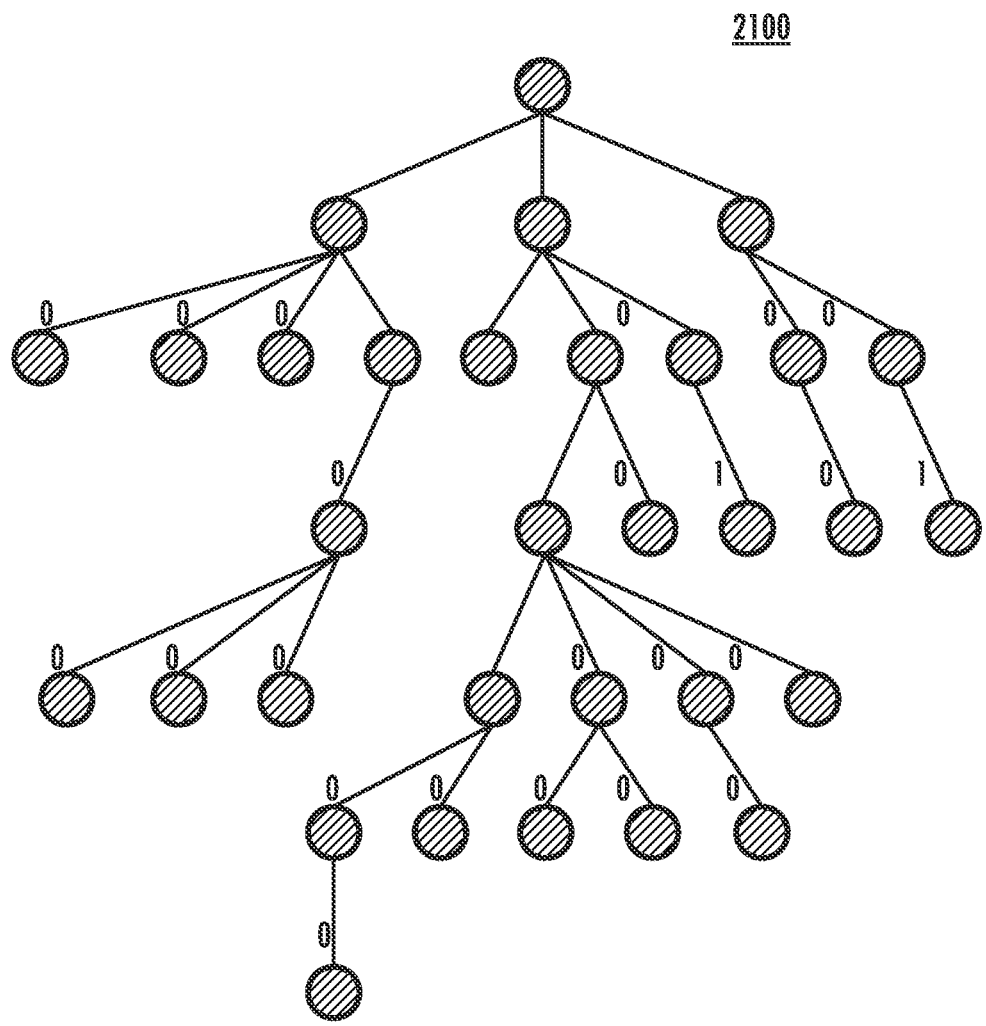
Figure 16:
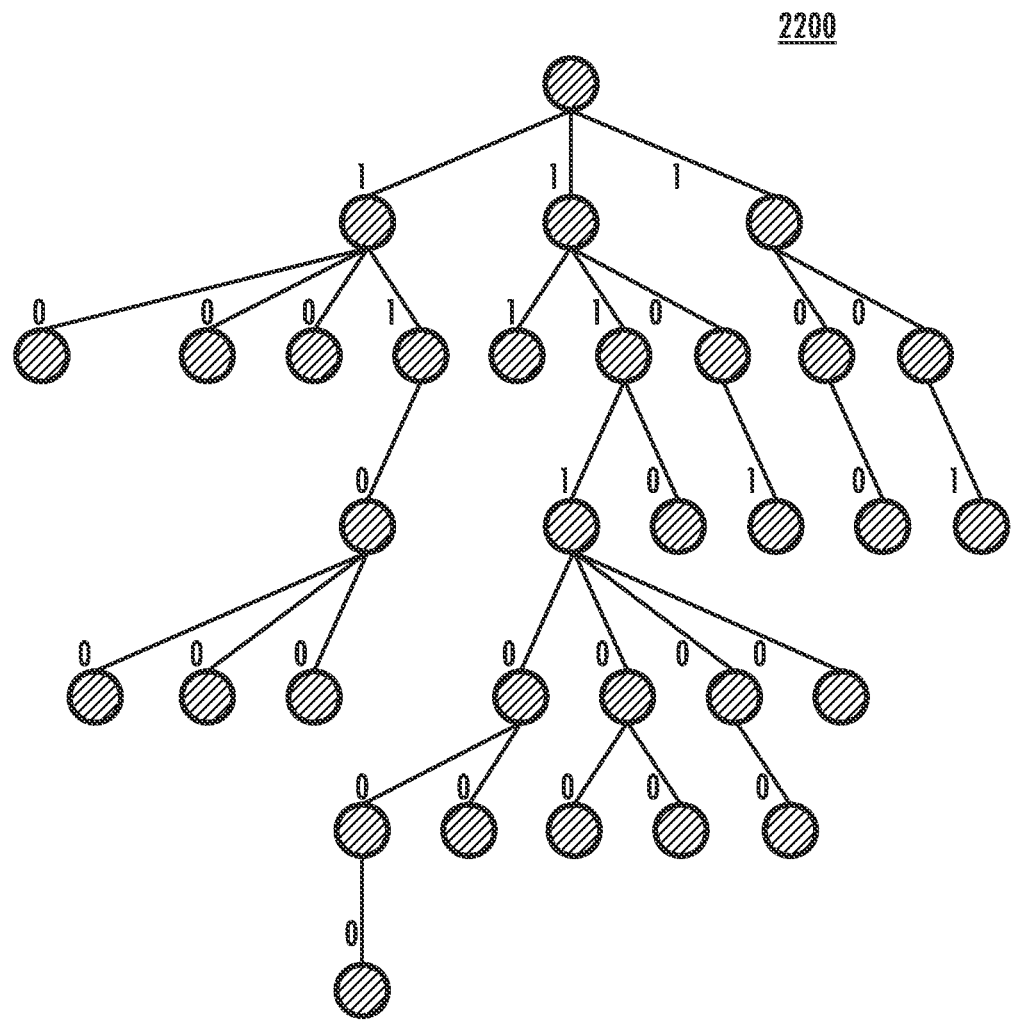
Figure 11:
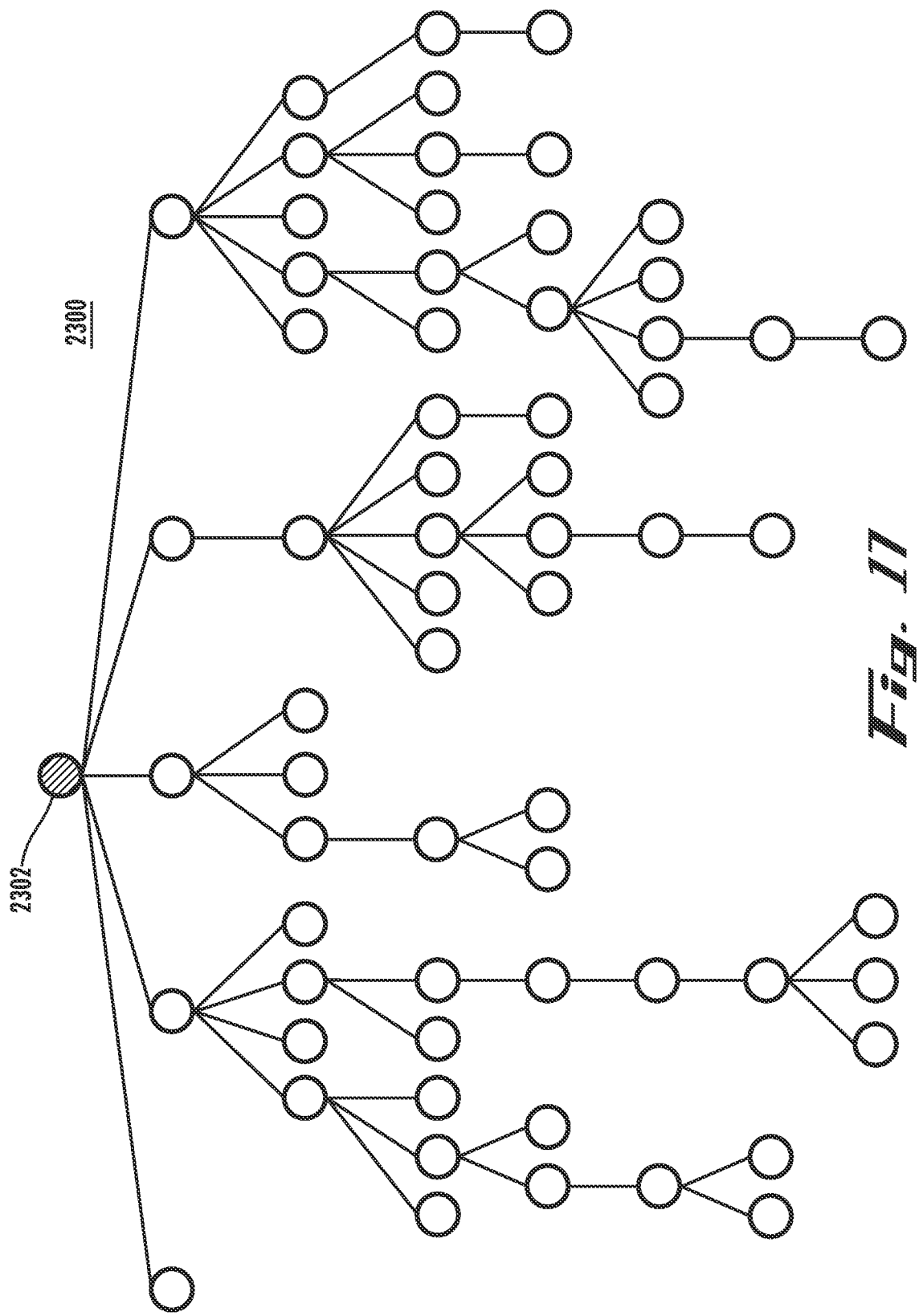

The remaining node label values comprise non-powers of two that are three or larger. These node label values are factored into one or more non-composite numerals. For such a resulting non-composite numeral factor of a node's label value, a tag representing the non-composite numeral factor may be connected to the node by an edge having an edge label value of binary zero. The tag may comprise a portion of a BELT representing the non-composite numeral factor according to an association of BELTs and numerals of a particular association embodiment. Such an association of BELTs and numerals is illustrated in detail below. However, it should be understood that this is merely an example of an association of numerals and BELTs and that the claimed subject matter is not limited in these respects. This is illustrated, for example, in FIG. 15. The remaining edges are labeled with a binary value of one. This tree is illustrated, for example, in FIG. 16.

In an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be transformed to a binary edge labeled tree and/or binary node labeled tree, and, for another embodiment, a tree in which edges are labeled with numerals or numerical data, rather than binary data, may be transformed to a binary edge labeled tree and/or binary node labeled tree.

FIGS. 17 through 22 are schematic diagrams of trees illustrating a transformation of an unlabeled tree to a BELT according to an embodiment. This is illustrated as a sequence of operations depicted here as graph operations, although such a transformation may alternatively be implemented by operations implemented otherwise, one such example being by a computing platform, for example. Likewise, other embodiments in which trees of one form are transformed to trees of another form are also included within the scope of the claimed subject matter.

FIG. 17 is a schematic diagram of an unlabeled tree 2300 comprising a root node 2302 according to an embodiment. Identifying root node 2302 indicates a directional flow of hierarchical data represented in unlabeled tree 2300 descending away from root node. In addition to having a root node to indicate the directional flow of the hierarchical data, one or more nodes in the tree may be identified as "terminal nodes" having no children or offspring nodes. Hence, identification of the terminal nodes in a tree indicates a directional flow of hierarchical data ascending away from the terminal nodes toward a root node.

FIG. 18 is a schematic diagram of unlabeled tree 2300 showing terminal nodes as cross-hatched nodes. As illustrated from FIG. 18, a tree may comprise a single root node but multiple terminal nodes. According to an embodiment, a tree may comprise one or more nodes which are "frontier nodes." A frontier node is connected to one or more child nodes and does not have any grandchild nodes. In other words, a frontier node has at least one child node and all nodes descending from a frontier node are terminal nodes. As illustrated in FIG. 19, by way of example, according to a particular embodiment, frontier nodes 2304 in tree 2300 are connected to one or more corresponding child terminal nodes. Also, at least some of the terminal nodes are not directly connected to a frontier node.

Figure 22:
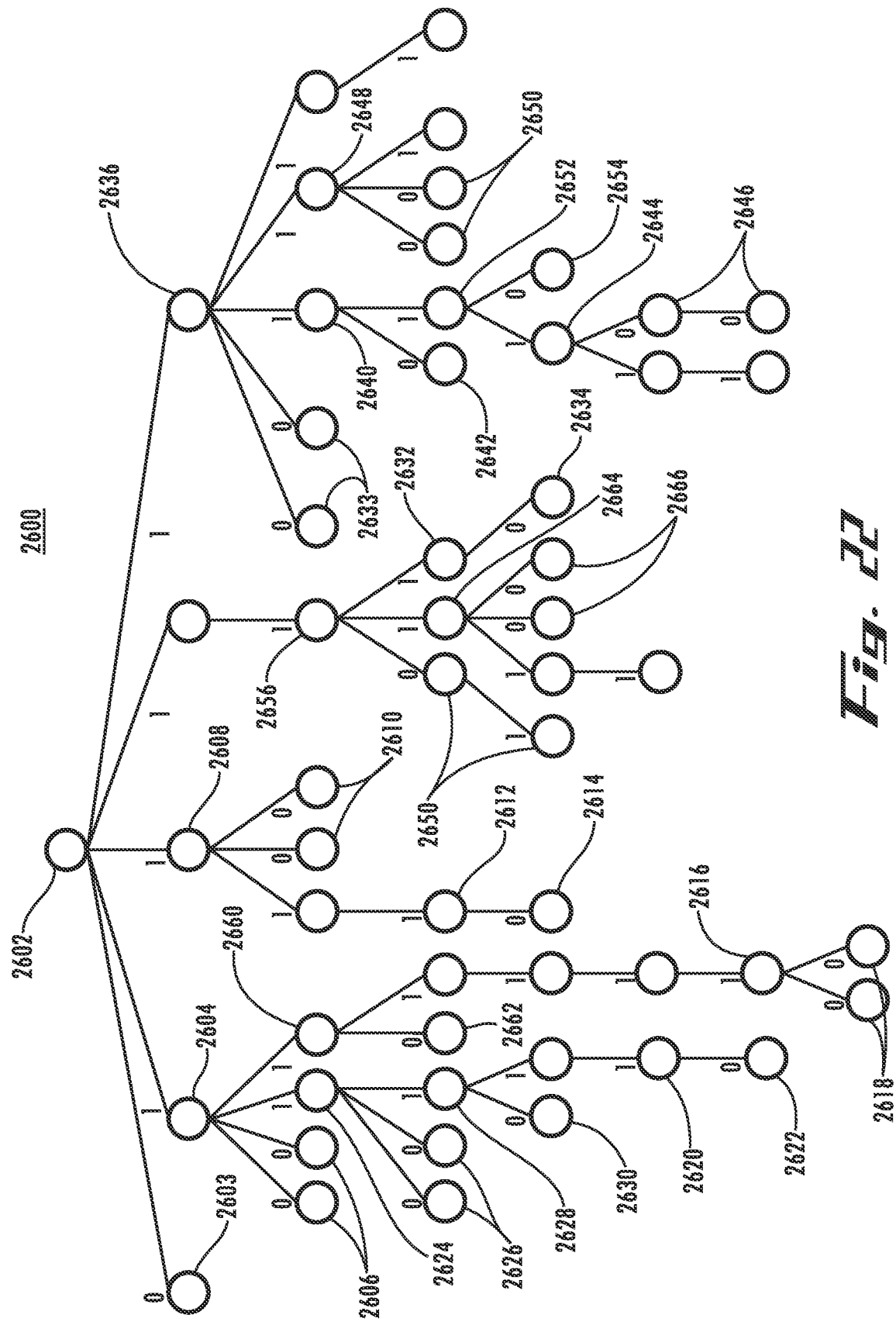

FIGS. 20 through 22 are schematic diagrams illustrating a process to transform unlabeled tree 2300 to a BELT that comprises an elementary equivalent of unlabeled tree 2300. In this particular embodiment, unlabeled tree 2300 may represent hierarchical data and the transformation illustrated below may map unlabeled tree 2300 to a BELT that represents essentially the same hierarchical data. According to an embodiment, tree 2300 is transformed to a node labeled tree 2500 shown in FIG. 21 which comprises an elementary equivalent of tree 2300. Then, as illustrated above, node labeled tree 2500 may be transformed to a BELT 2600 shown in FIG. 22 which comprises an elementary equivalent of tree 2600. Accordingly, in a particular embodiment, the resulting tree 2600 comprises an elementary equivalent of tree 2300. However, this is merely an example of how an unlabeled tree may be transformed to a BELT that is an elementary equivalent of the unlabeled tree and the claimed subject matter is not limited in this respect.

According to an embodiment, FIG. 20 illustrates a process of "pruning" terminal nodes in tree 2300 from frontier nodes. Here, tree 2400 shows darkened nodes 2404 which correspond with frontier nodes 2304 of tree 2300. According to an embodiment, tree 2400 may be generated by pruning and/or removing one terminal node connected to each of the corresponding frontier nodes 2304. The remaining terminal nodes of tree 2300 (i.e., the unpruned terminal nodes) are indicated with cross-hatching. However, this is merely an example of how terminal nodes may be pruned from corresponding frontier nodes and the claimed subject matter is not limited in this respect.

FIG. 21 is a schematic diagram of a node labeled tree 2500 which may be determined, at least in part, from tree 2400. According to an embodiment, the remaining terminal nodes of tree 2300 indicated with cross-hatching in tree 2400 are replaced with node label values associated with parent nodes in tree 2500. In a particular embodiment, for example, nodes in tree 2400 having a natural numeral k of such remaining terminal nodes as children are associated with nodes in tree 2500 having a node label value of k and the remaining terminal node children in tree 2400 are removed in the resulting tree 2500. Again, tree 2500 may represent essentially the same hierarchical data represented in tree 2400. Here, the resulting node labeled tree 2500 determined from the above described transformation may comprise an elementary equivalent of unlabeled tree 2300. However, this is merely an example how an unlabeled tree may be transformed to an elementary equivalent node labeled tree and the claimed subject matter is not limited in this respect.

Nodes in tree 2500 contain a numeral as a node label value to represent a count of remaining terminal nodes removed from corresponding nodes in tree 2400. While not shown in FIG. 21, the remaining nodes in tree 2500 not showing a node label may nevertheless be assigned a node label value of natural numeral "0." According to an embodiment, tree 2500 may be transformed to an elementary equivalent BELT by replacing nodes in tree 2500 having a non-zero node label value with an equivalent portion of a BELT. In a particular embodiment, the portion of a BELT equivalent to the non-zero node label value may be determined according to an association embodiment of numerals and trees.

FIG. 22 is a schematic diagram of a BELT 2600 resulting from a transformation from node labeled tree 2500 according to an embodiment. According to a particular embodiment, edges in BELT 2600 corresponding with edges existing in node labeled tree 2500 may be labeled with a numeral "1." Then, nodes in BELT 2600 corresponding to nodes in node labeled tree 2500 having non-zero node label values may be connected to portions of BELTs which are based, at least in part, on the non-zero label values. Here, the non-zero node label values may be associated with the portions of BELTs according to an association of BELTs and numerals according to a particular association embodiment. In this particular embodiment, for the purpose of illustration, FIG. 23 shows portions of BELTs in BELT 2600 corresponding with a non-zero node label value in node labeled tree 2500. FIG. 23 also shows non-zero node label values in node label tree 2500 above corresponding to portions of BELTs in BELT 2600. Here, the edge between the prior nodes and the new nodes is labeled with a zero value. For nodes with a value k that is a power of two, including the value one, the node value is deleted and $(\log_2(k)+1)$ new nodes are attached, labeling the edge between the new nodes and the old nodes with a zero value.

The remaining node label values comprise non-powers of two that are 3 or larger. These node label values may be factored into one or more non-composite numerals according to a particular association embodiment. For such a resulting non-composite numeral factor of a node's label, a tag representing the non-composite numeral factor may be connected to the node by an edge having an edge label value of binary zero. The tag may comprise a portion of a BELT representing the non-composite numeral factor according to an association of BELTs and numerals of a particular association embodiment.

As described below in greater detail, the association of portions of BELTs and numerals may associate unique portions of BELTs and corresponding numerals. In other words, in a particular association embodiment, for any numerical node label value there is a unique corresponding BELT portion. Accordingly, the resulting BELT 2600 may express essentially the same hierarchical data as the node labeled tree 2500 and comprise an elementary equivalent of the node labeled tree 2500. However, it should be understood that this is merely an example of how a node labeled tree may be transformed to an elementary equivalent BELT and the claimed subject matter is not limited in these respects. Since the node labeled tree 2500 comprises an elementary equivalent of the unlabeled tree 2300, BELT 2600 may also comprise an elementary equivalent of unlabeled tree 2300. However, again, this is merely an example of a transformation of an unlabeled tree to an elementary equivalent BELT and the claimed subject matter is not limited in these respects.

Figure 24:
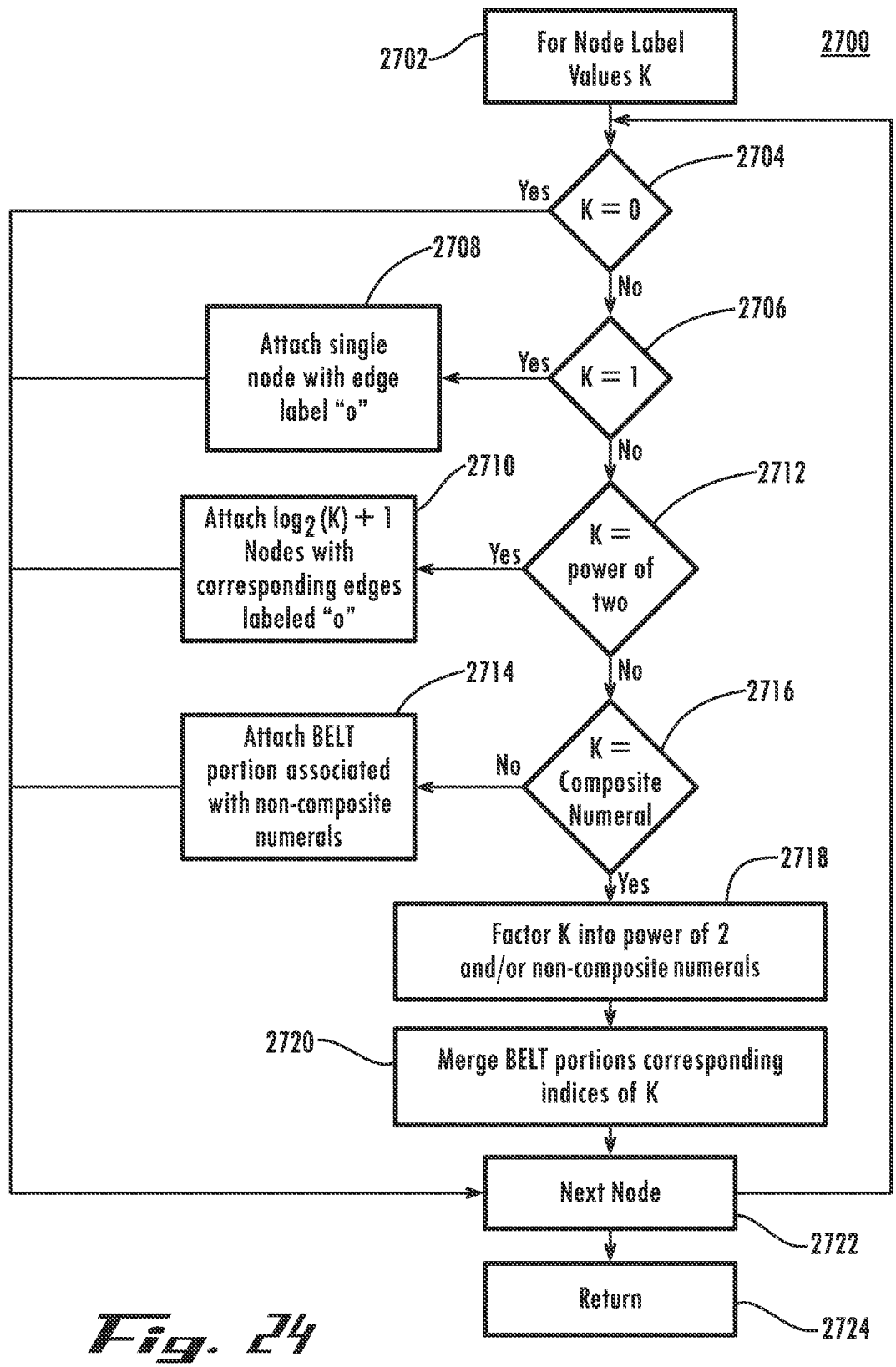
FIG. 24 is a flow diagram illustrating a process of associating node label values with BELTs and/or portions of BELTs according to an embodiment.

FIG. 24 is a flow diagram illustrating a process 2700 of associating node label values with BELTs and/or portions of BELTs according to an embodiment of the transformation illustrated above with reference to FIGS. 21 through 23. Here, process 2700 may be used to associate node label values of nodes in node labeled tree 2500 with corresponding portions of BELTs in BELT 2600, according to the particular association embodiment illustrated in FIG. 23. FIG. 25 is a table showing a particular association embodiment that may be determined according to process 2700. However, it should be understood that process 2700 and FIG. 24 merely illustrate particular association embodiments and that the claimed subject matter is not limited in these respects.

Process 2700 may determine BELT portions corresponding to node labels "k" of a node label tree, as illustrated in the transformation from node labeled tree 2500 to BELT 2600 illustrated above. If a particular node label value k is equal to zero, as determined at diamond 2704, process 2700 merely removes any node label value from a corresponding node in the resulting BELT. For a particular node label value k equal to one, as determined at diamond 2706, block 2708 may attach to a corresponding node in the resulting BELT a single node by an edge having a label value of binary zero. Such a BELT portion corresponding to numeral "1" is shown in the association embodiment of FIG. 25.

For a particular node label value k equal to a power of two, as determined at diamond 2712, block 2710 may attach to a corresponding node in the resulting BELT, $\log_2(k)+1$ nodes by corresponding edges having a label value of binary zero. This is illustrated in the particular association embodiment shown in FIG. 25 with reference to BELT portions corresponding to numerals two, four and eight. Here, two nodes are attached to the corresponding node in the resulting BELT by corresponding edges for a node label value k=2. Three nodes are attached to the corresponding node in the resulting BELT by corresponding edges for a node label value k=4; and four nodes are attached to the corresponding node in the resulting BELT by corresponding edges for a node label value k=8.

According to an embodiment, a node label value k may comprise a natural numeral that is a product of natural numerals x and y greater than one. Under this condition, k comprises a "composite numeral" capable of being factored into natural numerals x and y. Here, the BELT portion representing k in a resulting BELT may be represented as a merger of respective BELT portions represented by the natural numerals x and y at a corresponding node in the resulting BELT providing, in effect, a root node for the merged BELT portions. Alternatively, a node label value k may comprise a "non-composite" natural numeral that cannot be factored into positive natural numerals other than one and itself.

Returning to process 2700, if a node label value k comprises a non-composite natural numeral greater than three, as determined at diamond 2716, block 2714 may attach a BELT portion associated with the non-composite numeral to a corresponding node in the resulting BELT. Here, the BELT portion may be determined from a particular association of BELTs with non-composite numerals.

Returning again to process 2700, if a node label value k comprises a composite natural numeral, as determined at diamond 2716, block 2718 may first factor k by the largest power of two, "w". This factor may be represented by a BELT portion comprising $\log_2(w)$ nodes attached to the corresponding node in the resulting BELT by corresponding edges with label values "0." The remainder may then be factored into non-composite numerals greater than two. According to a particular association embodiment, as illustrated with reference to block 2714, for example, block 2718 may determine BELT portions corresponding to these non-composite factors of the remainder. Here, for such a resulting non-composite numeral factor of a node's node label, a tag representing the non-composite numeral factor may be connected to the node by an edge having an edge label value of binary zero. The tag may comprise a portion of a BELT representing the non-composite numeral factor according to an association of BELTs and numerals of a particular association embodiment. Such an association of BELTs and numerals according to one particular embodiment is illustrated in detail below.

According to a particular association embodiment, a composite numeral may be represented by individual BELTs and/or BELT portions corresponding with individual factors making up the composite numeral. Here, a "merger" operation may join the BELTs and/or BELT portions corresponding with the individual factors at a common root node to form the BELT and/or BELT portions corresponding with the composite numeral. Accordingly, such a merger operation of BELTs at a root node may correspond with multiplication of numerals corresponding with the merged BELTs. Without belaboring the discussion, such a merger operation is further illustrated in the aforementioned U.S. patent application Ser. No. 11/005,859, filed on Dec. 6, 2004, by J. J. LeTourneau, titled, "Manipulating Sets of Hierarchical Data."

Returning to process 2700, block 2720 may merge the BELT portions corresponding to these non-composite factors determined at block 2718, and any BELT portion corresponding to a power of two factor "w" of k, at the corresponding node in the resulting BELT. As illustrated in FIG. 26, by way of example, a node value of 1950 may be factored at block 2718 into non-composite numerals as follows:

$$1950 = 2 \times 3 \times 5 \times 5 \times 13$$

As may be observed from FIG. 26, according to the particular association embodiment illustrated in FIG. 25, the BELT portion corresponding to numeral 1950 comprises a merger of BELT portions corresponding to the individual non-composite factors 3, 5, 5 and 13. For the remaining factor "2," an additional node is connected by an edge having a label value of binary zero. Accordingly, it should be recognized for this particular embodiment that while block 2710 may attach $\log_2(k)+1$ nodes in the resulting BELT for a node label value power of two k, block 2720 may merge $\log_2(w)$ nodes for a power of two factor w of a composite node label value (with BELT portions representing non-composite factors greater than two).

Process 2700 should be understood to be merely illustrative of a particular process for generating BELT portions corresponding to node label values in a corresponding node labeled tree. In alternative embodiments, possible node label values may be associated in a look up table with corresponding BELT portions determined, at least in part, according to a particular association embodiment.

Figure 27:
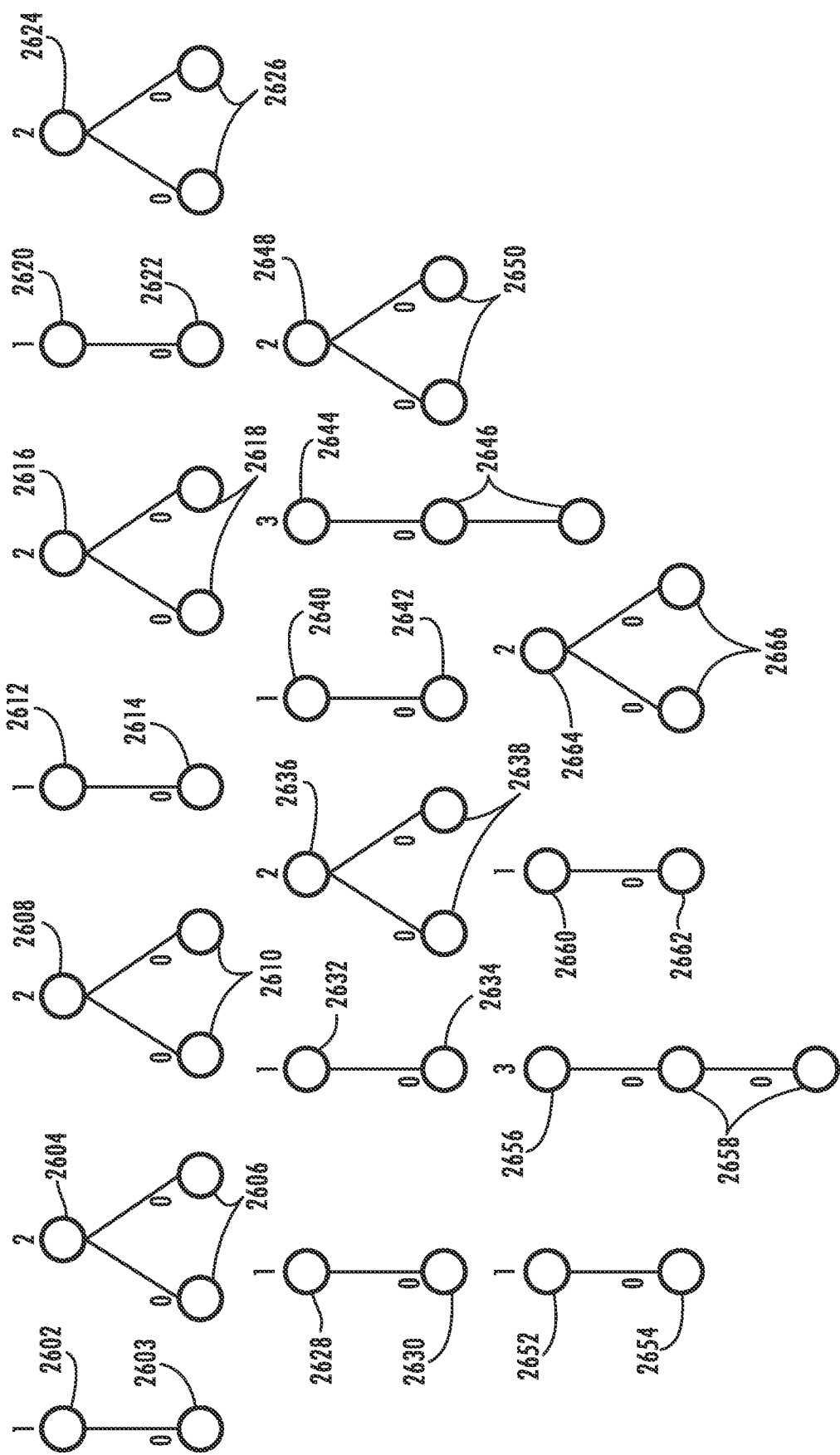
FIG. 27 is a table illustrating a particular embodiment of an association between natural numerals and BELTs.

Regarding particular association embodiments, FIG. 25 shows that the number of nodes representing non-composite numerals may grow roughly logarithmically with respect to the corresponding non-composite numerals. Nevertheless, it should be understood that the association of non-composite numerals and BELTs as illustrated in FIG. 25 is merely an example of how non-composite numerals may be associated with BELTs in a particular embodiment, and that many other association embodiments may be used without departing from the claimed subject matter. This particular association embodiment, however, makes use of an association of BELTs and natural numerals. FIG. 27 is a table illustrating a particular embodiment of an association between natural numerals BELTs. Here, the resulting BELTs may be used as tags corresponding to non-composite node label values of nodes in a node labeled tree and/or factors thereof. As illustrated in particular embodiments above, these tags are attached to corresponding nodes in the resulting BELT by edges having a label value of binary zero (in which a tag is connected by an edge having a label value of binary zero). It should be recognized that BELTs corresponding to numerals zero and one are used to represent tags corresponding to node label values zero and one as illustrated in FIG. 25. As illustrated in FIG. 27, the tags associated with non-composite node label values and/or factors three, five, seven, eleven and thirteen correspond with the BELTs associated with numerals two, three, four, five and six, respectively. This matches the association of non-composite numerals greater than two and BELT portions shown in FIG. 25

Such an association of BELTs and numerals as illustrated may be generated by an enumeration of BELTs and associating natural numerals to such enumerated BELTs. Thus, for this particular embodiment, although the claimed subject matter is not limited in scope in this respect, a method of enumerating a set of trees begins with enumeration of an empty binary edge labeled tree and a one node binary edge labeled tree. Here, the empty tree is associated with the zero and has a symbolic representation as illustrated in FIG. 27 (circle). Likewise, the one node tree, which holds no data, is associated with the one and has a graphical representation of a single node. For higher positive natural numerals, however, this embodiment of a method of enumerating a set of trees comprises positioning a tree at location k, k being a positive numeral greater than three, in which k comprises the product of u and v, u and v comprising positive numerals greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural numeral greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary zero label is not in the enumeration at some position lower than j; however, if the binary edge labeled tree obtainable from that first tree, as just described, is present in the enumeration with a binary zero label for the new edge, but not with a binary "1" label, then the tree at position j is that tree with a binary "1" label for the new edge. This may be illustrated, for example in FIG. 27, as described in more detail below.

For a particular embodiment, although the claimed subject matter is not limited in scope in this respect, a method of enumerating a set of ordered trees may begin with enumeration of an empty binary edge labeled tree and a one node binary edge labeled tree. Thus, the empty tree is associated with the zero and has a symbolic representation as illustrated in FIG. 27 (circle). Likewise, the one node tree, which holds no data, is associated with the one and has a graphical representation of a single node. For higher positive natural numerals, ordered trees may be generated by a process described, for example, in "The Lexicographic Generation of Ordered Trees," by S. Zaks, The Journal of Theoretical Computer Science, Vol. 10(1), pp. 63-82, 1980, or Enumerating Ordered Trees Lexicographically," by M. C. Er, Computation Journal, Vol. 28, Issue 5, pp. 538-542, 1985.

As illustrated, for this particular embodiment, and as previously described, the empty tree has zero nodes and is associated with the zero. Likewise, the one node tree root comprises a single node and is associated with the one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree is positioned at location k, then a non-composite numeral is associated with the zero-push of that tree and a non-composite numeral is associated with the one-push for that tree. Furthermore, the non-composite index of the zero-push of the tree comprises 2k−1, whereas the non-composite index of the one-push of the tree comprises 2k, where the index corresponds to the argument of the well-known Kleene enumeration on positive natural numerals of non-composite numerals, as illustrated, for example, in part in FIG. 28. Thus, referring again to FIG. 27, the one-push of the root tree is the tree at position three. This follows from FIG. 27 since P(2*1)=P(2)=3. Likewise, the tree at position five is the zero-push of the tree at position 2. Again, this follows from FIG. 28 since P(2*2−1)=P(3)=5.

The embodiments illustrate in FIGS. 5 through 23 involve connecting tags (BELT portions representing node label values and/or factors thereof) to unlabeled nodes by edges having a label value of binary zero and assign an edge label value of binary one to the remaining edges in the resulting BELT. In alternative embodiments, however, such edges connecting tags may have a label value of binary one with the remaining edges having a label value of binary zero, although the claimed subject matter is not limited in these respects.

Also, the transformations illustrated above with reference to FIGS. 5 through 23 are particularly directed to transforming an unlabeled tree and/or a node labeled tree to a BELT. However, it should be recognized that, as a BLT may essentially be represented as either a BELT or a BNLT, such techniques illustrated herein would equally apply to the representation of hierarchical data of an unlabeled tree and/or node labeled tree in a BNLT.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store tables although, the claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that the claimed subject matter cover all such embodiments.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

What is claimed is:

1. A method of transforming signal values representing one or more two dimensional graphical hierarchies for more convenient processing and/or storage, said one or more two dimensional graphical hierarchies being in a form of one or more tree hierarchies, said method comprising:
   accessing instructions from one or more physical memory devices for execution by one or more processors;
   executing said instructions accessed from said one or more physical memory devices by said one or more processors;
   storing, in at least one of said one or more physical memory devices, signal values resulting from having executed said instructions on said one or more processors, wherein said one or more physical memory devices also store a database or a portion thereof;
   wherein said instructions to transform said database, or said portion thereof, to one or more two dimensional graphical hierarchies; and
   wherein executing said instructions to transform said database further comprising:
   accessing, from said one or more physical memory devices, signal values representing one or more unlabeled two dimensional graphical hierarchies from said database;
   transforming said signal values representing one or more unlabeled two dimensional graphical hierarchies to signal values representing one or more labeled two dimensional graphical hierarchies; and
   storing said signal values representing said one or more labeled two dimensional graphical hierarchies in said database.

2. The method of claim 1, wherein said one or more labeled two dimensional graphical hierarchies comprise one or more node labeled tree hierarchies.

3. The method of claim 2, further comprising:
   associating said signal values representing node labeled tree hierarchies with corresponding tree hierarchies and/or labeled tree hierarchy portions according to an association of tree hierarchies and signal values representing numeral values.

4. The method of claim 1, wherein said one or more labeled two dimensional graphical hierarchies comprise one or more edge labeled tree hierarchies.

5. The method of claim 4, further comprising:
   associating said signal values representing node labeled tree hierarchies with corresponding tree hierarchies and/or labeled tree hierarchy portions according to an association of tree hierarchies and signal values representing numeral values.

6. An apparatus comprising:
   one or more processors coupled to one or more physical memory devices to store executable instructions and to store binary digital signal quantities as physical memory states, wherein the executable instructions being accessible from the one or more physical memory devices for execution by the one or more processors; and
   the one or more processors able to store in at least one of the physical memory devices, binary signal quantities, if any, that are to result from execution of the instructions on the one or more processors, wherein the one or more physical memory devices also store a database or portion thereof, and wherein said instructions to transform said database, or said portion thereof, to one or more two dimensional graphical hierarchies; and
   wherein the instructions to transform said database further to:
   access, from said one or more physical memory devices, signal values from said database, the signal values representing one or more unlabeled two dimensional graphical hierarchies;
   transform said signal values representing said one or more unlabeled two dimensional graphical hierarchies to signal values representing one or more labeled two dimensional graphical hierarchies; and
   store said signal values representing said one or more labeled two dimensional graphical hierarchies in said database.

7. The apparatus of claim 6, wherein said one or more labeled two dimensional graphical hierarchies comprise one or more node labeled tree hierarchies.

8. The apparatus of claim 7, further comprising:
   associating said signal values representing node labeled tree hierarchies with corresponding tree hierarchies and/or labeled tree hierarchy portions according to an association of tree hierarchies and signal values representing numeral values.

9. The apparatus of claim 6, wherein said one or more labeled two dimensional graphical hierarchies comprise one or more edge labeled tree hierarchies.

10. The apparatus of claim 9, further comprising:
associating said signal values representing edge labeled tree hierarchies with corresponding tree hierarchies and/or labeled tree hierarchy portions according to an association of tree hierarchies and signal values representing numeral values.

11. An article comprising: a non-transitory storage medium including executable instructions stored thereon; wherein the instructions are executable by one or more processors to be coupled to one or more physical memory devices, the devices to store instructions, including the executable instructions, and to store binary digital signal quantities as physical memory states, wherein the executable instructions to be accessible from the one or more physical memory devices for execution by the one or more processors; and
the one or more processors able to store in at least one of the physical memory devices, binary signal quantities, if any, that are to result from execution of the instructions on the one or more processors, wherein the one or more physical memory devices also store a database or portion thereof, and wherein said instructions to transform said database, or said portion thereof, to one or more two dimensional graphical hierarchies;
wherein the to transform said database instructions further to:
access, from said one or more physical memory devices, signal values representing one or more unlabeled two dimensional graphical hierarchies from said database;
transform said signal values representing said one or more unlabeled two dimensional graphical hierarchies to signal values representing one or more labeled two dimensional graphical hierarchies; and
store said signal values representing said one or more labeled two dimensional graphical hierarchies in said database.

12. The article of claim 11, wherein said one or more labeled two dimensional graphical hierarchies comprise one or more node labeled tree hierarchies.

13. The article of claim 12, wherein the instructions to transform said database further to:
associate said signal values representing said one or more node labeled tree hierarchies with corresponding tree hierarchies and/or labeled tree hierarchy portions according to an association of tree hierarchies and signal values representing numeral values.

14. The article of claim 11, wherein said one or more labeled two dimensional graphical hierarchies comprise one or more edge labeled tree hierarchies.

15. The article of claim 14, wherein the instructions to transform said database further to:
associate said signal values representing said edge labeled tree hierarchies with corresponding tree hierarchies and/or labeled tree hierarchy portions according to an association of tree hierarchies and signal values representing numeral values.

* * * * *